(12) United States Patent
Hu et al.

(10) Patent No.: US 11,929,939 B2
(45) Date of Patent: Mar. 12, 2024

(54) REMOTE BANDWIDTH ALLOCATION

(71) Applicant: The Board of Trustees of the University of Illinois, Urbana, IL (US)

(72) Inventors: Yih-Chun Hu, Urbana, IL (US); Zhuotao Liu, Santa Clara, CA (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 0 days.

(21) Appl. No.: 17/387,310

(22) Filed: Jul. 28, 2021

(65) Prior Publication Data
US 2022/0045967 A1 Feb. 10, 2022

Related U.S. Application Data

(60) Provisional application No. 63/057,498, filed on Jul. 28, 2020.

(51) Int. Cl.
*H04L 47/78* (2022.01)
*H04L 47/2408* (2022.01)
*H04L 47/80* (2022.01)

(52) U.S. Cl.
CPC ........ *H04L 47/781* (2013.01); *H04L 47/2408* (2013.01); *H04L 47/805* (2013.01); *H04L 47/808* (2013.01)

(58) Field of Classification Search
CPC . H04L 47/2408; H04L 47/781; H04L 47/805; H04L 47/808
See application file for complete search history.

(56) References Cited

U.S. PATENT DOCUMENTS 6,594,268 B1 * 7/2003 Aukia .................. H04L 45/302
370/235
8,593,964 B1 * 11/2013 Sinha ..................... H04L 47/11
370/235

(Continued)

OTHER PUBLICATIONS

Zahaib, Akhtar, et al., "Oboe: Auto-tuning Video ABR Algorithms to Network Conditions", Proceedings of the 2018 Conference of the ACM Special Interest Group on Data Communication, 2018, pp. 44-58.

(Continued)

*Primary Examiner* — Joseph E Avellino
*Assistant Examiner* — Mon Cheri S Davenport
(74) *Attorney, Agent, or Firm* — BENESCH, FRIEDLANDER, COPLAN & ARONOFF LLP

(57) ABSTRACT

A system and method remotely allocate bandwidth among content consumers on a computing network based on optimizing an aggregate objective pertaining to a plurality of flows of content. The system and method create a profile for each flow of the plurality of flows from a content provider to a content consumer on the computing network. Information is stored in each profile based on at least a metric associated with the corresponding flow. A target bandwidth for each profile is computed remotely, based on optimizing an aggregate objective pertaining to the plurality of flows of content. The optimizing is also based on the information stored in their respective profiles. The system and method distribute the bandwidth to each flow of the plurality of flows based on the target bandwidth remotely computed for each profile.

18 Claims, 75 Drawing Sheets

(56) References Cited

U.S. PATENT DOCUMENTS

| | | | | |
|---|---|---|---|---|
| 10,694,239 | B1* | 6/2020 | Eluvan | H04N 21/25825 |
| 2005/0282571 | A1* | 12/2005 | Oprescu-Surcobe | ........................ |
| | | | | H04W 28/10 |
| | | | | 455/503 |
| 2009/0182889 | A1* | 7/2009 | Hurst | H04L 65/80 |
| | | | | 709/231 |
| 2013/0039187 | A1* | 2/2013 | Strulo | H04L 47/76 |
| | | | | 370/238 |
| 2021/0385137 | A1* | 12/2021 | Sridhar | H04L 41/5009 |

OTHER PUBLICATIONS

Bai, Wei, et at., "Information-Agnostic Flow Scheduling for Commodity Data Centers", Proceedings of the 12th USENIX Symposium on Networked Systems Design and Implementation (NSDI '15), May 4-6, 2015, pp. 455-468.

Bensley, Stephen, et al., "Data Center TCP (DCTCP): TCP Congestion Control for Data Centers", Internet Engineering Task Force (IETF) ISSN: 2070-1721, Oct. 2017, 17 pages.

Cardwell, Neil, et al., "BBR: Congestion-based congestion control", ACM Queue, Sep.-Oct. 2016, pp. 20-53.

Cisco Study: Complete Visual Networking Index (VNI) forecast, Available at <https://www.cisco.com/c/en_au/solutions/service-provider/visual-networking-index-vni/index.html>, accessed on Jan. 2020.

Clement, J., Average YouTube video length 2018, by category, Available at <https://www.statista.com/statistics/1026923/youtube-video-category-average-length/>, accessed on Jul. 2019.

Dobrian, Florin, et al., "Understanding the Impact of Video Quality on User Engagement", In Proceedings of the ACM SIGCOMM 201 1 Conference, SIGCOMM '11, 2011, pp. 362-373.

Dong, Mo, et al., "PCC: Re-architecting Congestion Control for Consistent High Performance", Proceedings of the 12th USENIX Symposium on Networked Systems Design and Implementation (NSDI '15), May 4-6, 2015, pp. 395-408.

FCC. Restoring Internet Freedom, Available at <https://www.fcc.gov/restoring-internet-freedom>, accessed on Mar. 2020.

Ferlin, Simone, et al., "Revisiting Congestion Control forMultipath TCP with Shared Bottleneck Detection", In IEEE INFOCOM 2016—The 35th Annual IEEE International Conference on Computer Communications, 2016, pp. 1-9.

Sally Floyd, Mark, et al., "Equation-Based Congestion Control for Unicast Applications", In Proceedings of the conference on Applications, Technologies, Architectures, and Protocols for Computer Communication (SIGCOMM 2000), Aug. 2000, pp. 43-56.

Ford, Alan, et al., TCP Extensions for Multipath Operation with Multiple Addresses, RFC 6824 Technical Report, 2013, 68 pages.

Google, Google Video Quality Report, Available at <https://www.google.com/get/videoqualityreport/>, Accessed Jan. 2020.

Grosvenor, Matthew P., Queues Don't Matter When You Can Jump Them!, In 12th USENIX Symposium on Networked Systems Design and Implementation (NSDI 15), 2015, pp. 1-14.

Ha, Sangtae, et al., "CUBIC: A New TCP-Friendly High-Speed TCP Variant", ACM SIGOPS operating systems review, 2008, pp. 64-74.

Hassayoun, Sofiane, et al., "Dynamic Window Coupling for Multipath Congestion Control", In 2011 19th IEEE International Conference on Network Protocols, 2011, pp. 341-352.

Hayes, David, et al., Shared Bottleneck Detection for Coupled Congestion Control for RTP Media Update (draft-hayes-rmcat-sbd-02), 2015, 29 pages.

Hayes, David A., et al., "Practical Passive Shared Bottleneck Detection Using Shape Summary Statistics", In 39th Annual IEEE Conference on Local Computer Networks, 2014, pp. 150-158.

Hong, Chi-Yao, et al., "B4 and After: Managing Hierarchy, Partitioning, and Asymmetry for Availability and Scale in Google's Software-Defined WAN", In Proceedings of the 2018 Conference of the ACM Special Interest Group on Data Communication, 2018, pp. 74-87.

Huang, Te-Yuan, et al., "A Buffer-Based Approach to Rate Adaptation: Evidence from a Large Video Streaming Service", In Proceedings of the 2014 ACM conference on SIGCOMM, 2014, pp. 187-198.

Jain, Sushant, et al., "B4: Experience with a Globally-Deployed Software Defined WAN", ACM SIGCOMM Computer Communication Review, 2013, pp. 3-14.

Katabi, Dina, et al., "A Passive Approach for Detecting Shared Bottlenecks", In Proceedings Tenth International Conference on Computer Communications and Networks (Cat. No. 01EX495), 2001, pp. 174-181.

Kim, Min Sik, et al., "A Wavelet-Based Approach to Detect Shared Congestion", IEEE/ACM Transactions on Networking, 2008, pp. 763-776.

Knight, Simon, et al., "The Internet Topology Zoo", IEEE Journal on Selected Areas in Communications, 2011, 1765-1775.

Langley, Adam, et al,. "The QUIC Transport Protocol: Design and Internet-Scale Deployment", In Proceedings of the Conference of the ACM Special Interest Group on Data Communication, 2017, pp. 183-196.

Li, Zhi, et al., "Toward a practical perceptual video quality metric.", The Netflix Tech Blog, Available at <https://netflixtechblog.com/toward-a-practical-perceptual-video-quality-metric-653f208b9652>, The Netflix Tech Blog, 6, 2016.

Liu, Zhuotao, et al., "Enabling Work-Conserving Bandwidth Guarantees for Multi-Tenant Datacenters via Dynamic Tenant-Queue Binding", In IEEE INFOCOM 2018-IEEE Conference on Computer Communications, 2018, pp. 1-9.

Liu, Zhuotao, et al., "MiddlePolice: Toward Enforcing Destination-Defined Policies in the Middle of the Internet", In Proceedings of the 2016 ACM SIGSAC Conference on Computer and Communications Security, 2016, pp. 1268-1279.

Marcon, Massimiliano, et al., "The Local and Global Effects of Traffic Shaping", In 2011 Third International Conference on Communication Systems and Networks (COMSNETS 2011), 2011, pp. 1-10.

Medina, Alberto, et al., "BRITE: An Approach to Universal Topology Generation", In International Symposium on Modeling, Analysis and Simulation of Computer and Telecommunication Systems, IEEE, 2001, pp. 346-353.

MiniMatters, The best video length for different videos available on YouTube <https://www.minimatters.com/youtube-best-video-length/>, Accessed Jan. 2020.

Nathan, Vikram, et al. "End-to-End Transport for Video QoE Fairness", In Proceedings of the ACM Special Interest Group on Data Communication, SIGCOMM '19, Association for Computing Machinery, 2019, p. 408-423.

University of Washington NS-3 Consortium, Tap bridge model—network simulator 3 available at <http://www.nsnam.org/docs/release/3.10/doxygen/group_tap_bridge_model.html, Jan. 2011, Accessed on Mar. 2020.

PYMNTS, Study: Economics impact of internet tops $2.1t in US available at <http://www.pymnts.com/economy/2019/study-econmic-impact-internet-tops-2-trillion-united-states/>, Accessed on Jan. 2020.

Roffo, Giorgio, et al., "Personality in Computational Advertising: A Benchmark", In International Workshop on Emotions and Personality in Personalized Systems at ACM RecSys (EMPIRE 2016), 2016, 9 pages.

Rubenstein, Dan, et al., "Detecting Shared Congestion of Flows via End-to-End Measurement", IEEE/ACM Transactions on Networking, vol. 10, No. 3, 2002, pp. 381-395.

Sinha, Prabhakant, et al., "The Multiple-Choice Knapsack Problem", Operations Research, vol. 27, No. 3, 1979, pp. 503-515.

Taylor, Mark, "Verizon's Accidental Mea Culpa", Archived at http://ecfsapo.fcc.gov/file/7521706256.pdf, Jul. 2014, Accessed on Mar. 2020.

Wei, Wenjia, "Shared Bottleneck Detection Based on Congestion Interval Variance Measurement", IEEE Communications Letters, vol. 22, No. 12, Dec. 2018, pp. 2467-2470.

Yin, Xiaoqi, et al., "A Control-Theoretic Approach for Dynamic Adaptive Video Streaming over HTTP", In Proceedings of the 2015 ACM Conference on Special Interest Group on Data Communication, 2015, pp. 325-338.

(56) References Cited

OTHER PUBLICATIONS

Youtube, Recommended upload encoding settings, available at <https://support.google.com/youtube/answer/1722171?h1=en, Accessed Jan. 2020.

* cited by examiner

```
1  Initialization(S = { (fid: [weight, role]), ... }):
2  Initialize a map F_profile to store the flow profiles
3  Initialize configurable algorithm constants β_0, γ, δ and C_period
4  Create a map Weight_next to store the updated weights for flows
5  Initialize Weight_next using the target weight given by S
6  Let cid (rid) be the identifier of the calibrator (recipient) flow
7  # IS_agg, t_switch and L are used in the LogisticWeights procedure
8  Initialize IS_agg := true to indicate whether rid is under-allocated
9  Initialize a timestamp t_switch to denote the last time IS_agg changed
10 Initialize a logistic constant for rid as L := (1 - S[rid].weight) · 2
11 for fid ∈ S : # Initialize F_profile
12    F_profile[fid] := [W(t):=0, W_max:=0, β:=β_0, W(t)_avg:=0]
13    if S[fid].role = calibrator: set cid := fid
14    if S[fid].role = recipient: set rid := fid
15 # The two callbacks below are executed in different threads
16 Register CrossFlowCwndAlloc to be called every C_period
17 Register PacketAckWatching to be called when TCP kernel receives an ACK
      for any flow in S
18    # Required since F_profile is accessed in both threads
19    Initialize a mutex lock L_mu to safely access F_profile
20 Callback CrossFlowCwndAlloc():
21    Wait until L_mu is held
22    Call AlgorithmicParamOverwrites() to get allocation decisions
23
24    Get the share of calibrator w_cid := F_profile[cid].W(t)_avg / W_avg^all
25    if w_cid > S[cid].weight:
26       Apply AggressiveAllocation() for donor and recipient flows
27    else: # Mitigating the external un-friendliness
28       Apply NormalAllocation() for the recipient flow
29       for fid ∈ F_profile:
30          if S[fid].role is not donor: continue
31          W_est := (1 - S[cid].weight) · W_avg^all · S[fid].weight
32          if F_profile[fid].W(t)_avg > γ · W_est:
33             Apply ConservativeAllocation(fid) for the flow
34          else: Apply AggressiveAllocation(fid) for the flow
35 Callback PacketAckWatching(fid):
36    Wait until L_mu is held
37    Retrieve the real-time cwnd W(t) from kernel for fid
38    Update F_profile[fid].W(t) := W(t)
39    Recompute F_profile[fid].W(t)_avg based on W(t)
40 AlgorithmicParamOverwrites():
41    Call LogisticWeights(sys.Now()) to update Weight_next
42
```

FIG. 15A

```
43    W_max^all := Σ_{f∈F_profile} (1 - F_profile[f].W_max)
44    for fid ∈ F_profile:
45        Retrieve [W(t), W_max, β, W(t)_avg] := F_profile[fid]
46        Δ := W^all · Weight_next[fid] - (1 - β) · W(t)_avg
                avg                                        avg
47        Update W(t) := W(t) + Δ
48        Update W_max := W_avg^all · Weight_next[fid]
49        Update β := β^(W(t)/W_max)
50  LogisticWeight(rid, time):
51      w_ratio := F_profile[rid].W(t)_avg / Σ_{f∈F_profile} F_profile[f].W(t)_avg
52      Get the target weight for rid as w_target := S[rid].weight
53      if w_ratio < (1 - δ) · w_target:
54          if not IS_inc:  # Change t_switch and update L
55              t_switch := time; L := (1 - Weight_next[rid]) · 2
56          Set IS_inc := true
57          w_logistic := (1 - ?) · LogisticFunction((time - t_switch)/T, L)
58          for fid ∈ F_profile:
59              if fid = rid: Weight_next[fid] = w_logistic
60              else: Weight_next[fid] = (1 - w_logistic) · S[fid].weight
61      if w_ratio > (1 + δ) · w_target:
62          if IS_inc:  # Change t_switch and update L
63              Set t_switch := time; L := (Weight_next[rid] - w_target) · 2
64          Set IS_inc := false
65          w_logistic := w_target + L · (1 - LogisticFunction((time - t_switch)/T, L))
66          # Overwrite w_logistic if LogisticFunction is insufficient
67          if w_logistic < w_target:
68              Update Weight_next using the target weights in S and exit
69          for fid ∈ F_profile:
70              if fid = rid: Weight_next[fid] = w_logistic
71              else: Weight_next[fid] = (1 - w_logistic) · S[fid].weight
72  AggressiveAllocation(fid):
73      Retrieve [W(t), W_max, β, _] := F_profile[fid]
74      Use W(t) as the real-time cwnd of fid in kernel
75      Use W_max and β as the new Cubic kernel parameters for fid
76  NormalAllocation(fid):
77      Retrieve [_, W_max, β, _] := F_profile[fid]
78      Use W_max and β as the new Cubic kernel parameters for fid
79  ConservativeAllocation(fid):
80      Retrieve [_, _, β, _] := F_profile[fid]
81      Multiplicatively reduce real-time cwnd of fid in kernel by β
82      Use β as the new Cubic kernel parameter for fid
83  LogisticFunction(x, L, k := -0.02):
84      return        L
              ─────────────
              1 + exp(k·x)
```

FIG. 15B

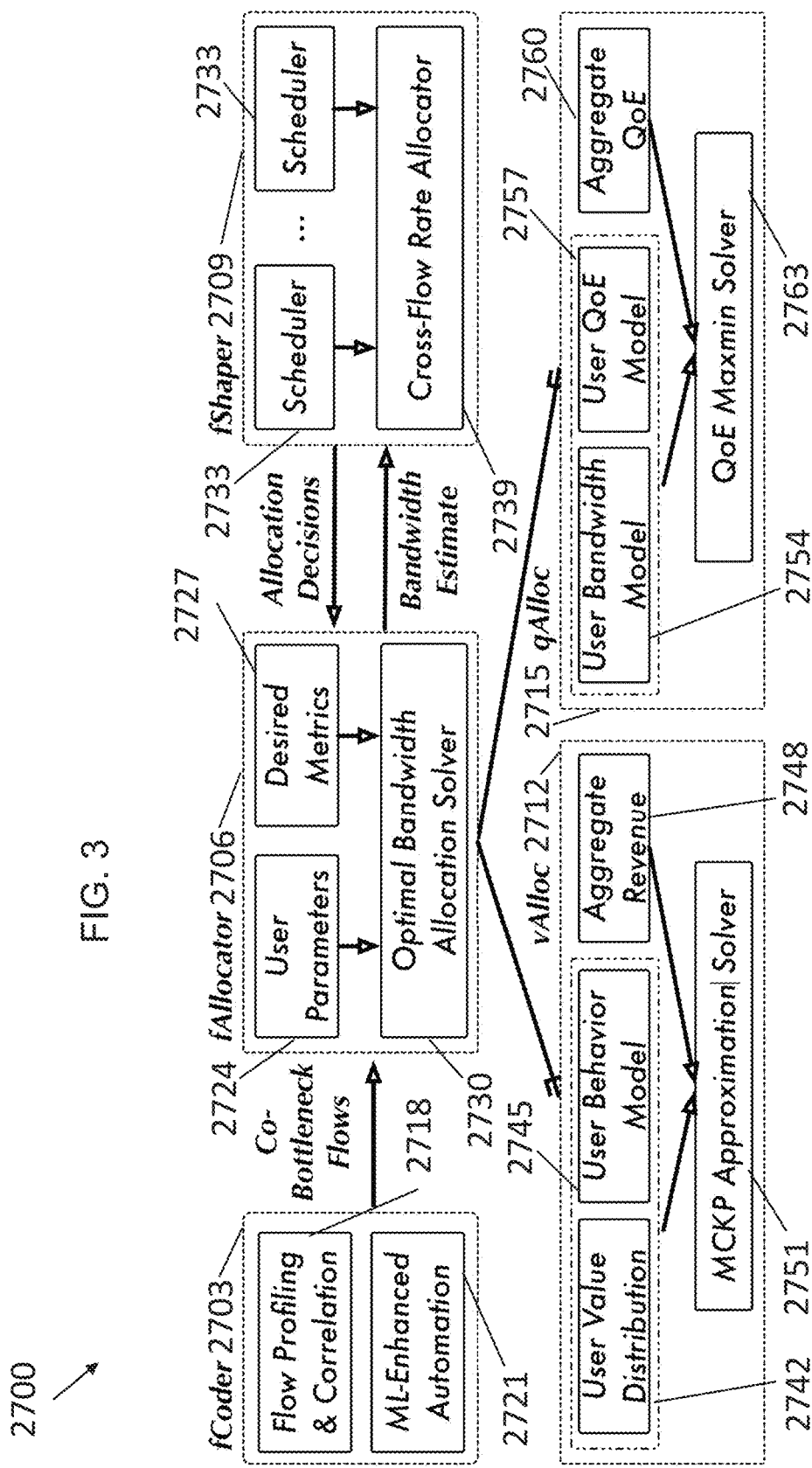

QoE Optimization Algorithm

Inputs:
- $\{Q\}$: the five-grade QoE scale [?]
- $B_{adv}, B_{std}$: modeled advertised bw and bw variance (§ 3.2)
- $\{C\}$: possible bitrate choices based on [52]
- $\{\mathcal{B}\}$: possible bw allocation values

Intermediate Results:
- $qtable_i$: memo of per-QoE allocation for flow $i$

Outputs:
- $C_{1,i}, B_{1,i}$: the bitrate and bw allocation for flow $i$

---

Func: BuildTable: *// compute for each flow/user*
for each possible start state $(C_0, l_0)$ do
    for $\forall(C_1, B_1) \in \{C, \mathcal{B}\}$ (sorted by $\mathcal{B}$) do
        $Q' \leftarrow$ expected QoE based on Equation (13)
        for $\forall Q \in \{Q\}$ do
            if $Q' \geq Q$ then
                $qtable_i[C_0, l_0][Q] \leftarrow (C_1, B_1, Q')$ return $qtable_i$

---

Func: FindBestAllocation:
$Q_{min}, Q_{max}, \epsilon \leftarrow 0.001$ *// binary search config for $\{Q\}$*
while $Q_{min} < Q_{max} - \epsilon$ do
    $Q \leftarrow (Q_{min} + Q_{max})/2$
    for each flow $i$ do
        $(C_{1,i,Q}, B_{1,i,Q}, Q') \leftarrow qtable_i[C_0, l_0][Q]$
    if $\sum_i B_{1,i,Q} \leq B_{total}$ then $Q_{min} \leftarrow Q$ *// achievable*
    else $Q_{max} \leftarrow Q$ *// unachievable*
return $C_{1,i,Q_{min}}, B_{1,i,Q_{min}}$

---

Func: qAlloc Optimization:
for each flow $i$ do $qtable_i \leftarrow$ BuildTable()
for each control interval do
    $C_{1,i}, B_{1,i} \leftarrow$ FindBestAllocation()

FIG. 28

REMOTE BANDWIDTH ALLOCATION

CROSS REFERENCE TO RELATED APPLICATIONS

The present application claims the benefit of priority under 35 U.S.C. § 119 from U.S. Provisional Patent Application Ser. No. 63/057,498, entitled "Remote Bandwidth Allocation," filed on Jul. 28, 2020, the disclosure of which is hereby incorporated by reference in its entirety for all purposes.

STATEMENT OF FEDERALLY FUNDED RESEARCH OR SPONSORSHIP

This invention was made with government support under grant number 17-17313 awarded by the National Science Foundation. The government has certain rights in the invention.

TECHNICAL FIELD

This disclosure relates generally to computer networking, and more specifically relates to remote bandwidth allocation.

BACKGROUND

Internet content providers often deliver their content to end users through bandwidth bottlenecks that are out of the control of both the content providers and the end users. For example, bandwidth limitations inside of a user's internet service provider (ISP) may constrain a content provider's ability to provide the highest quality content to that user. Such bandwidth limits often affect multiple users of the same content provider. ISPs may perform traffic engineering to control traffic from content providers, and such traffic engineering may cause some bandwidth limitations.

The description provided in the background section should not be assumed to be prior art merely because it is mentioned in or associated with the background section. The background section may include information that describes one or more aspects of the subject technology.

SUMMARY

According to certain aspects of the present disclosure, a method for remotely allocating bandwidth among content consumers on a computing network may include creating a profile for each flow of a plurality of flows of content from a content provider to a content consumer on the computing network. Information may be stored in each profile based on at least a metric associated with the corresponding flow. The method may include computing remotely a target bandwidth for each profile based on optimizing an aggregate objective pertaining to the plurality of flows and based on the information stored in their respective profiles. Bandwidth may be distributed to each flow of the plurality of flows based on the target bandwidth remotely computed for each profile.

The information stored in each profile may include a score based on at least a metric associated with the corresponding flow. The computing remotely the target bandwidth may further be based on at least a characteristic of the content consumer associated with the profile. The aggregate objective may include increasing a total value associated with the plurality of flows of content. The total value may include revenue received by the content provider based on the plurality of flows of content. The total value may include engagement with the content provider by the content consumers based on the plurality of flows of content. The total value may include additional content received by the content provider from the content consumers based on the plurality of flows of content. The method may also include detecting one or more co-bottleneck flow pairs. Distributing the bandwidth may also be based on the detected co-bottleneck flow pairs.

According to certain aspects of the present disclosure, a system may be provided for performing the method for remotely allocating bandwidth among content consumers on a computing network. The system may include a memory storing instructions and a processor configured to execute the instructions. The stored instructions may, when executed, cause the processor to perform the method for remotely allocating bandwidth among content consumers on the computing network.

According to certain aspects of the present disclosure, a non-transitory machine-readable storage medium having instructions stored thereon for causing a processor to execute the method for remotely allocating bandwidth among content consumers on a computing network may be provided.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF DRAWINGS

The disclosure is better understood with reference to the following drawings and description. The elements in the figures are not necessarily to scale, emphasis instead being placed upon illustrating the principles of the disclosure. Moreover, in the figures, like-referenced numerals may designate corresponding parts throughout the different views.

FIGS. 15A and 15B are portions of exemplary code for a Cross-Flow cwnd Reallocation (CFCR) algorithm.

FIG. 27 illustrates another example FlowTele architecture for remotely allocating bandwidth among network users.

FIG. 28 illustrates a QoE Optimization Algorithm.

Figure 1A:
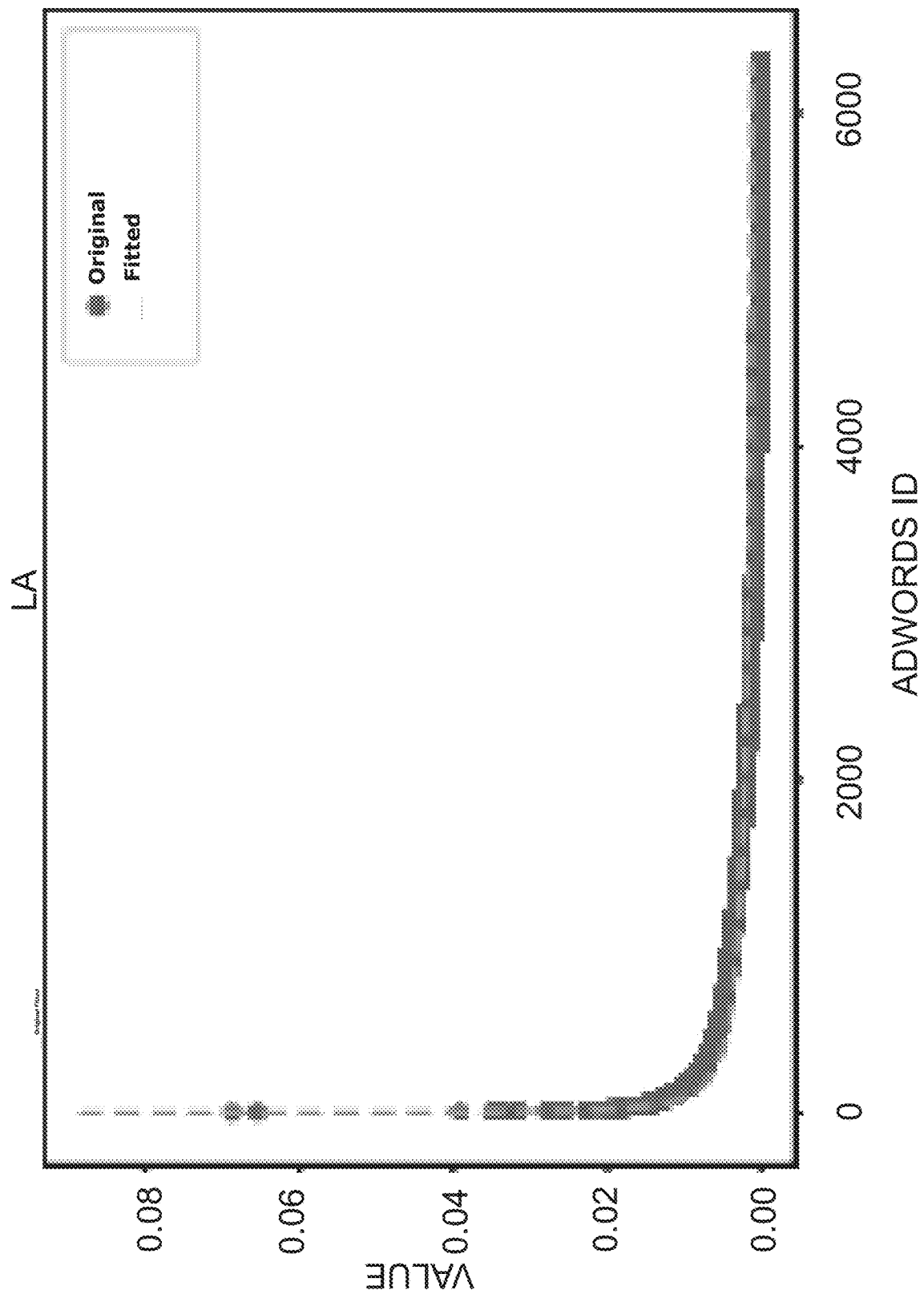
FIG. 1A is a graph that illustrates exemplary advertisement values of collected Google AdWords for Los Angeles, California.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Technologies discussed herein include remote bandwidth allocation in computing networks, cross-flow congestion control, and facilitating content providers to reallocate bandwidth from a bottleneck link across other links and from flows destined for one content consumer to flows destined for another content consumer using a metric other than TCP fairness while also remaining TCP-friendly to cross-traffic. The system architectures and methodologies discussed herein facilitates service and/or content providers to maximize or optimize a wide range of metrics and/or goals, such as revenue, user satisfaction, quality of service, quality of experience, user desirability, user experience fairness, social welfare, and other non-economic and/or economic factors. The metrics and/or goals may be selected and/or determined by the content provider. The system architecture described herein facilitates shaping outbound traffic on an Internet-scale network to optimize provider-selected metrics, using source control with neither in-network support nor special client support. The systems and methods described herein facilitate shaping outbound network traffic as determined by a flow allocator, as described herein. Evaluations performed through simulation and over the Internet show that simply by reallocating bandwidth between flows, we can improve minimum-QoE by 12% and content provider revenue by 15%. if a content provider can divide its share of the downstream bottleneck bandwidth in a manner other than TCP fairness (while remaining TCP friendly to external cross flows), it becomes possible to shape link usage for its customers towards maximizing a wide range of possible content provider desired goals. For example, some content providers may aim to improve social welfare, such as by prioritizing content that is educational, moderates political extremism, improves diversity, improves access for disadvantaged users, or for public services. From an economic perspective, content providers may favor paid subscriptions/promotions or advertising traffic to sustain their revenues despite bandwidth limitations on downstream paths. Reaping such social and economic benefits despite limited customer network capacity has to date been impossible for the content providers.

In some instances, content providers may have users with disparate bandwidth-related factors, for example, revenue potential, benefits to bandwidth ratio, and/or bandwidth requirements. Content providers may strategically reallocate network resources among their users to improve various metrics, e.g., user experience, quality of service (QoS), satisfaction of contractual obligations, economic results, non-economic benefits, and fairness. The value of a content provider's users may follow a non-uniform distribution.

A content provider may shift some of its bandwidth consumption from certain donor flows to other recipient flows, based on the disparate bandwidth-related factors of the users, and thereby increase the aggregate benefits to the content provider for the bandwidth consumption. In general, a content provider may optimize a variety of metrics of the bandwidth-related factors, such as revenue potential, quality of service (QoS), user experience, contractual obligations, non-economic benefits, and fairness, when facing an external bandwidth limitation. In certain aspects, the disclosed technology may shape outbound traffic on an Internet-scale network, based on one or more of a variety of metrics of bandwidth-related factors, using source control with neither in-network support nor special client support. The disclosed technology differs from traditional approaches such as, for example, strawman designs where a content provider throttles low-valued users, which is neither optimal nor socially friendly. The disclosed technology, on the other hand, may facilitate content providers to obtain optimal value according to the various metrics under constrained bandwidth, while minimizing impact on user retention.

The disclosed systems and methods may provide an improvement to computer functionality by detecting co-bottleneck flows and remotely allocating bandwidth among users on a network to optimize user experience and/or various other metrics of bandwidth-related factors, such as revenue potential, quality of service (QoS), contractual obligations, non-economic benefits, and fairness. For example, the disclosed systems and methods, such as with FlowTele, may leverage the heterogeneity of user values to content providers based on real-world advertising pricing, services pricing, content pricing, contractual obligations, relationship capital, other user desirability factors, etc. For example, user value may be either economic, non-economic, or a combination. User desirability factors may include an amount of time that the user interacts with the content provider, a quantity of content that the user consumes from the content provider, a quantity of content that a user submits or provides to the content provider, demographics of the user, geographic location of the user, a type or characteristic of content consumed by the user, a type or characteristic of content submitted or provided by the user, or other characteristics of the user.

An fCoder module of the FlowTele may detect when flows share a same bottleneck. An fCoder-ML module of the FlowTele may speed identification of flows that might share the same bottleneck and demonstrate their accuracy and performance. A vAlloc module of the FlowTele may use an MCKP-solver to choose next-interval bandwidth and buffer-time choices that maximize a content-provider metric (e.g., user value, QoS, user experience, etc.). The vAlloc module may aggregate content-provider metrics subject to a bandwidth limit across a wide range of user models without excessively sacrificing fairness to lower-value users. In such a manner, for example, the vAlloc module may provide improvement over prior techniques that deliberately remove the lowest value users. An fShaper module of the FlowTele may receive bandwidth splits from the vAlloc module and deliver the target bandwidth weights to each flow. The fShaper module may split available bandwidth to target ratios while retaining friendliness to cross-traffic. In certain aspects, the FlowTele may improve metrics, e.g., aggregate user value, by between 9% and 20%.

The systems and methods described herein may include evaluating distributions of user value (e.g., revenue potential, non-economic user desirability, etc.) to content providers whose revenues are driven by advertisements or paid content distribution, based on data collected from Google Adwords and Facebook profiles, using various advertising placement or content scheduling and/or distribution strategies. Our results show that real platforms may experience non-uniform and even heavy-tailed distributions for user values. Therefore, content providers that shape their network services as described herein may achieve significant improvements in various metrics (e.g., economic gain) with minimal impact on the overall social value. The systems and methods described herein may enable content providers to obtain optimal metrics (e.g., optimal user value) under constrained bandwidth, while minimizing impact on user retention.

The systems and methods described herein address several major challenges for achieving metrics-based (e.g., economically-aware) traffic management and/or cross-flow bandwidth reallocation in open and decentralized networks like the Internet. First, designing allocation strategies is non-trivial. For instance, a declarative intent of "maximizing revenue in case of bandwidth limitations" may not be simply realized by throttling "low-valued" users. Rather, such optimization may involve delicate cross-flow bandwidth reallocations backed by user value and behavior modeling such that the content providers may obtain economically optimal aggregate user value, while minimizing the possible impact on user retention. Second, given the desired bandwidth allocation, it is challenging for the content providers to enforce such allocations effectively so that their flows are able to share the bottleneck link in accordance with the allocation. (i) The content providers do not own the entire path, which precludes the possibility of deploying in-network queuing or throttling mechanisms, as providers could do in private WAN and datacenters; (ii) the Autonomous System (AS) owning the bottleneck (or slowest) link on the path may refuse to cooperate; and (iii) the content provider likely does not want to disclose its desired allocation policies to these remote ASes (for instance due to privacy concerns). Thus, the second challenge is how to remotely enforce provider-desired allocation policies on bottleneck links with neither in-network support at remote ASes nor recipient networking stack upgrades. The third problem, which is a prerequisite for strategic bandwidth reallocation among a set of flows, is that these flows should be co-bottlenecked. Although large providers may influence the paths taken by their flows, yet they do not control the complete path by the nature of Internet inter-domain routing (e.g., BGP). Co-bottleneck detection is a profound research topic, yet scaling the detection capability of these prior designs to support classification among large numbers of flows (e.g., millions for large providers) is open.

The systems and methods described herein include FlowTele (inspired by the word telekinesis), the first readily deployable system enabling content providers to remotely shape network traffic based on a combination of factors including, for example, QoS, user experience, fairness, satisfaction of contractual obligations, and satisfaction of economic goals, in a manner that is TCP-friendly to cross-traffic sharing the same downstream bottlenecked path.

At the highest level, FlowTele is powered by a stack of innovative designs. In a first exemplary embodiment (see FIG. 3), the FlowTele architecture 300 includes: (i) an fCoder module 305, a robust and scalable flow co-bottleneck detector usable in Internet-like networks; (ii) a vAlloc module 310, a metrics-aware (e.g., economically-aware, user-experience-aware, etc.) bandwidth allocation framework that provides optimal allocations for given user value distributions and user behavior models; and (iii) an fShaper module 315, a source-control mechanism to remotely enforce accurate weighted fair share across a set of co-bottlenecked flows.

The fCoder module may identify co-bottlenecked flows by cross-correlating their Round Trip Time (RTT) changing rates, which may demonstrate excellent detection accuracy in the Internet, where the bottleneck may be dominated by dynamic and unknown cross-traffic. The fCoder module may further enhance its detection capability using a twin neural network that may make large-scale classification in near-real-time. The vAlloc module may be instantiated, for example, for video streaming applications. User value and/or behavior may be modeled for these applications, based on which the vAlloc module may provide bandwidth allocations optimal in a content-provider-chosen metric by solving a Multiple-Choice Knapsack Problem (MCKP). The optimality of the vAlloc module may be evaluated under various modeling parameters to demonstrate its generality. The fShaper module may be powered by a novel cross-flow congestion window reallocation algorithm to accurately redistribute the congestion windows among the group of co-bottlenecked flows. Through extensive evaluations, the fShaper module may achieve both internal weighted fairness, e.g., the sending rates of controlled flows converge to desired weighted fair shares, and external TCP friendliness, e.g., the controlled flows exhibit fairness against TCP cross-traffic.

In certain aspects, the FlowTele may include a readily deployable system that enables flow sources to remotely shape traffic on Internet-scale networks in accordance with certain prioritization metrics desired by the flow providers. Notably, the FlowTele may simultaneously achieve source-driven and in-network traffic management, a benefit that has to date been unachievable in globally distributed and heterogeneous networks, such as the Internet, where flow providers have little control over the in-network routing and protocol deployment. In certain aspects, the FlowTele may be implemented in about 9700 lines of code and may be evaluated substantially through analytical simulations, Internet experiments, and/or a modified ns-3 emulation platform that interoperates a controllable and emulated network with the Internet.

In some instances, the user priorities/values to a content provider may not be uniform, and may even follow heavy-tailed distributions. As a result, a small shift in the behavior of high-value users may provide disproportionate returns to the content provider, especially when a content provider experiences downstream congestion. This non-uniform distribution of user values may arise from several etiologies: (i) many content providers rely on advertisements or paid content distribution, the values of which are often heavy tailed (as shown below); (ii) users of social media provide additional value to content providers both by providing content that can attract more viewers; such social influence is often heavy-tailed (e.g., as measured by Twitter and Instagram followers or YouTube subscribers); (iii) even for content providers that charge a flat monthly rate, the unequal distribution of viewing frequency means that certain users' traffic is more valuable in terms of revenue per hour watched than other users.

Figure 1B:
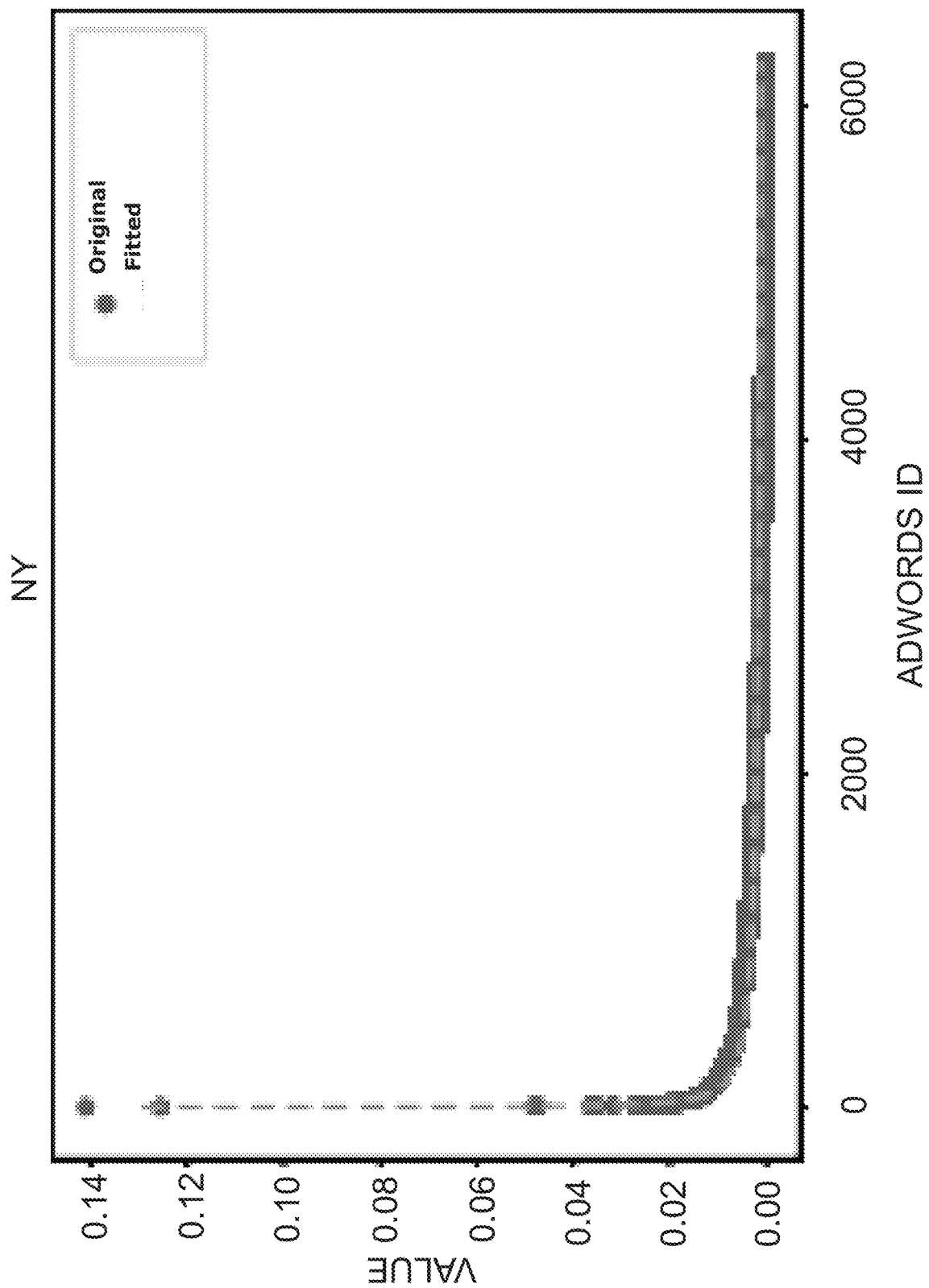
FIG. 1B is a graph that illustrates exemplary advertisement values of collected Google AdWords for New York City, New York.

As an example, two real-world datasets were collected and analyzed to quantitatively validate the non-uniform distribution of user values. First, a collection of Google AdWords were gathered by using Google's AdWord suggestion mechanism to compile a list of over 6000 AdWords. Next, a set of fourteen (14) cities across the United States were chosen to determine the per-impression cost of each selected AdWord in each selected city. For each city, the ad terms from highest value to lowest value were sorted and the ad term number plotted on the x-axis against its value per impression on the y-axis. Two representative results are shown in FIGS. 1 and 2. Each city's data was fitted using the Weibull distribution. The figures clearly show that the value distribution of the collected AdWords is heavy-tailed.

Figure 2A:
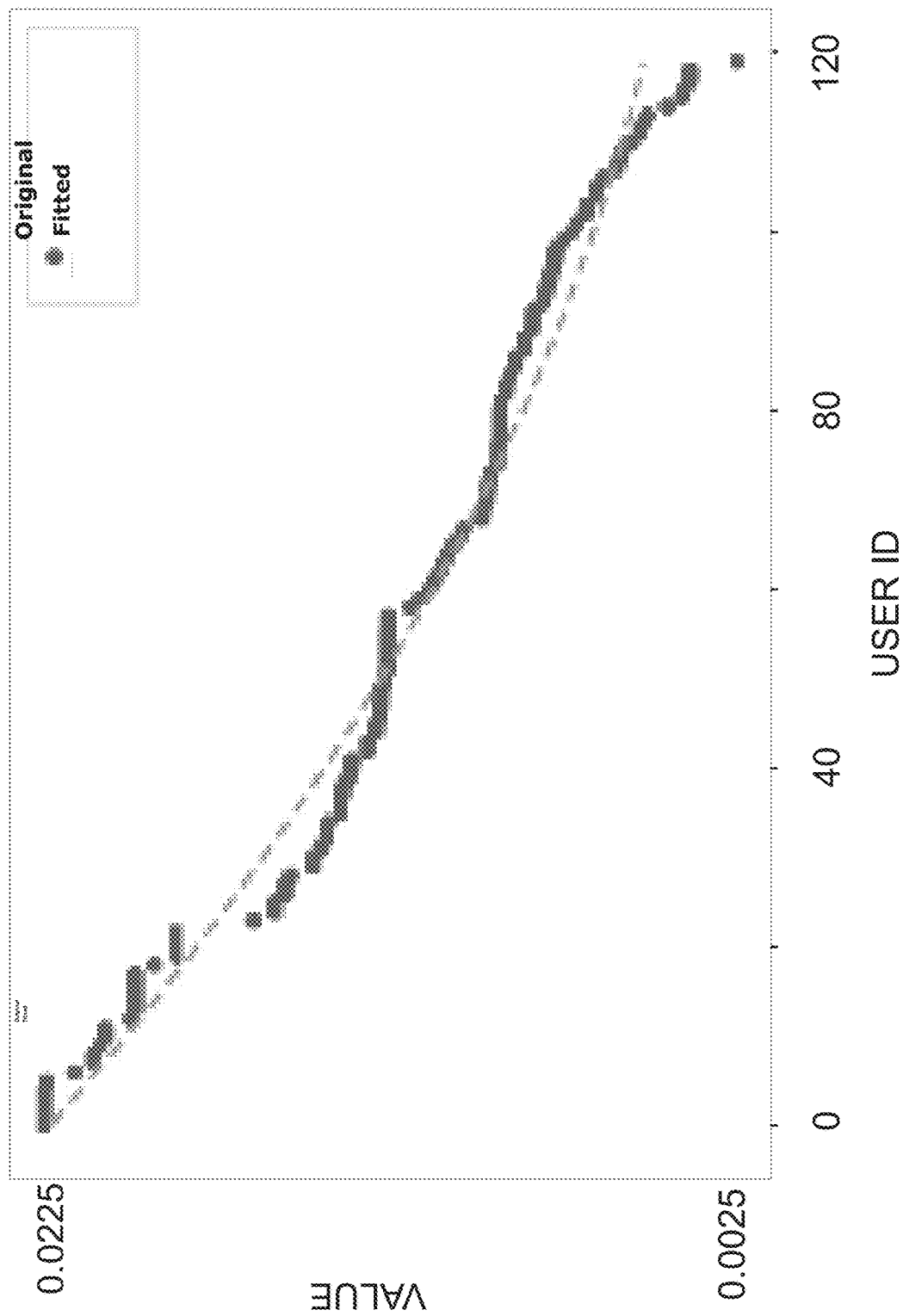
FIG. 2A is a graph that illustrates exemplary value distributions of user profiles synthesized based on Facebook and Google datasets and quadratic fit from the top five (5) associated AdWords.
Figure 2B:
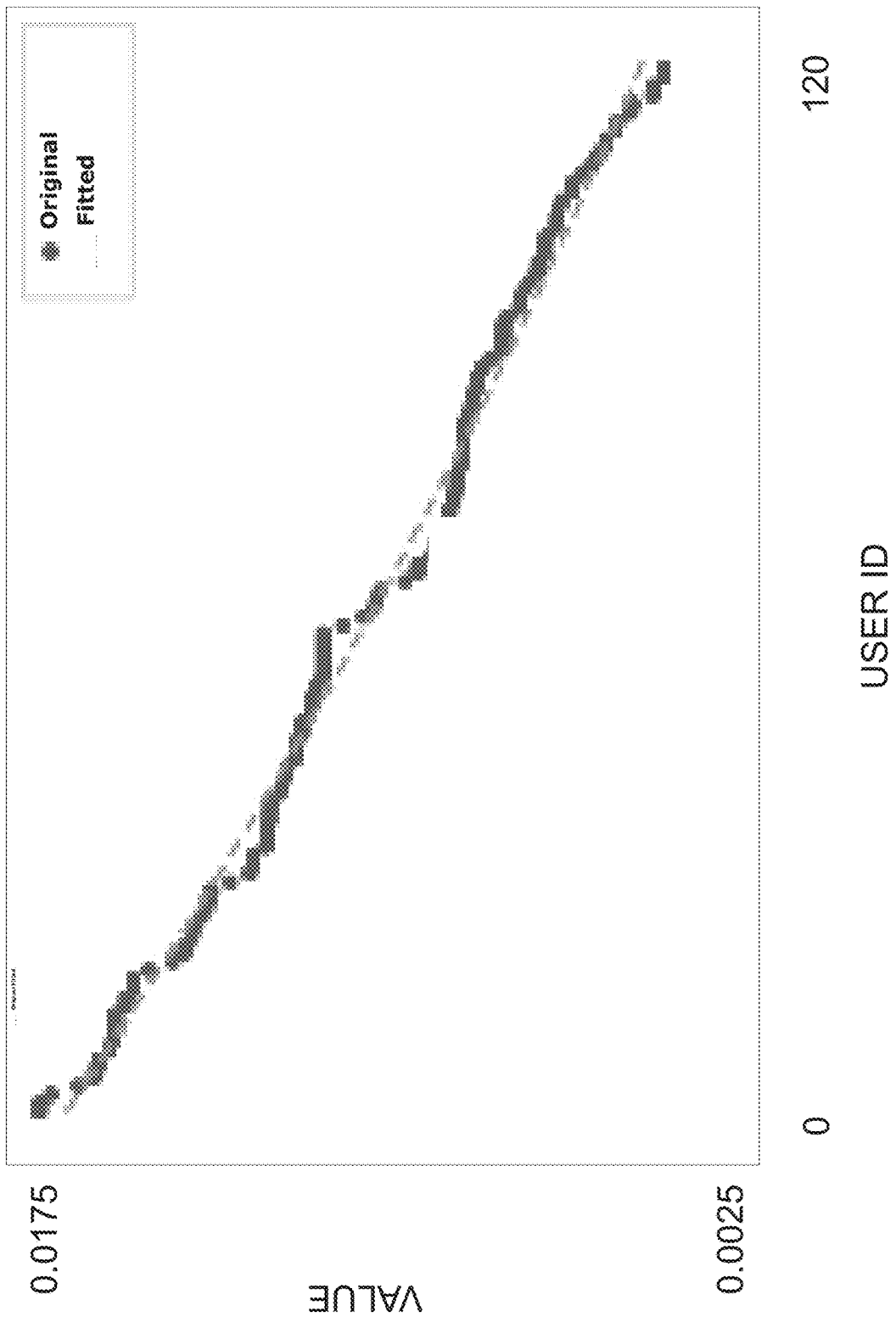
FIG. 2B is a graph that illustrates exemplary value distributions of user profiles synthesized based on Facebook and Google datasets and quadratic fit from the top ten (10) associated AdWords.

The second collected dataset includes one hundred twenty (120) Facebook profiles from the ADS dataset. Each of the profiles has a list of likes and dislikes, which were manually mapped into the list of the harvested Google AdWords. For each profile, the top one hundred (100) most valuable AdWords were strategically selected to reflect each profile's potential interests of buying the associated products. Different advertising schemes were considered: one where each advertisement is randomly drawn from the top five (5) highest-value AdWord categories of interest to the profile, the top ten (10) highest-value categories, the top twenty (20) categories, and all categories. For each advertising scheme, each user may have a specific value, which may be fit using three distributions: quadratic, exponential, and Weibull. FIG. 2A illustrates an example of the top five (5) strategies with quadratic fitting and FIG. 2B illustrates an example of the top ten (10) strategies with quadratic fitting.

User values may vary from provider to provider, from application to application, from economy to economy, and even from season to season (e.g., the pricing of political advertisements on Facebook). Therefore, the goal is not to find the canonical user value distribution. Rather, the described methodology seeks to put together a collection of distributions that best represent the user value distributions synthetized on the collected datasets. As a result, even without knowing the true user value distribution in any particular application, the analysis based on the systems and methods described herein strongly suggests that user values are often nonuniform.

Such nonuniform user value distributions make it possible for content providers to shape their network services to reap significant benefits (e.g., improvements in various metrics, such as economic gain) with minimal impact on the overall social value, especially when facing bandwidth limitations. The systems and methods disclosed herein are fundamentally different from traditional strawman designs, where a content provider may naïvely throttle bottom low-valued users, which is neither socially friendly nor economically optimal. Rather, the disclosed systems and methods facilitate content providers optimization for a combination of various factors that may include the content provider's economic goals, fairness, user experience, QoS, satisfaction of contractual obligations, and/or other factors. For any such hybrid metric, the content provider may compute per-flow allocations by solving a Multiple-Choice Knapsack Problem (MCKP), which may then be enforced by the fShaper module.

Figure 3:
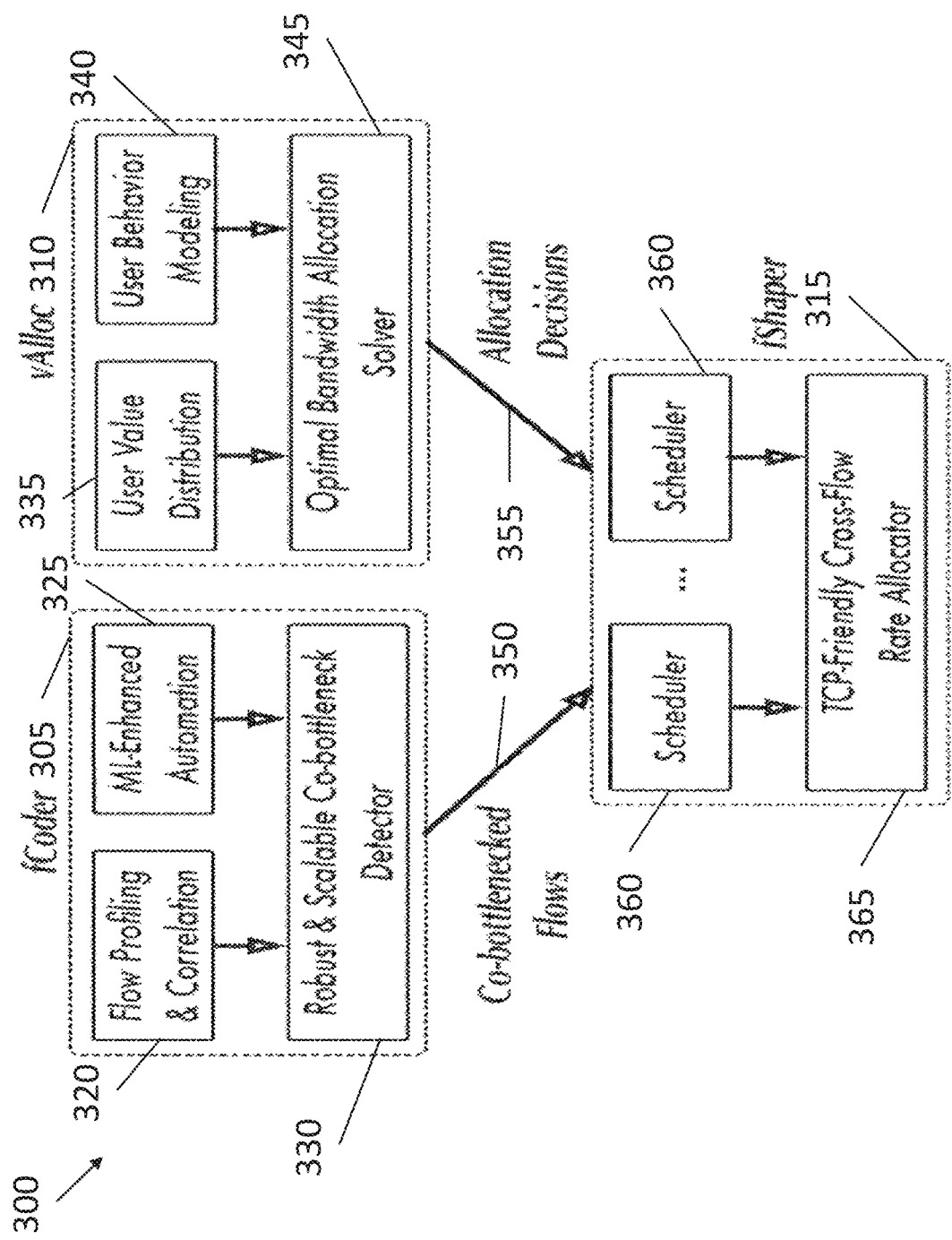
FIG. 3 illustrates an example FlowTele architecture for remotely allocating bandwidth among network users.

FIG. 3 illustrates an example FlowTele architecture 300 for remotely allocating bandwidth among network users. The FlowTele architecture 300 may include an fCoder module 305, a vAlloc module 310, and an fShaper module 315. The fCoder module 305 may include a robust and scalable co-bottleneck detector 330 that is usable in Internet-like networking environments where the routing path and cross-traffic are dynamic and unknown to senders. The co-bottleneck detector 330 may also be accurate. The fCoder module 305 may include a flow profiling and correlation module 320 that may compute a profile for each flow based on a characteristic and/or metric of the flow and/or content consumer or user that is in communication with the content provider via the flow. For example, the flow profiling and correlation module 320 may compute the profile based on at least real-time RTT measurements of the flow, and cross-correlate the profiles to detect co-bottlenecked flow pairs. Because cross-correlation is computationally expensive, in certain aspects, a twin neural network may be trained and deployed in an fCoder-ML module 325 to promptly produce a set of candidate co-bottlenecked flow pairs, enabling large-scale deployment of the fCoder module 305 with millions of flows.

The vAlloc module 310 may include an optimal bandwidth allocation solver 345 that features a metrics-aware (e.g., value-aware, economically-aware, socially-aware, etc.) bandwidth allocation scheme that facilitates content providers to optimize a hybrid metric, including user value and other metrics (e.g., QoS, user experience, fairness, etc.) subject to bandwidth limitations. In certain aspects, the vAlloc module may be utilized in a video-streaming context, as video streaming is the most bandwidth-constrained application in today's Internet. However, the methodology of the vAlloc module may be generically extensible to optimize allocations for any user value distribution and/or user behavior model as experienced and evaluated by a content provider. The optimal bandwidth allocation solver 345 may receive data from a user value distribution module 335 and user behavior modeling module 340 and use the received data in computing the bandwidth allocation.

The fCoder module 305 may provide data to an fShaper module 315 regarding co-bottlenecked flows 350, and the vAlloc module 310 may provide data to the fShaper module 315 regarding allocation decisions 355 made for bandwidth allocations. The fShaper module 315 may use the set of co-bottlenecked flows 350 determined by the fCoder module 305 and use the allocation decisions 355 determined by the vAlloc module 310 to compute the target bandwidth allocations, and shape outbound network traffic to achieve these target allocations subject to TCP fairness. The fShaper module 315 may build on TCP Cubic to provide cross-traffic TCP friendliness while also sending traffic that may be accepted by an off-the-shelf TCP client implementation. As an entirely sender-based mechanism, the fShaper module 315 may rely on neither in-network support nor special receiver implementations, yet the fShaper module 315 may effectively transfer bandwidth allocations from one set of flows to another without impacting TCP-friendliness and without increasing the burstiness of TCP flows (e.g., fShaper flows may be less bursty than TCP). The fShaper module 315 may configure one or more of the plurality of schedulers 360 to use the CFCR algorithm discussed herein to compute a set of changes to congestion control parameters that drive the sending rate of each flow toward target sending rates as determined by the vAlloc module 310. The schedulers 360 may also be configured to assist with interfacing with one or more congestion control protocols. The fShaper 315 may include a TCP-Friendly cross-flow rate allocator 365 that coordinates routing the schedules generated by the schedulers 360 to the co-bottlenecked flows.

Evaluation of the FlowTele may be based in part on a network emulation platform that integrates an emulated network environment entirely within our control with the real Internet so that flows on the platform may still experience unpredictable cross-traffic and possibly routing changes. On this platform, experiments may be run with different settings (e.g., settings for topologies and/or link capacities) by reconfiguring emulated networks, while still sending traffic through the Internet.

Figure 4:
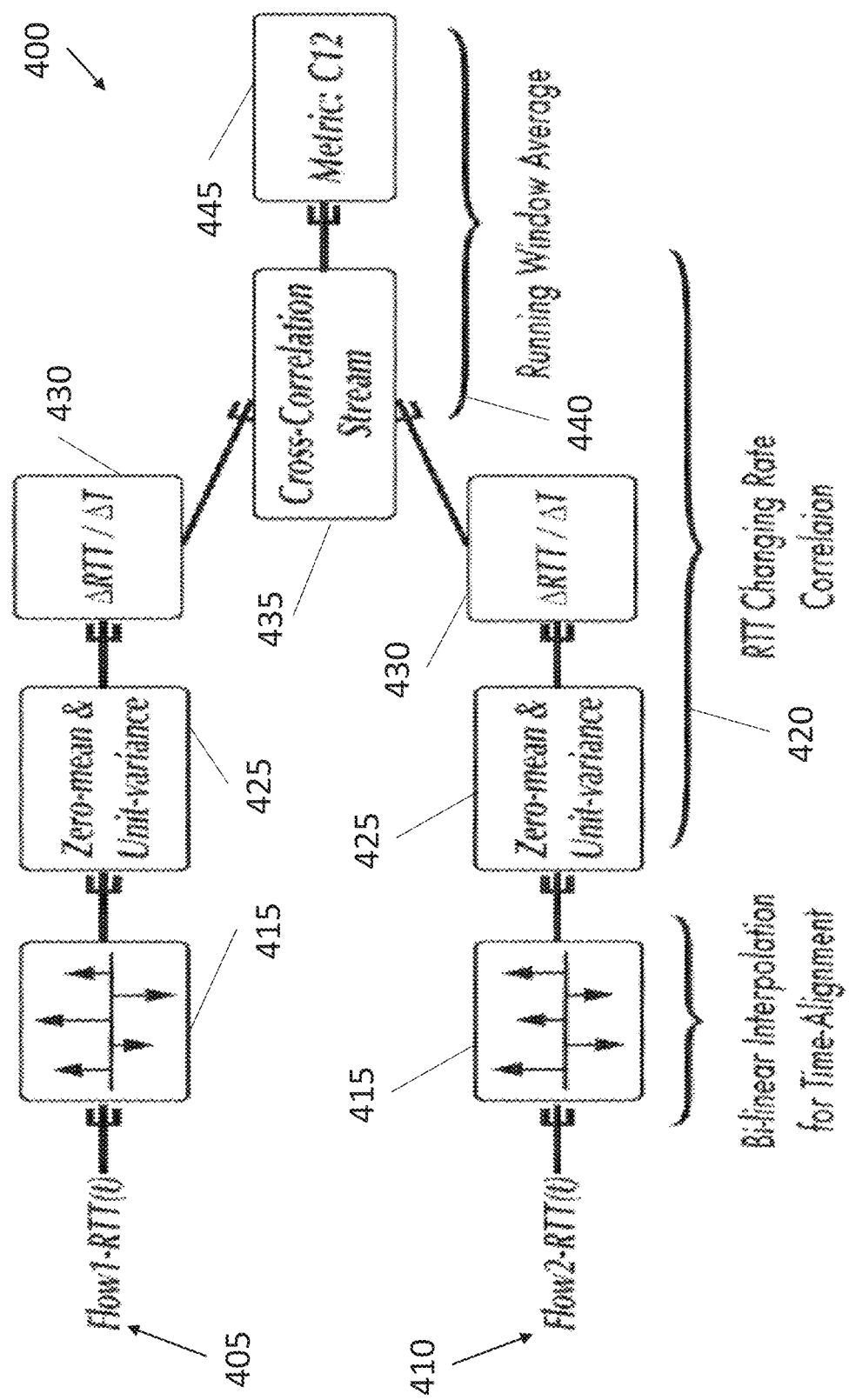
FIG. 4 is a flow diagram illustrating a profiling procedure in a co-bottleneck detector fCoder module.

FIG. 4 is a flow diagram illustrating an exemplary profiling procedure 400 in a co-bottleneck detector fCoder module. Internet-scale co-bottleneck detection is challenging due to dynamic and unknown cross traffic and routing. The fCoder module may build on the insight that when two flows 405, 410 traverse the same bottleneck link, the queuing-induced latency at that bottleneck link will vary over time and be experienced similarly by both flows. Thus, the fCoder module may detect co-bottlenecks using a correlation mechanism based on time-domain samples of the round-trip-time (RTT), as illustrated in FIG. 4. For each flow, the fCoder module may measure the RTT of each packet that has not been retransmitted, linearly interpolate those samples to obtain a continuous function, normalize them to zero-mean and unit-variance, and compute the rate at which RTT changes over time, which the fCoder module may use as the RTT profile for that flow. For any two flows, the fCoder module may then correlate these profiles to calculate the average correlation values within a sliding window, which is the co-bottleneck metric for that flow pair. Specifically, to handle time-shifts in latency to the bottleneck link, cross-correlation may be used to find the peak correlation for time shift within an interval.

The profiling procedure 400 may operate on two flows, for example, a Flow1 405 and a Flow2 410. A pair of alignment units 415 may receive round-trip time (RTT(t)) information pertaining to the two flows 405 and 410 and perform bi-linear interpolation for time alignment of the flows 405 and 410 with one another. An RTT changing rate correlation section 420 includes a zero mean & unit-variance module 425, a $\Delta RTT/\Delta T$ module 430, and a cross-correlation stream module 435 to perform cross-correlations of the Flow1 405 and Flow2 410. A running window average 440 may be computed and a metric C12 445 may be computed from the cross-correlation stream 435. The output from the profiling procedure 400 may be incorporated into the profiles of the flows that are processed and used to determine if flows are co-bottlenecked and to determine how their bandwidth allocations should be set in order to optimize a global metric, such as user value (e.g., economically, socially, demographically, reputationally, engagement-wise, content contribution-wise, etc.).

Several Internet-scale experiments may be performed to demonstrate the effectiveness of the fCoder module. The network topology may be controlled to create two cases where (i) a set of flows, with a high probability, do share a bottleneck link, and (ii) a set of flows, based on speed-of-light constraints on packet forwarding, may not share any common links.

Figure 5:
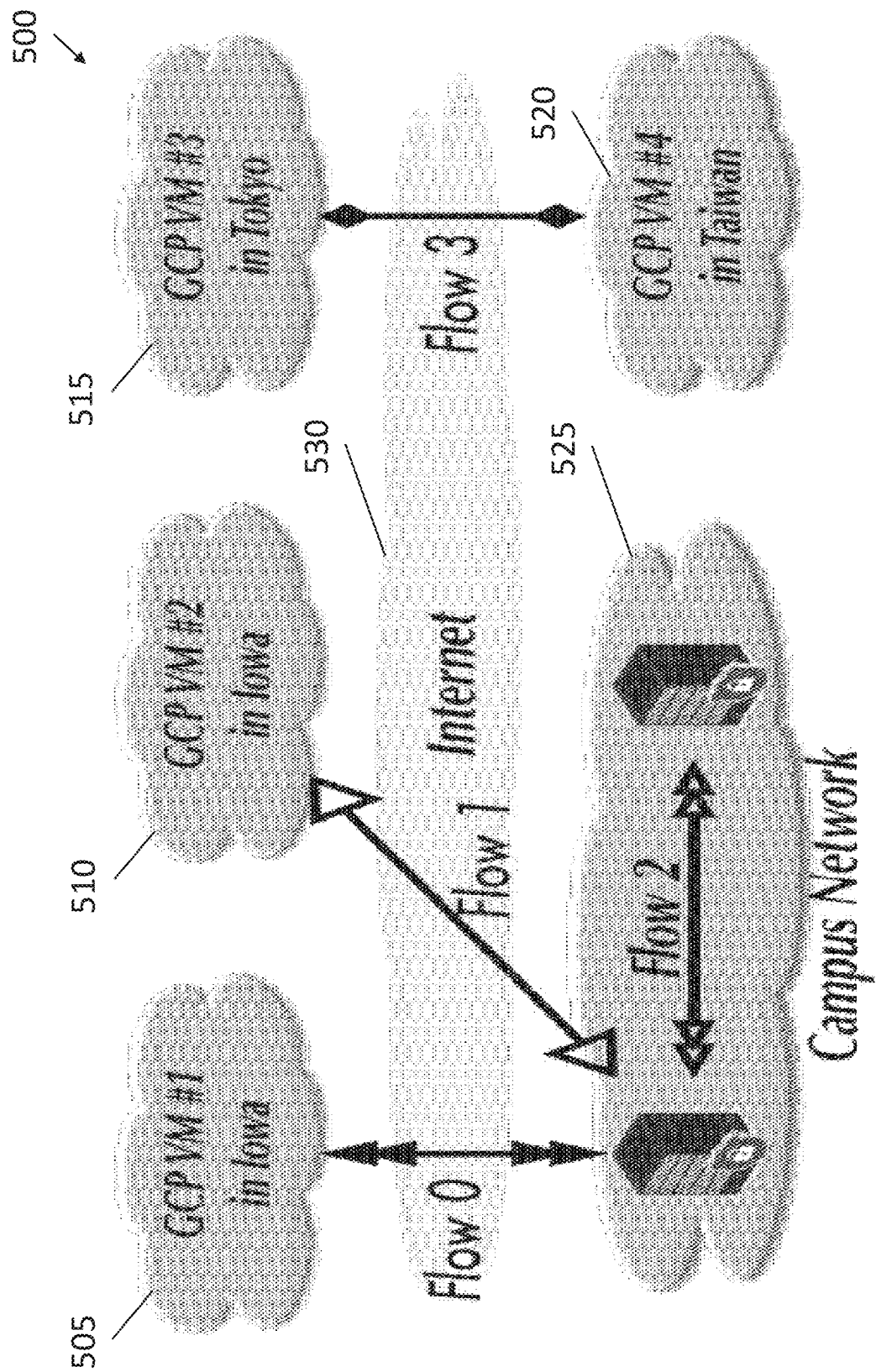
FIG. 5 illustrates a topology of an example computing network.

FIG. 5 illustrates a topology of an example computing network 500. The computing network 500 includes subnetworks that are interconnected with one another, including a first Google Cloud Platform (GCP) virtual machine (VM) 505 in Iowa, a second GCPVM 510 in Iowa, a third GCPVM 515 in Tokyo, a fourth GCPVM 520 in Taiwan, and a campus network 525. The four GCPVMs 505, 510, 515, 520 and the campus network 525 are interconnected via a computing network, e.g., the Internet, 530. Data or content transmitted from one or more computing devices in a first subnetwork to one or more computing devices in a second subnetwork via the Internet 530 or from one or more computing devices to another one or more computing devices solely within a subnetwork without being transmitted via the Internet 530 are referred to as flows, e.g., Flow 0, Flow 1, Flow 2, and Flow 3.

Figure 6A:
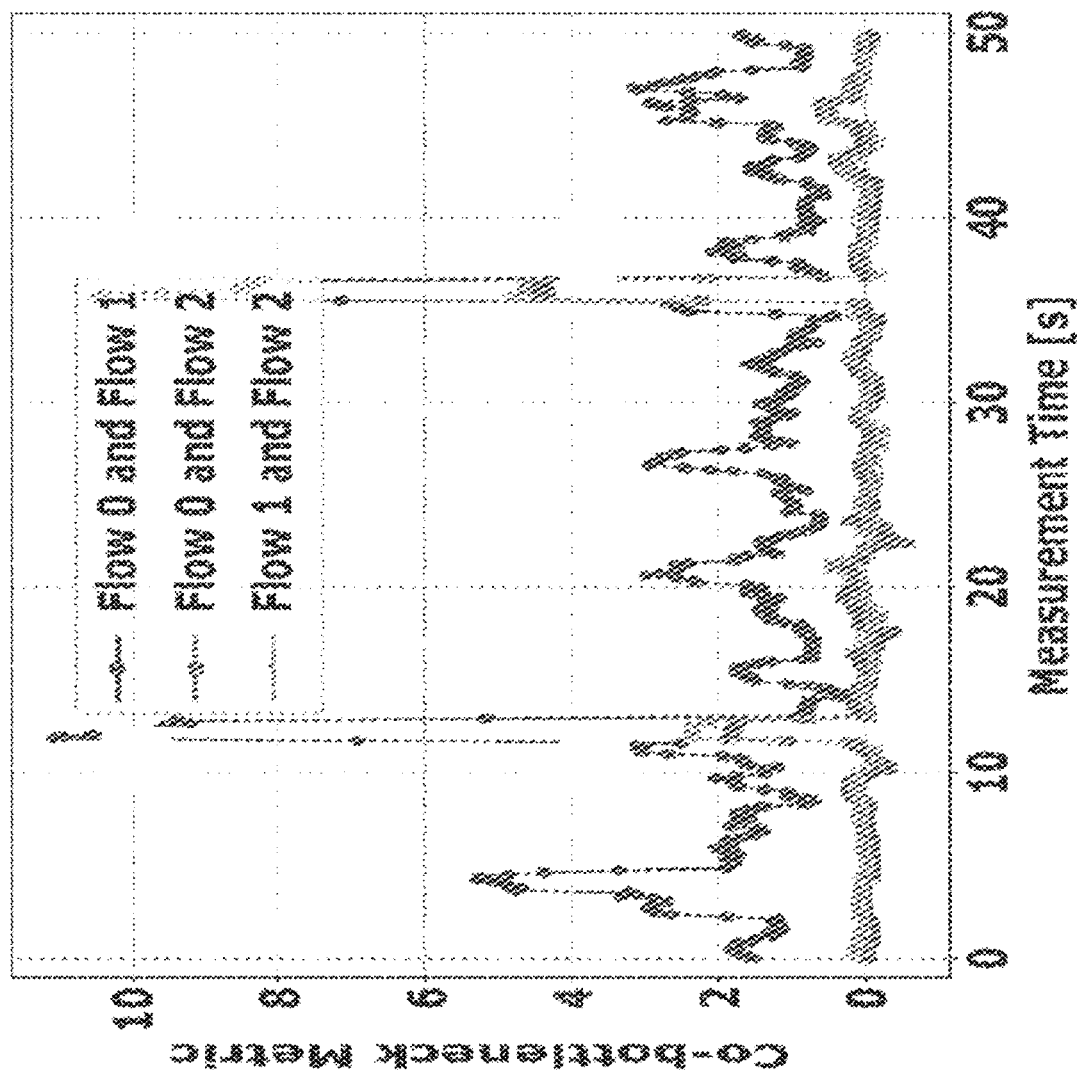
FIG. 6A is a graph illustrating exemplary co-bottleneck metrics for flow pairs of $\{f_0, f_1, f_2\}$ of FIG. 5.

A first set of flows $S_1 = \{f_0, f_1, f_2\}$ may be sent from a campus network, with two flows sent to virtual machines (VMs) deployed on the Google Cloud Platform (GCP) Iowa, and one flow going to another on-campus host. Flow statistics may be collected, the co-bottleneck metrics for all pairs of flows may be computed and plotted against time, as illustrated in FIG. 6A. The results show that the co-bottleneck metric between $f_0$ and $f_1$ is much greater than that of $\{f_0, f_2\}$ and $\{f_1, f_2\}$. This is consistent with expectations that two flows sending to the VMs located in the same GCP region may tend to be co-bottlenecked upstream of the campus network, whereas the on-campus flows and off-campus flows are less likely to be co-bottlenecked. From time to time, all flows may experience co-bottlenecks due to on-campus congestion or WiFi congestion. The results, for example, appear to show brief periods of such co-bottlenecks.

Figure 6B:
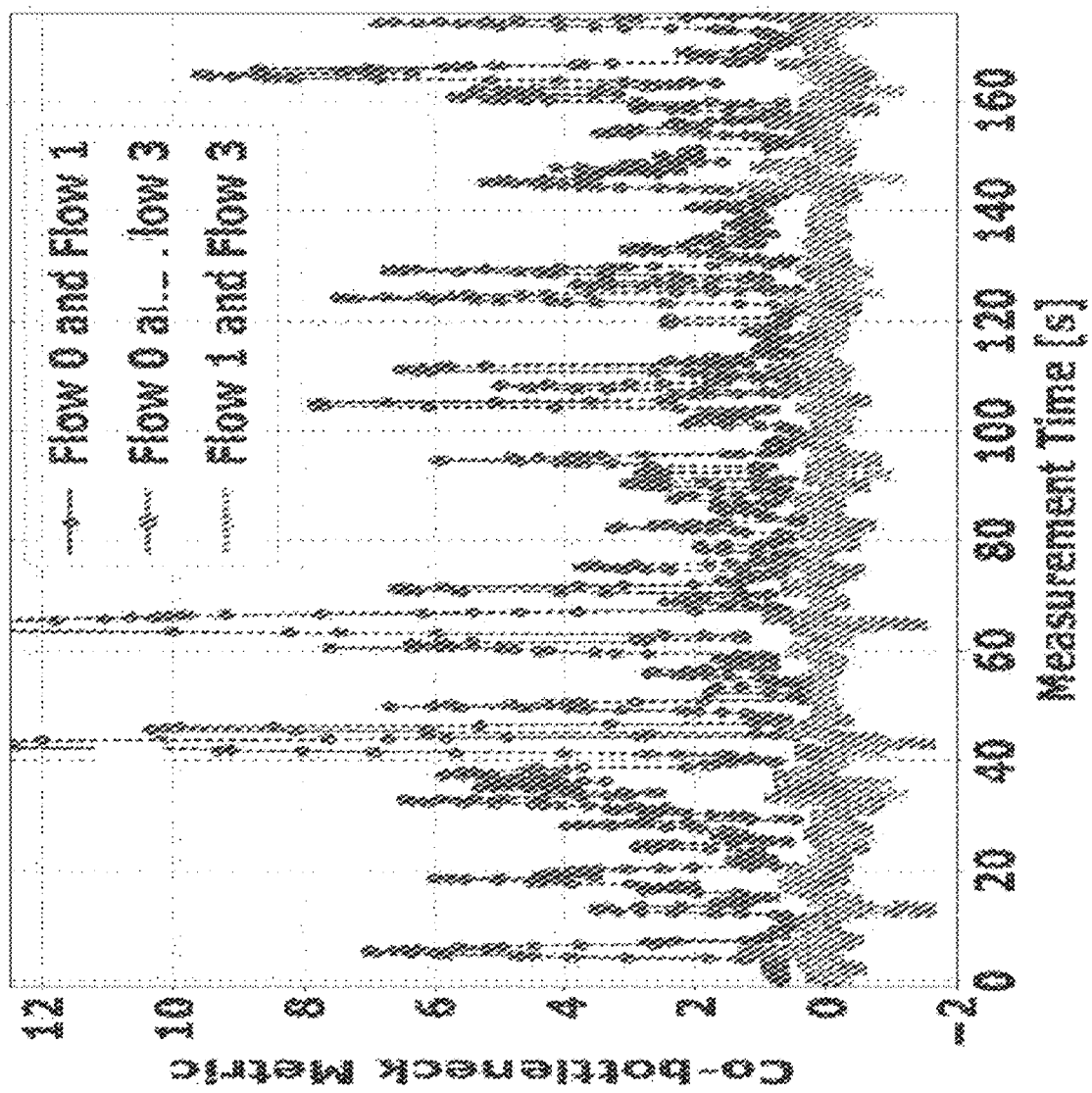
FIG. 6B is a graph illustrating exemplary co-bottleneck metrics for flow pairs of $\{f_0, f_1, f_3\}$ of FIG. 5.

The second group of flows is $S_2 = \{f_0, f_1, f_3\}$. The flow $f_3$ may, for example, be set up in Asia so that its packets and packets of $f_0$ and $f_1$ may not traverse the same link, as long as packets cannot travel faster than the speed of light. The RTTs may be monitored to ensure that they stay low enough to provide the non-co-bottleneck guarantee. The results, as shown in FIG. 6B, show very low correlation metrics for the guaranteed non-co-bottlenecked flow pairs.

Though correlating flows' normalized RTT metrics may result in accurate co-bottleneck detection, such correlation may be relatively computationally expensive. For example, in sample Internet-scale runs with 100 Mbps flows, correlating thirty (30) seconds of data for a single flow pair may take about ten (10) ms on an Intel Core i7-8569U computing processor. Thus, in a datacenter with a large number of flows, computing these correlations for all flow pairs for every sliding window may be computationally infeasible, since for n flows, we need to consider O(n2) flow pairs. Machine Learning, however, may reduce the number of candidate flow pairs to improve the computational performance of co-bottleneck detection.

For example, in certain aspects, a twin neural network may be trained and deployed. The twin neural network may be based on a Siamese network structure to improve co-bottleneck detection scalability. An autoencoder may first be trained to study how much the $\Delta RTT$ sequence of each flow may be compressed while still preserving the unique characteristics of each flow. Then, using the same neural network structure as the encoder part of the autoencoder, a twin neural network may be trained to capture the $\Delta RTT$ similarity between two flows using the loss function:

$$L_{func} = (1-Y) \cdot L_2(f_1, f_2) \cdot P_{weight} + Y \cdot \max\{0, \text{margin} - L_2(f_1, f_2)\},$$

where $L_2(f_1, f_2)$ is the L2-norm of the flow pair $(f_1, f_2)$'s $\Delta RTT$ profiles, Y is the label assigned for the flow pair (Y is set to 0 if the flow pair is co-bottlenecked and 1 otherwise), and margin is a predefined ceiling for the L2-norm of any flow pairs.

Thus, the loss function represents $L_2 (f_1, f_2)$ if the flow pair shares a bottleneck, and otherwise it represents the difference between $L_2 (f_1, f_2)$ and margin. Therefore, the training process may minimize $L_2 (f_1, f_2)$ if they share a bottleneck or push $L_2 (f_1, f_2)$ to at least the predefined (large) margin if they are not co-bottlenecked. In the loss function, a configurable weight $P_{weight}$ may be added to the co-bottlenecked term.

To generate data for training and validation of the neural network, an ns-3 simulator may be used to build a variety of network topologies based on both the Internet Topology Zoo (ITZ) and the Brite topology generator. Both the number of controlled flows and cross-path flows may be randomized while ensuring that the total rate of controlled flows is about 10% of the total rate of the cross traffic. For each topology, a simulator may first determine whether two controlled flows share a co-bottleneck based on the routing and link capacity, and then start the flows to collect their RTT data. Overall, in an exemplary simulation, over 9,000 scenarios were simulated in about 80 topologies, and over 13 million RTT data points were collected for more than 80,000 flows, as shown in Table 1 below.

TABLE 1

| Topology Type | Number of Topologies | Number of Scenarios | Number of Flows | Number of Data Points |
|---|---|---|---|---|
| ITZ | 64 | 8064 | 76608 | 12.5 million |
| Brite | 15 | 630 | 3780 | 1.1 million |

Figure 7A:
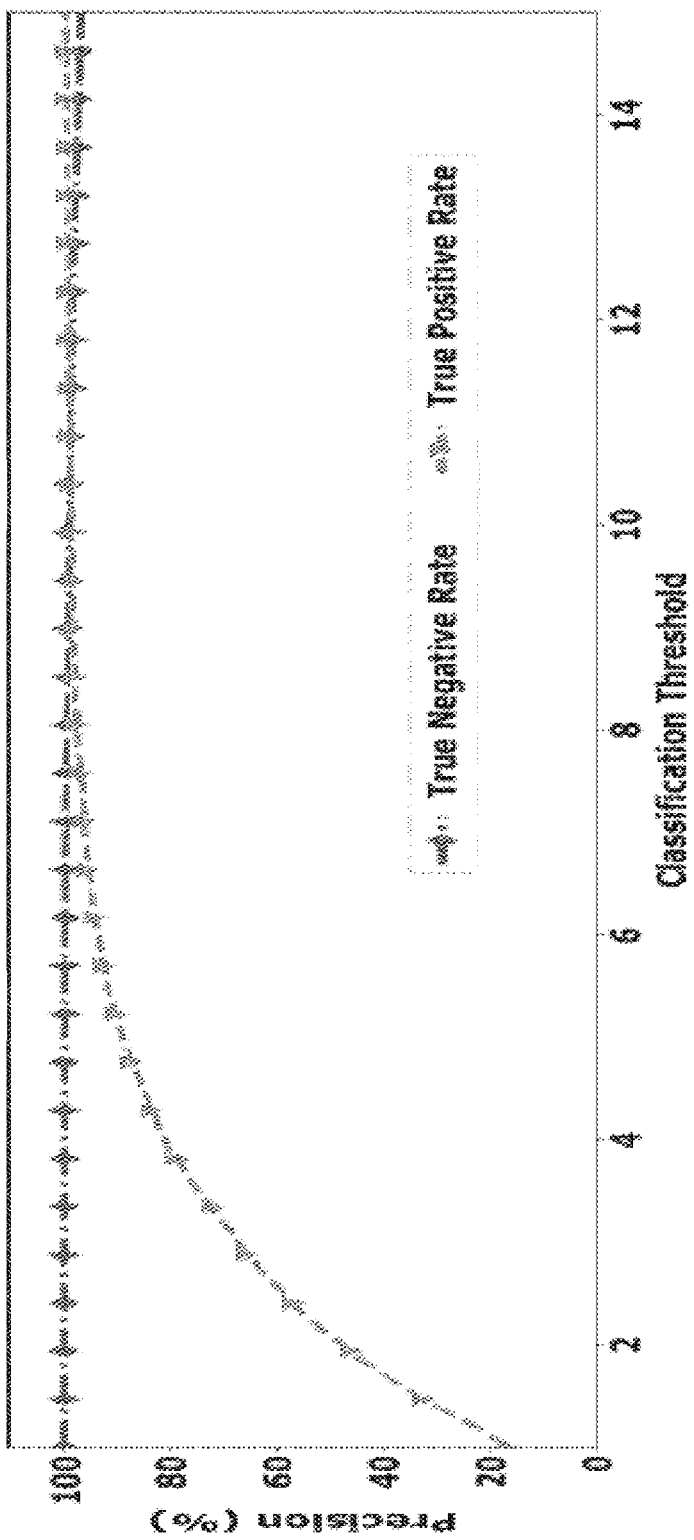
FIG. 7A is a graph illustrating exemplary classification performance of a co-bottleneck detector fCoder module with machine learning.
Figure 7B:
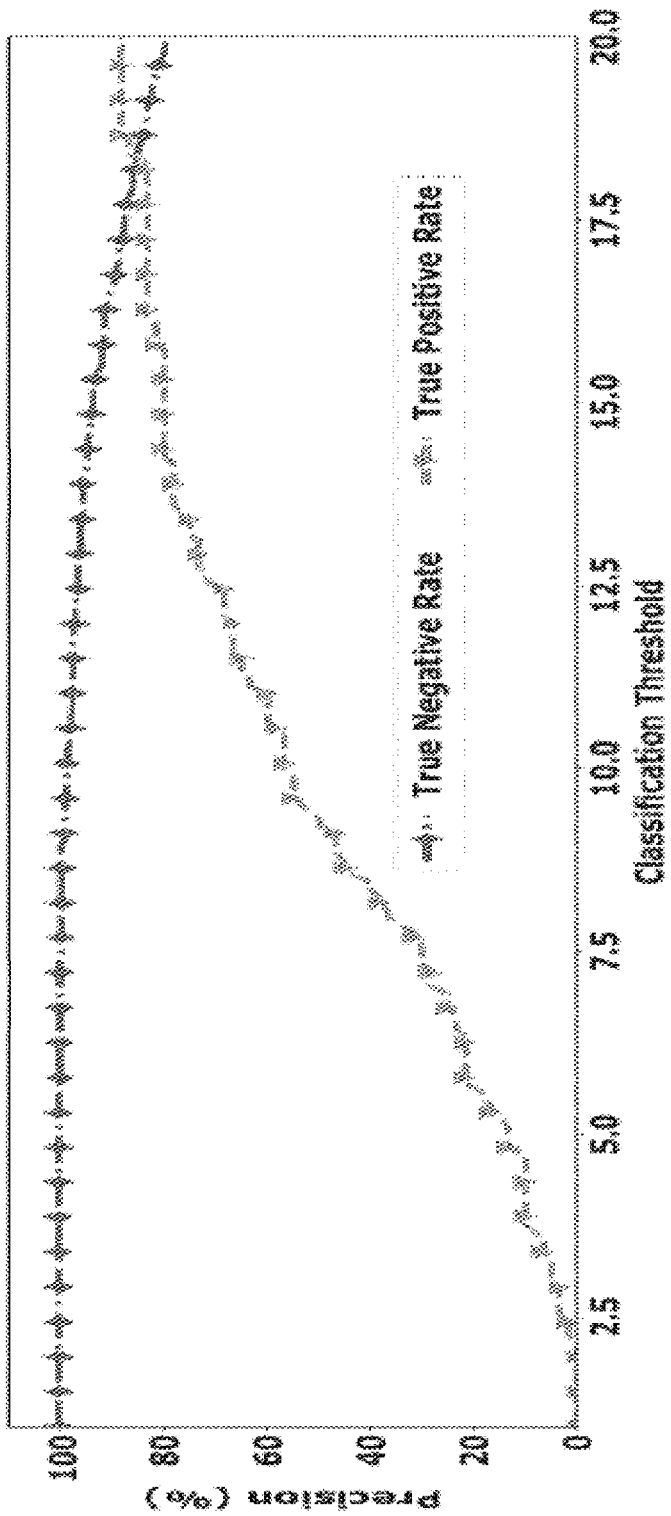
FIG. 7B is a graph illustrating exemplary classification performance of a transferred model of a co-bottleneck detector fCoder module with machine learning.

FIG. 7A is a graph illustrating classification performance of an exemplary co-bottleneck detector fCoder module with machine learning. FIG. 7B is a graph illustrating classification performance of a transferred model of an exemplary co-bottleneck detector fCoder module with machine learning. The final trained twin neural network may have three dense layers, which compress the input data by over 84% to make decisions on flow groups. For instance, on a GTX 1080 Ti processor with Ryzen 7 3800X, the fCoder-ML module, without any optimization of matrix manipulations, may process 12,000 flow pairs in less than 300 μs, which is a negligible time duration compared to the typical duration of streaming videos, and about 40,000 times faster than the cross-correlation of the fCoder module. Reported herein is the classification performance of an exemplary fCoder-ML module that is trained and validated on a dataset of just over 320,000 flow pairs, amongst which approximately 8,000 flow pairs are co-bottlenecked (as inferred from our topologies). About half of the data in this example is used as the training set and the rest is used as the validation set. FIGS. 7A and 7B depict the mean average precision for various classification thresholds.

The training set and loss function may aim for a very high true negative rate, because among n2 flow pairs, even a small false positive rate may result in a large number of false positive pairs. As a result, the fCoder-ML module may have a true negative rate over 99.9% across a wide range of classification thresholds, to prevent the fCoder module from wasting computational resources on verifying false positives. Further, at higher classification thresholds, the true positive rate may improve drastically while the false positive rate may remain very low. This may show that the fCoder-ML module may provide many candidates for co-bottlenecked flows for cross-flow bandwidth allocation.

The fCoder-ML modules' neural network may include both generic components and those that are specific to the content provider's network. Training such a neural network may take a significant amount of data. The use of transfer learning was evaluated to speed the training of the fCoder-ML module. To determine the effectiveness of transfer learning, a model trained on the dataset collected in the simulated network was implemented, and it was utilized together with a small amount of data from a real-world dataset. In deep neural models, transfer learning may typically fix the first few layers of the original model and tune only the remaining layers during the training process. A similar approach was implemented here, collecting an RTT dataset from over 600 flow pairs traversing the Internet, of which around 100 flow pairs are co-bottlenecked. For example, 45% of the data was used for transfer learning and the remaining data was used for validation to plot the training performance in FIG. 7B. The transferred model may demonstrate satisfactory classification performance on the real-world RTT dataset, despite being partially trained on only simulated data.

In today's Internet, the most common bandwidth-constrained application may be video streaming. Researchers have shown that in video streaming, buffering significantly outweighs video quality as the determining factor in a user's willingness to continue to watch the stream. As a result, even brief periods of reduced bandwidth may significantly impact the QoS, user experience, reputation, and revenues of content providers. The vAlloc module may include a metrics-optimized (e.g., QoS-optimal, user-experience-optimal, or economically-optimal) bandwidth allocation strategy for video streaming providers under bandwidth constraints. The design of vAlloc is not limited to any specific application; rather, other user value distributions and user behavior models may be plugged into its generic framework to allocate bandwidth in a variety of bandwidth-constrained environments.

Figure 8:
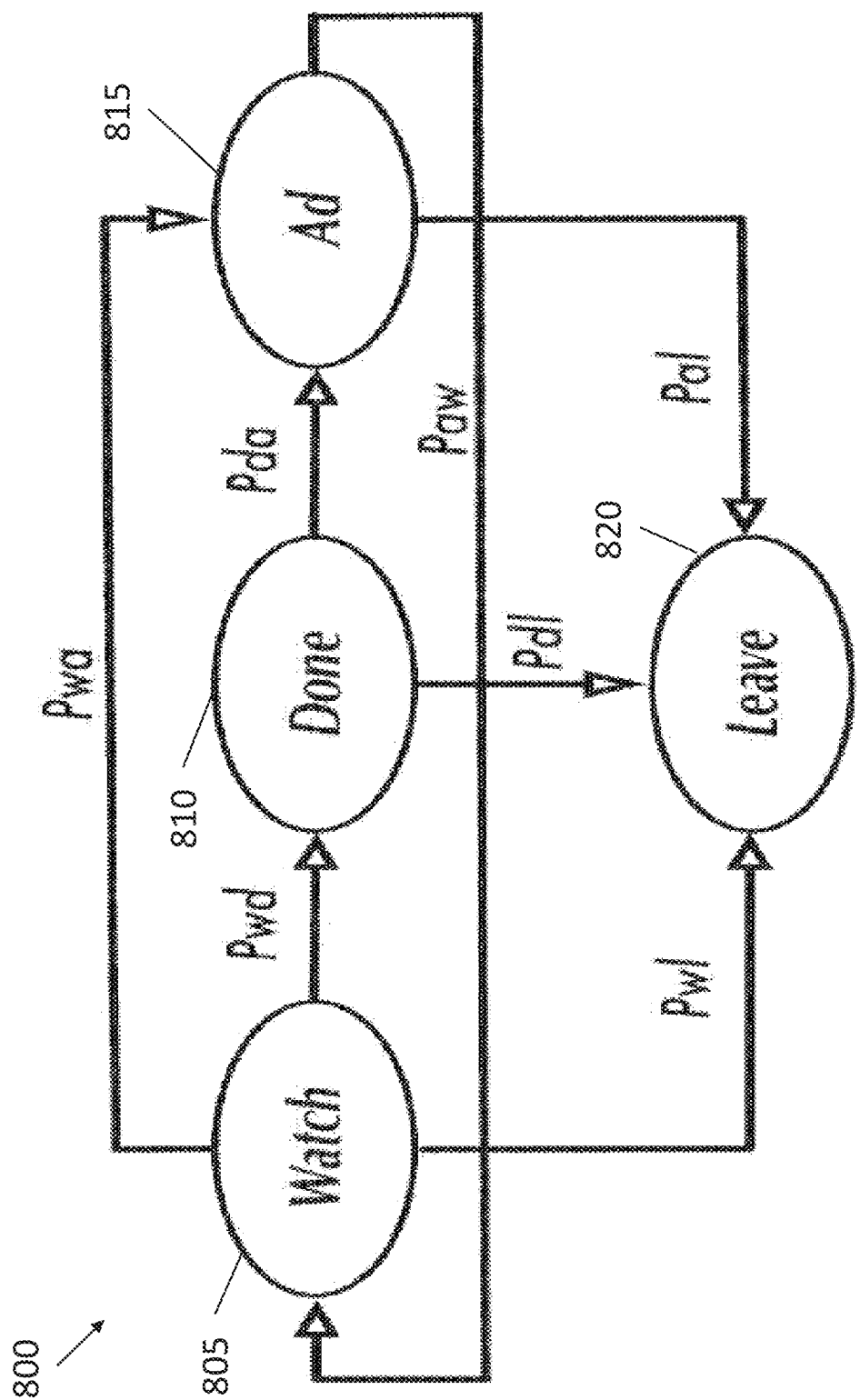
FIG. 8 illustrates an exemplary finite state machine for modeling user behavior in video streaming applications.

FIG. 8 illustrates an exemplary finite state machine 800 for modeling user behavior in video streaming applications. In order to quantify the impact of various bandwidth allocation approaches on provider metrics (e.g., QoS, user experience, user satisfaction, user reputation, and provider revenues), user behavior for video streaming applications may be modeled based on the Finite State Machine shown in FIG. 8. In the model, a user may progress through various states in its streaming process, labeled Watch 805 (e.g., when the user watches content) and Ad 815 (e.g., when the user watches an advertisement or other brief content inserted within a longer duration content). In addition, there are two transient states: Done 810 representing when the current video content has finished playing and Leave 820 representing when the user leaves the current session. Since traffic management may only impact the streaming quality, in this model, different bandwidth allocations may only affect a user's willingness to continue to watch the video content and advertisement or other briefer video content embedded within the video content (e.g., the two transition probabilities $p_{wl}$ and $p_{al}$ in the state machine). Other model parameters, specifically $p_{dl}$, may drive the metrics model (e.g., revenue model). For example, if $p_{dl}=0$, then the user's watching time may be entirely driven by video quality metrics, while if $p_{dl}=1$, each user may watch at most one ad (e.g., briefer duration video content than the longer duration video content in which it is embedded), and the bandwidth allocation policy may not have any impact on a user's metrics (e.g., satisfaction, reputation, and/or advertising value).

Buffer time and playback bitrate (e.g., driven largely by video resolution) may affect user engagement. Such data was used to model $p_{wl}$ and $p_{al}$ using the simplified methodology in an example described below. In a real deployment, content providers may have even more comprehensive data about each user, such as a user's preferred video type and its impact on the playback bitrate and their willingness to stay given lower resolution or long buffering time, so content providers may customize transition probabilities on a per-user basis.

In an example, several network traces from downloading YouTube videos over residential networks were collected to determine representative user bandwidth distributions. These network traces were sampled on 100 ms intervals for generating a Markov model that models the amount of bandwidth available in each interval and its variability over time. The buffering fraction was then calculated for a variety of selected playback bitrates and maximum allowed buffer times, by simulating network conditions drawn from the Markov model and computing the resulting buffer times. A range of bitrates based on typical video resolutions and buffer times ranging from 0.1-8 seconds were considered. Then, based on the computed buffer times, a buffering experience was derived (e.g., the buffering experience represented by the frequency and ratio of buffering events experienced by a user during the streaming session). Then, based on the measurements, which quantifies user watching time with respect to its buffering experience, the profile tuple (buffer, bitrate, bandwidth) of a user was translated to its watching time. Finally, the video watching time was translated to a departure probability by assuming that the user's departure is a Poisson process with parameter $\lambda$ being the watching time of the user. Then, for any given video length, a $p_{wl}$ for the user may be computed given its profile tuple.

Figure 9A:
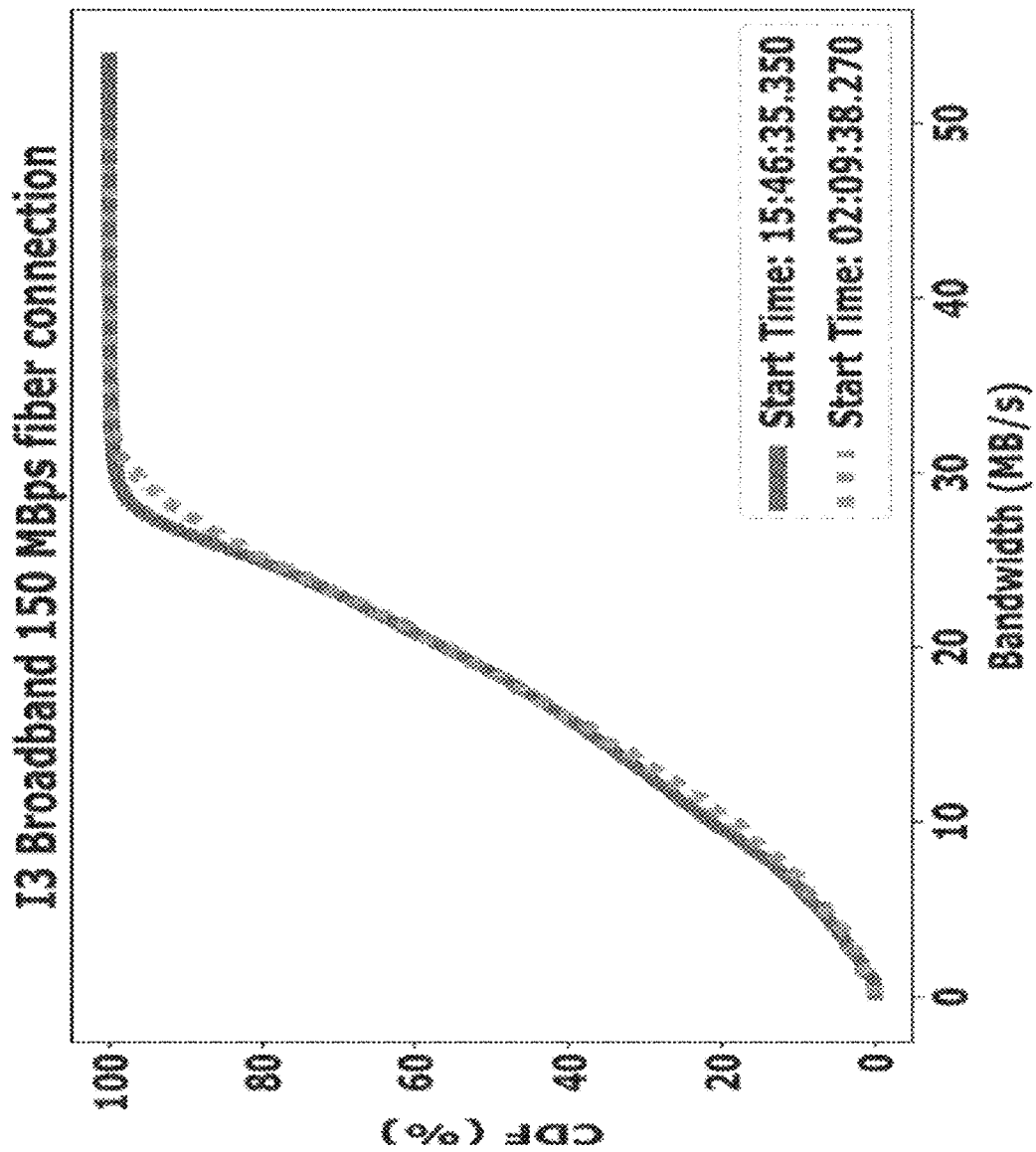
FIG. 9A is a graph illustrating an example of bandwidth distributions.
Figure 9B:
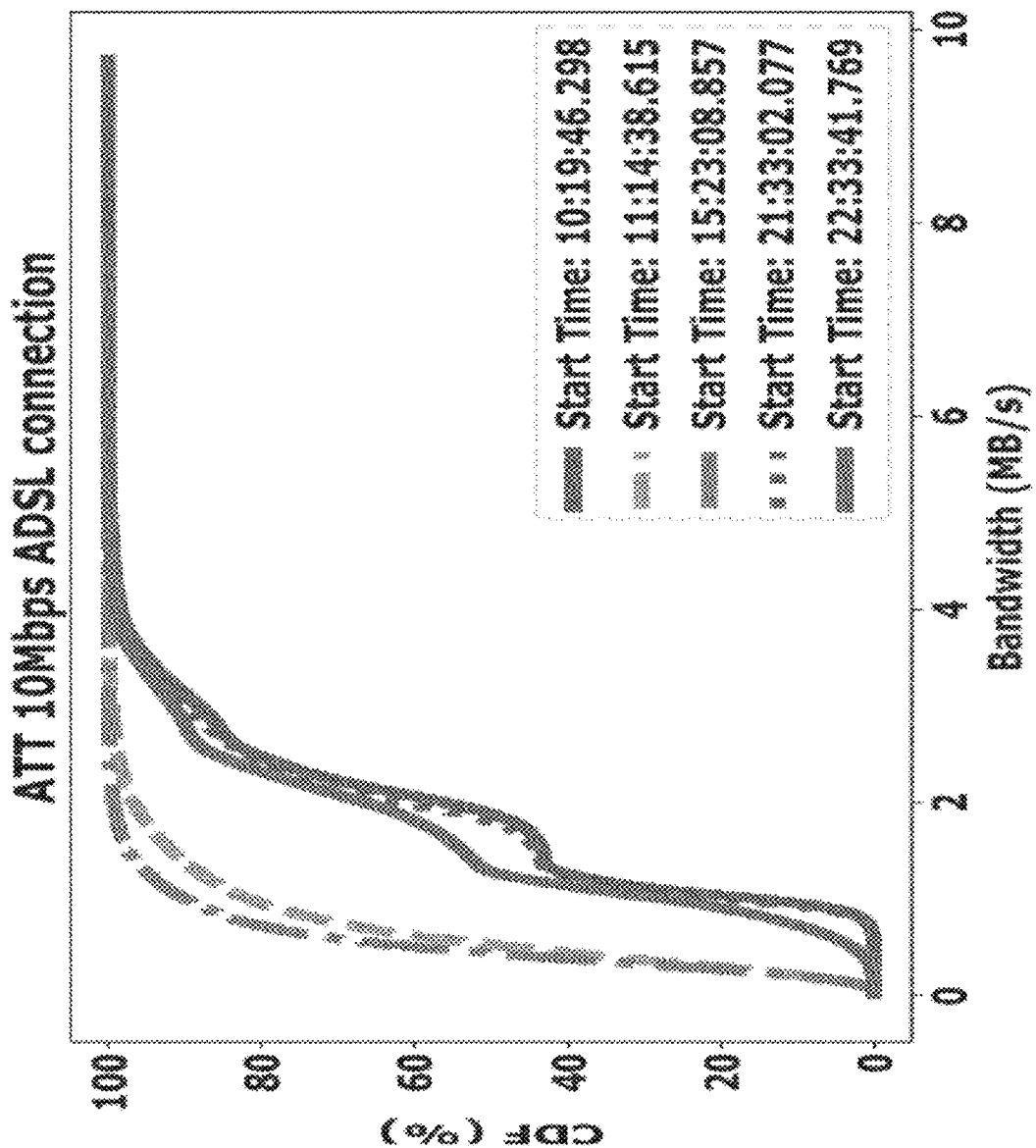
FIG. 9B is a graph illustrating another example of bandwidth distributions.

FIGS. 9A and 9B illustrate exemplary bandwidth distributions collected for different network conditions and different times of day in the example. While generating various users with varying profile tuples, a range of distributions was synthesized by linearly scaling the measured bandwidths to consider various network conditions (e.g., last-hop capacities).

Figure 10A:
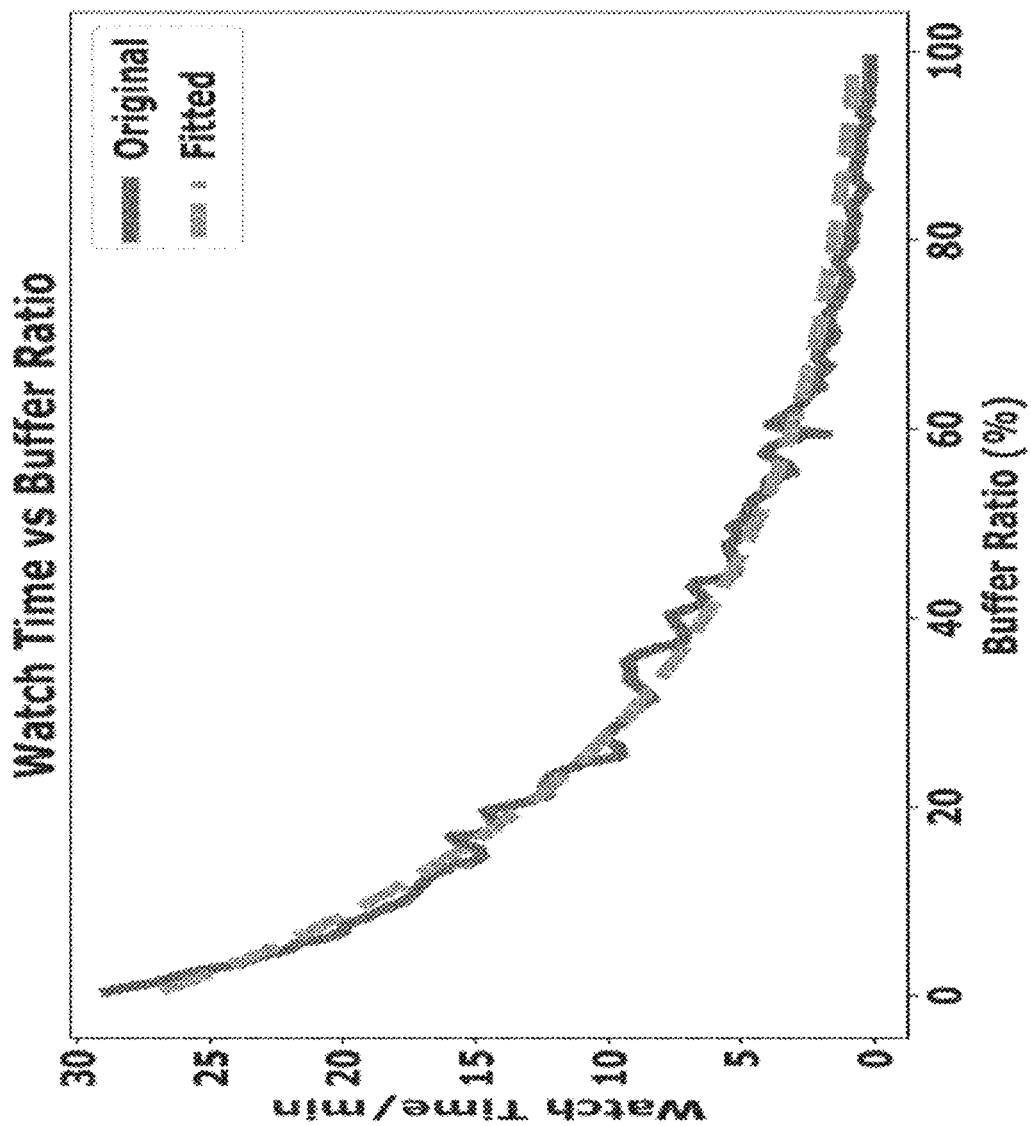
FIG. 10A is a graph illustrating an example fitted curve for watch time versus buffer ratio.
Figure 10B:
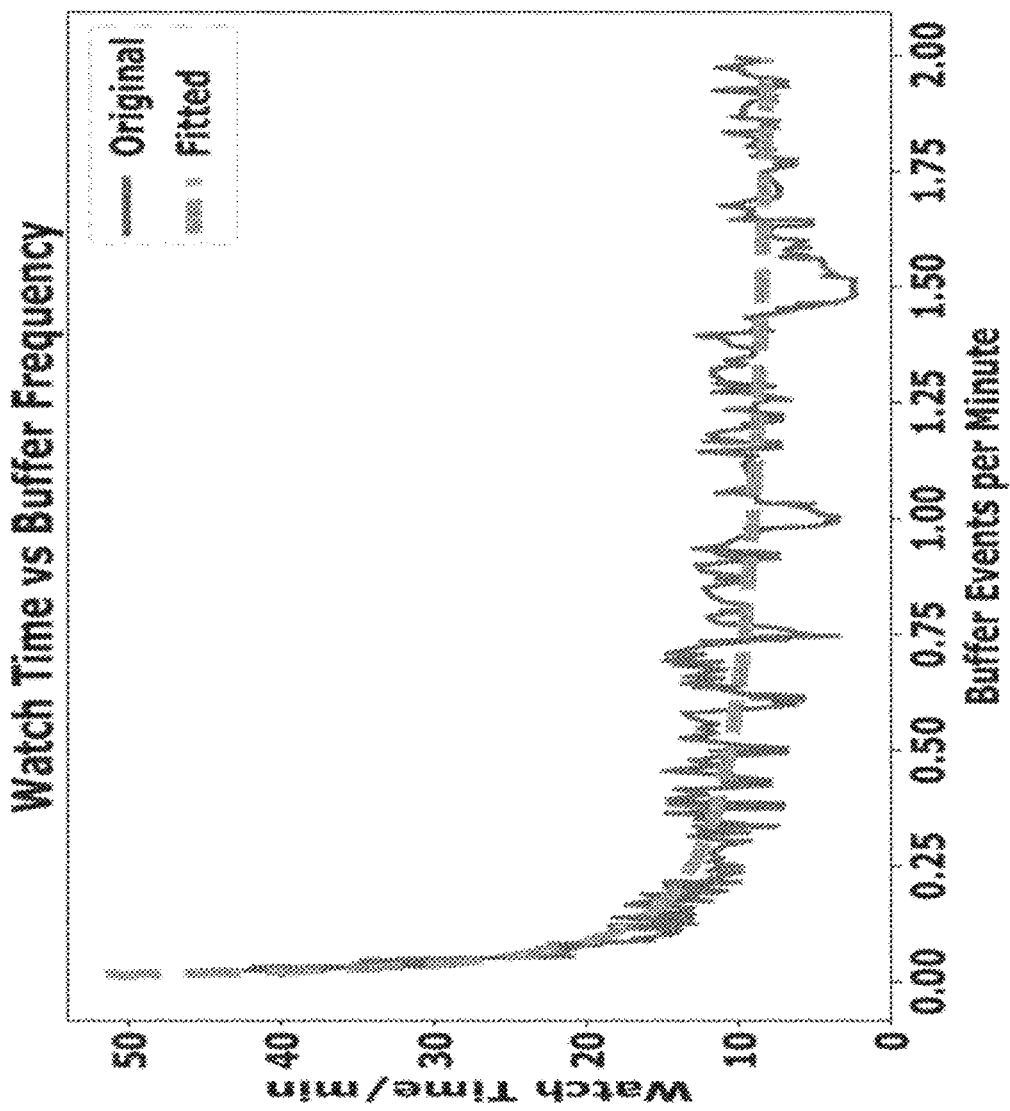
FIG. 10B is a graph illustrating an example fitted curve for watch time versus buffer frequency.

FIGS. 10A and 10B illustrate the watching time data presented for varying buffer ratio and buffering events in the example. The curves were fit using exponential (for the buffer ratio data) and quadratic (for the buffer event data) functions.

Figure 11A:
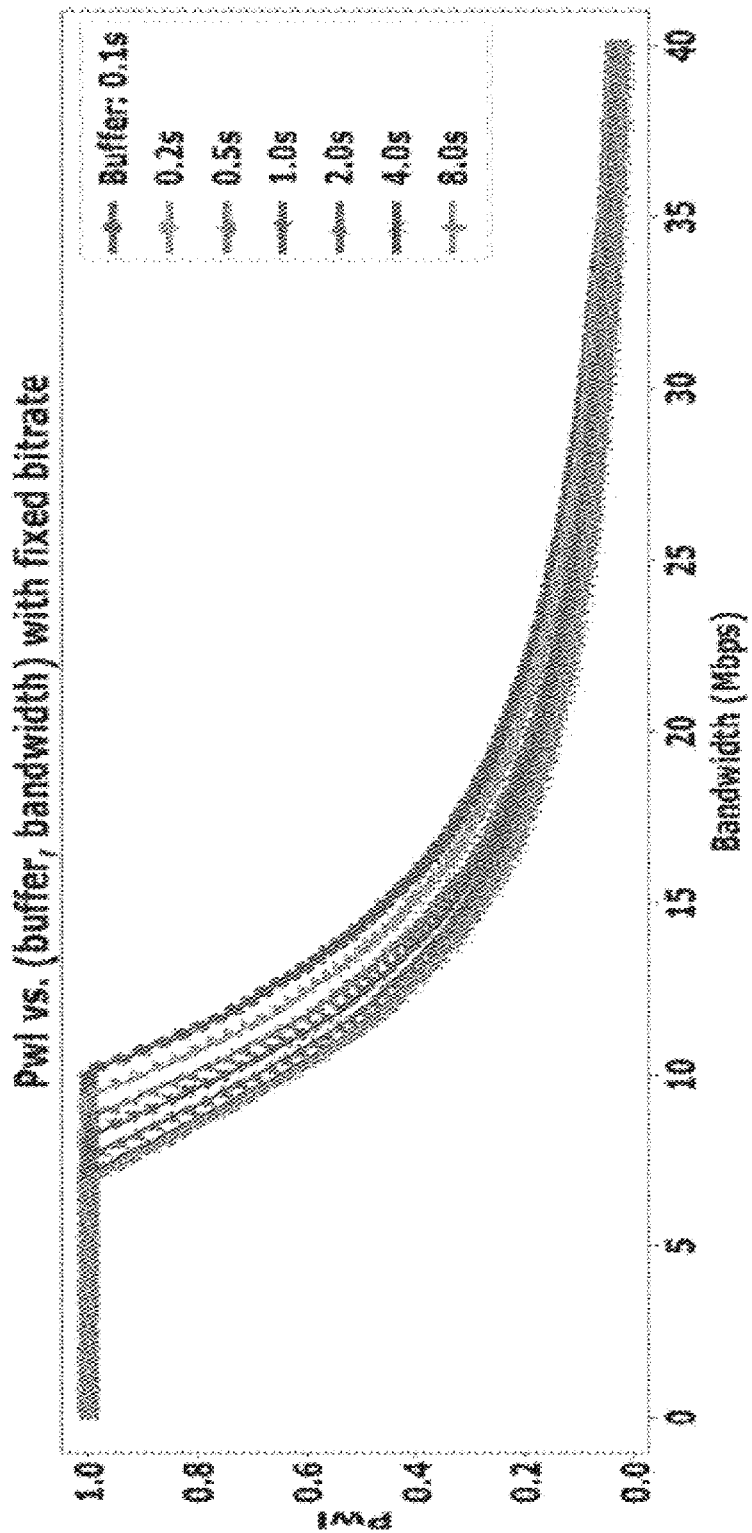
FIG. 11A is a graph illustrating an example $p_{wl}$ versus (buffer, bandwidth) with fixed bitrate.
Figure 11B:
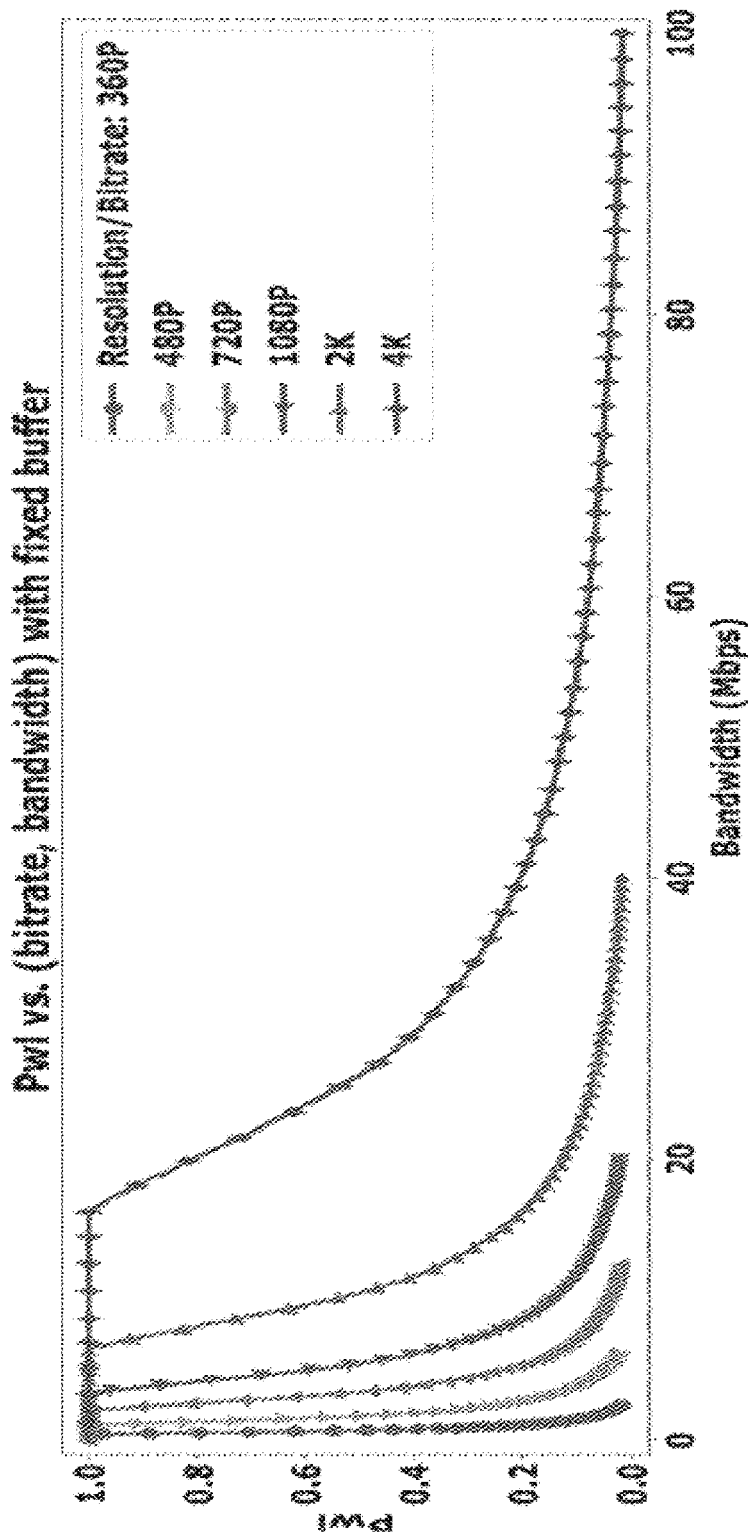
FIG. 11B is a graph illustrating an example $p_{wl}$ versus (bitrate, bandwidth) with fixed buffer.

FIGS. 11A and 11B show the computed $p_{wl}$ for an exemplary 260-second video streaming session (this length was chosen since it was the average video length for top YouTube videos). For clearer presentation, the three variables (e.g., buffer, bitrate, and bandwidth) were broken into two pairs when reporting $p_{wl}$.

The vAlloc module may determine the optimal allocation as described in an example below. To capture the user behavior in a streaming session, the streaming session was divided into small intervals and user behavior was modeled as a sequence of independent decisions, following the state machine probabilities, at each interval. The allocation may therefore be aligned with the modeled user behavior. At an allocation interval with length $t^-$, the state of the system is represented as $st_i = \cup_S(b_i, t_i)$, where $b_i$ and $t_i$ are the playback bitrate and buffer time, respectively, for the i-th user $u_i$ in the system. Given a system state, the content provider may compute the expected value of each user and thus the total expected value across all users. The allocation may aim to choose the next state $st_{i+1}$ to maximize the total expected value of $st_{i+1}$ subject to the bandwidth constraint of moving from $st_i$ to $st_{i+1}$.

To determine the expected value of a user in state $(b_i, t_i)$, the streaming system in the example was modeled as an infinite stream of interleaved videos and shorter videos (e.g., advertisements, public service messages, etc.), and the asymptotic user value was computed based on the transition probabilities (e.g., $p_{wl}$ and $p_{al}$) determined by the state $(b_i, t_i)$. Specifically, $p_1$ was set to the probability that the user will continue stream to the next revenue point; and $p_2$ set to the probability that the user will continue to stream from one revenue point to the next one. For simplicity of notation, we describe the asymptotic user value when videos and advertisements have fixed length of $L_v$ and $L_a$, respectively, and the value for all advertisements is $\tilde{v}^-$; however, the model may extend to heterogeneous video length and advertisement values. The asymptotic user value over the infinite stream may be computed as:

$$V_{u_i} = \sum_{k=0}^{\infty} \tilde{v} \cdot p_1 \cdot p_2^k = \frac{\tilde{v} \cdot p_1}{1 - p_2}, \quad (1)$$

where $$p_1(t) = \frac{L_v}{L_v + L_a} \cdot (1 - p_{wl})^{\frac{L_v - t}{\tilde{t}}} \cdot (1 - p_{d1}) \cdot (1 - p_{a1})^{\frac{L_a}{\tilde{t}}} + \frac{L_a}{L_v + L_a} \cdot (1 - p_{a1})^{\frac{L_a - t}{\tilde{t}}};$$

and $$p_2 = (1 - p_{wl})^{\frac{L_v}{\tilde{t}}} \cdot (1 - p_{d1}) \cdot (1 - p_{a1})^{\frac{L_a}{\tilde{t}}}.$$

$p_1(t)$ may depend on the current state of the user (e.g., whether in watching a video or advertisement) and the time until the next revenue point; $p_2$ may be constant.

Given this user and metrics (e.g., revenue) model, we consider in an example how to choose an optimal next system state $st_{i+1}$ from $st_i$. For each user $u_i$, the cost of moving from the current state $(b_i, t_i)$ to the next state $(b_{i+1}, t_{i+1})$ may depend on the relative playback bandwidths $b_i$ and $b_{i+1}$. Specifically, if $b_{i+1} \leq b_i$, the current buffered content may still be used, so the bandwidth cost is $c_{i+1} = b_{i+1}$ max $\{0, t^- + t_{i+1} - t_i\}$, where $t^-$ is the length of the control interval. Otherwise, the current buffer may be unusable, and the bandwidth cost is $c_{i+1} = b_{i+1}$ max $\{0, t^- + t_{i+1}\}$. During allocation, all possible values of bitrate may be selected based on YouTube data and buffer times may be selected from a set of discrete values. Under this model, optimizing the allocation among the current set of users may be an instance of the Multiple-Choice Knapsack Problem (MCKP), where for each item (user) the choices may be the possible (bitrate, buffer) pairs, the value of each choice may be the expected user value of that (bitrate, buffer) pair, the cost may be the bandwidth cost $c_{i+1}$ computed as described above, and the capacity of the knapsack may be the total amount of available bandwidth from the previous interval. We may take the optimal solution and compute the allocation for each user as the amount of bandwidth required to go from $st_{i+1}$ from $st_i$; the ratio between these bandwidths (i.e., users' weighted-fair weights) is the input to the fShaper module. We may solve MCKP in each time interval using dynamic programming.

A single instance of the MCKP may make an optimal decision only for the next interval. There may be other choices for the next interval that do not immediately have higher values but serve as a stepping stone to reach higher values in the long run. Planning a sequence of (bitrate, buffer) pairs that reach a final goal state subject to a per-interval bandwidth limit may be an instance of the Multi-Dimensional Multiple-Choice Knapsack Problem (MMKP). In the evaluations, we may optimize only a single-dimensional MCKP due to computational limitations.

The highlights of the vAlloc evaluations are as follows: (i) vAlloc may achieve over 90% of the total user value when available bandwidth drops to roughly 50% of maximum bandwidth, and may outperform several other bandwidth allocations mechanisms by non-trivial margins. (ii) vAlloc is socially friendly; e.g., it may only have a minor impact on the streaming experiences of the low-valued users. (iii) vAlloc is general and sensitive to various user behavior model and value distribution parameters.

In an example, we compare the vAlloc module with two classes of bandwidth allocation schemes: the status quo where users' bandwidth are decided by the transport protocol and a strawman design in which content providers remove the lowest-valued users from the system and serve the rest equally. We considered both user-value distributions derived from real data discussed above. The evaluation may set the transition probabilities in the state machine (see FIG. 8) such that $p_{wl}=p_{al}$ are computed dynamically, $p_{dl}=0.25$, $p_{wd}=1$ only when a video is finished and 0 elsewhere, $p_{wa}=1$ $p_{wl} p_{wd}, p_{da}=1$ (e.g., a new ad or shorter inserted video is added whenever the previous video finishes), and $p_{aw}=1-p_{al}$. We also analyze different values for leaving probabilities (e.g., $P_{wl}, P_{al}$ and $p_{dl}$) to demonstrate the generality of our performance improvement.

Figure 12A:
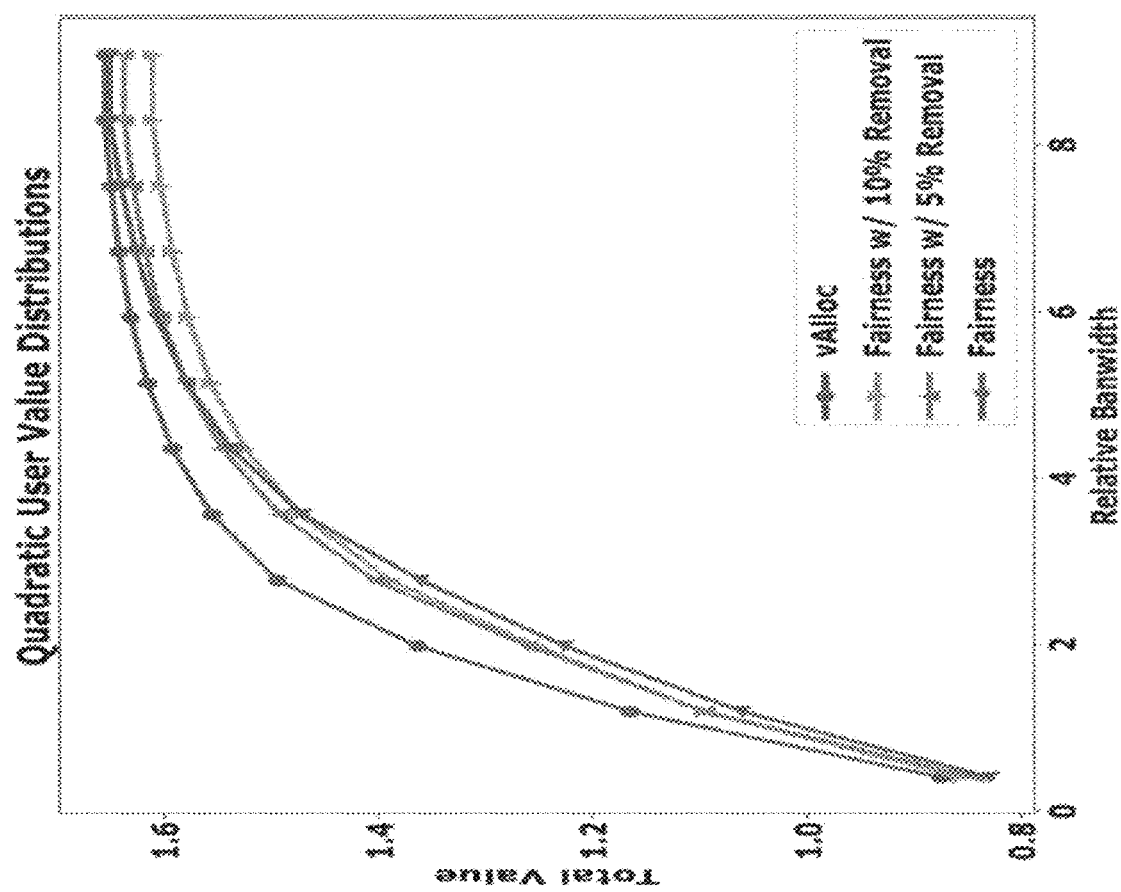
FIG. 12A is a graph illustrating example quadratic user value distributions.
Figure 12B:
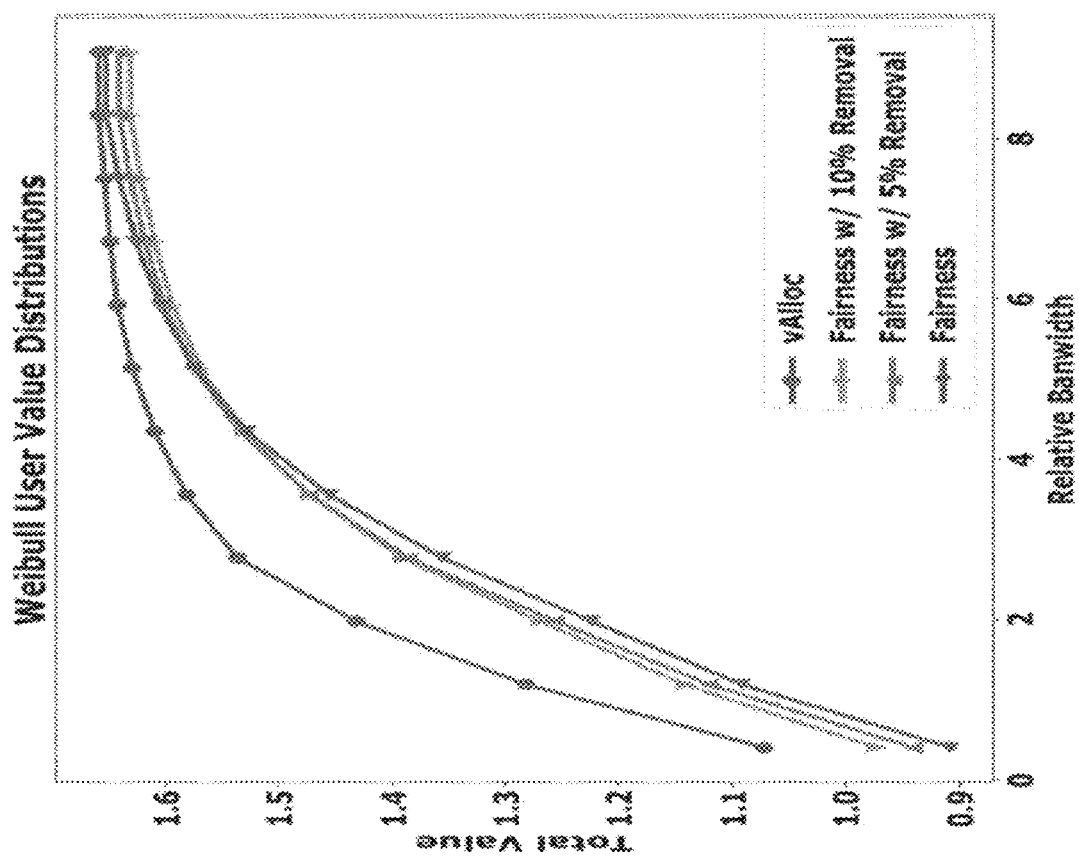
FIG. 12B is a graph illustrating example Weibull user value distributions.

FIGS. 12A and 12B show exemplary aggregate user values achieved by the vAlloc module and other bandwidth management mechanisms. In the example, a user population is considered where new users come over time independent of the number of existing users. The vAlloc module clearly outperforms the competing mechanisms in the example. The advantage of vAlloc may peak when the available bandwidth is about 50% of the maximum bandwidth, and vAlloc may perform even better as the distribution becomes more heavy-tailed. Finally, the results also show that simply removing low-valued users during times of bandwidth limitation is neither optimal nor fair.

As shown, the vAlloc module does not negate user experience despite bandwidth reallocation. The vAlloc module is a generic optimization framework that may be configured to optimize allocation for various metrics. In this example evaluation, the vAlloc module is configured to split the total available bandwidth into two buckets: one bucket for optimizing total user values and one bucket for optimizing streaming quality of experience (QoE) as measured by VMAF scores. In the example, we evaluate two user repopulation schemes: constant inbound rate, as described earlier, and constant number of users, where every departing user is immediately replaced with a new user with value randomly chosen from the user value distribution.

Figure 13:
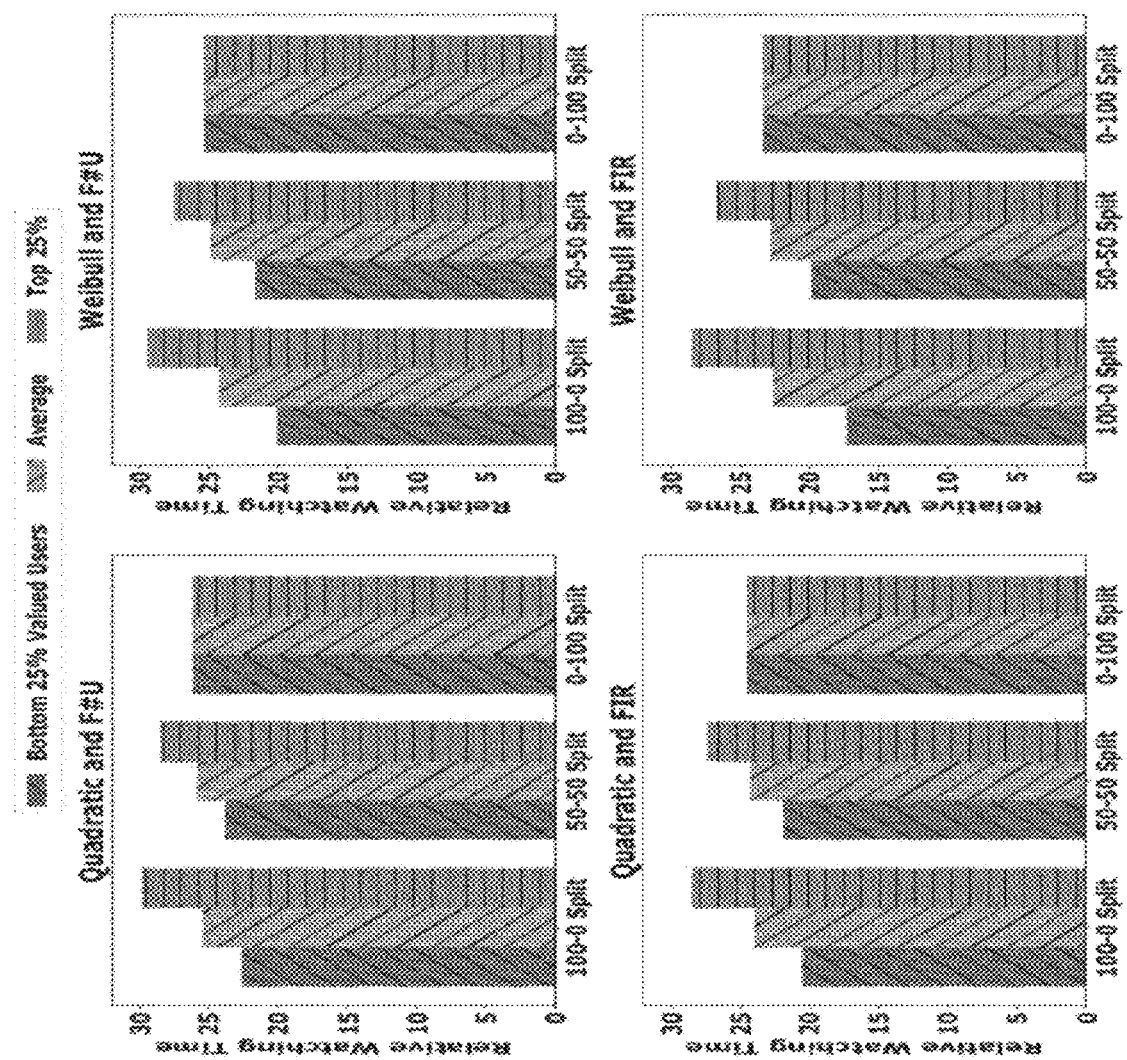
FIG. 13 illustrates graphs depicting example watching times of low-valued users at various bandwidth reallocations.

FIG. 13 illustrates the exemplary vAlloc module's performance under different user behavior model and value distribution parameters. The left-side graphs use quadratic user value distributions, and the right-side graphs use Weibull user value distributions. For example, the fairness evaluation results are shown in FIG. 13. F#U and FIR represent the constant number of users and constant inbound rate population schemes, respectively. Both user value distributions obtained are evaluated. In the example, we use the user watching time as our fairness metric. Even when the vAlloc module is fully configured to optimize aggregate user values (e.g., the 100-0 Split), the bottom-quartile users' watching times drops slightly (e.g., 10%) compared with the average watching time. Fairness may be further improved when the vAlloc module provides some bandwidth for QoE optimization. When fully configured to optimizing QoE, the vAlloc module may provide fairness to all users, regardless of their values, as expected.

Finally, the vAlloc is evaluated under different exemplary parameters for the user behavior model and value distribution. Since actual parameters may vary from provider to provider, the example aims to show that the vAlloc module's allocation continues to provide strong improvements across a variety of different parameters. Since bandwidth reallocation impacts only the three leaving probabilities (i.e., $p_{wl}, p_{al}$ and $p_{dl}$) in the state machine, we evaluate the vAlloc module with different $p_{wl}$ and $p_{dl}$ ($p_{al}$ is set the same as $p_{wl}$). To create different $p_{wl}$, we linearly scale the probability distributions shown in FIGS. 11A and 11B. For $p_{dl}$, we evaluate several discrete values in the example. We also considered different parameters for both our user value distributions (quadratic and Weibull). FIGS. 14A-14F show the results. In general, the vAlloc module performs well across a variety of user models, providing least benefit when bandwidth allocation cannot affect user value (e.g., $p_{dl}=1$ or flat user distributions), and more benefit when bandwidth allocation has greater impact (e.g., $p_{dl}=0$ or more heavy-tailed user distributions).

In an exemplary embodiment, the design of FlowTele may look to the content provider to shape outbound traffic to achieve the per-flow bandwidth allocations specified by the vAlloc module while simultaneously remaining friendly to non-participating traffic sharing the same bottleneck links. Though a source may readily control its outbound bandwidth through a UDP flow, using UDP may involve client deployment, and maintaining TCP-friendliness may involve the use of a mechanism like Equation-Based Rate Control; a source may likewise limit its TCP outbound bandwidth by controlling its sending rate, but the bandwidth it gives up in this way may not get automatically reallocated to co-bottlenecked flows sent from the same source. The fShaper module may be designed to overcome these difficulties and accomplish the following goals: (i) internal weighted fairness: the flows controlled by the fShaper module may have goodput that converges to the target weights given by vAlloc, while having (ii) external friendliness: the flows controlled by the fShaper module in aggregate may neither undershoot nor overshoot the throughput of uncontrolled flows when competing with other cross traffic on a bottleneck link; e.g., the aggregate flows controlled by the fShaper module may be friendly to external TCP cross-traffic. In other words, the fShaper module may merely redistribute bandwidth between its component flows, operating so as to be transparent to cross-traffic sharing the same bottleneck. The fShaper module may aim to provide this bandwidth redistribution without any in-network or client support.

To achieve above goals, the fShaper module may propose a novel Cross-Flow Congestion Window Reallocation (CFCR) algorithm to redistribute the congestion window among the controlled flows so as to retain TCP-friendliness. Specifically, given a set of co-bottlenecked flows S, the fShaper model may redistribute their sending rates as determined by vAlloc by reallocating congestion window values between flow in S. In certain aspects, the kernel implementation of TCP may measure the sending rate of each flow and pass those rates to a user-space scheduler. The user-space scheduler may then use the CFCR algorithm to compute a set of changes to congestion control parameters that drive the sending rate of each flow toward the target sending rates determined by vAlloc. The scheduler then uses Netlink to provide those parameters to the kernel-space TCP implementation, which may adjust the congestion control parameters as specified. Thus, CFCR may not be another TCP congestion control protocol. Instead, it may be a mechanism built on top of an existing TCP congestion control protocol (e.g., in our case, TCP Cubic) to provide higher-level scheduling while ensuring internal fairness and external friendliness. Though our implementation of CFCR builds on TCP Cubic, the architecture may generalize to many other TCP variants.

The current exemplary CFCR algorithm is built for TCP Cubic, the default congestion control algorithm since Linux kernel 2.6.19. In a set of flows S, the vAlloc module may provide a target weight for each flow. Each flow may then take on the role of recipient, donor or calibrator. Recipient flows may have target weight greater than their fair share and receive extra bandwidth from donor flows, which have target weight less than their fair share. The CFCR algorithm may rely on one or more calibrator flows; a calibrator flow may have a weight equal to its fair share, and its congestion window may not be impacted by CFCR. As a result, the fShaper module may allow the native TCP algorithm to make all decisions for each calibrator flow. Thus, the calibrator flow may be statistically equal to any competing cross traffic sharing the co-bottleneck link. By measuring the rate of the calibrator flow, the fShaper module may obtain an accurate measurement of external TCP-friendliness, allowing the fShaper module to adjust its internal aggressiveness accordingly.

To describe the operation of CFCR, we start with a description of TCP Cubic. TCP Cubic computes the real-time congestion window of a flow using $W(t)=C(t-K)^3 + W_{max}$, where C is a constant factor, t is the elapsed time since the last packet loss, and K is the time at which TCP reaches its estimated maximum sending window $W_{max}$. $W(t)$ is multiplicatively reduced by a factor $\beta 0$ when encountering packet loss. CFCR shapes the recipient and donor flows in two control modes, either (i) by adjusting TCP Cubic algorithmic parameters (e.g., $W_{max}$ and $\beta$) and relies on TCP Cubic to adjust its cwnd, or (ii) by directly overwriting the current cwnd, as discussed below.

FIG. 15 illustrates an exemplary CFCR algorithm. Architecturally, the CFCR algorithm may have two working threads: PacketAckWatching that reads the real-time cwnd from each flow in S and CrossFlowCwndAlloc that performs cross-flow cwnd reallocation in every control interval $C_{interval}$ based on these collected cwnd values. In practice, to minimize the service degradation for donor flows, typical vAlloc allocations may have several donor flows for each recipient, so each donor transfers only a small amount of cwnd to its corresponding recipient. The algorithm shown in FIG. 15 focuses on this scheme. Further, for simplicity, we use a single calibrator when describing the algorithm, whereas having more calibrator flows is an option that may provide even more accurate view on the state of TCP cross-traffic.

A key design challenge of CrossFlowCwndAlloc is to strike a balance between internal fairness and external friendliness. A strawman design may be to directly move cwnd from donor flows to the recipient. However, in our extensive evaluations, this turns out to be very unfriendly to cross traffic before it can achieve satisfactory internal fairness. Therefore, the exemplary CrossFlowCwndAlloc operates in two phases: When the calibrator's average share in the past control interval is above its target weight (e.g., indicating that the aggregate traffic is below its fair share), the fShaper module may enter the aggressive allocation phase in which cwnd is shifted one-for-one from donor flows to the recipient flow to reach their target weights. Otherwise, the recipient may enter the normal allocation phase where the fShaper module may update only Wmax and rely on TCP Cubic to gradually adjust its cwnd towards the target rate. A donor flow may enter either the aggressive allocation phase or normal allocation phase, depending on whether its average share is close enough to its target weight.

When evaluating CFCR, our exemplary results show that simply using the target weights for cwnd reallocation does not achieve the target weights in goodput, especially when there is a strong disparity between recipient and donor weights. To better reach the target goodput ratio, CFCR may dynamically compute cwnd-weights for each flow at the beginning of each control interval, such that the dynamic cwnd-weight of the recipient varies between $[(1-\delta) w_{target}, (1+\delta) w_{target}]$, where $\delta$ is small (and configurable) constant (as described below) and $w_{target}$ is the recipient's target weight given by the vAlloc module. Our evaluation below shows that these dynamic cwnd-weights enable the fShaper module to achieve targeted goodput weights, even for very unbalanced target-weight allocations.

The Algorithm of FIG. 15 has several configurable parameters. $\beta_0$ is the default TCP Cubic multiplicative decrease factor. $\gamma$ (e.g., 0.9 by default) may be used by the allocation phase selector to evaluate whether a donor flow's average share is close enough to its target share. $\delta$ (e.g., 0.03 by default) may be used in the cwnd-weighting step to stabilize the dynamically computed target weight for the recipient. Finally, the $C_{interval}$ (e.g., 10 ms by default) is the length of the control interval. These default values were obtained from extensive evaluations across a variety of different scenarios.

Referring to Table 2 below, the results of multiple experiments are reported that demonstrate the effectiveness of the fShaper module. Table 2 lists the network settings, including both the local area network (LAN) and the Internet environment. The content providers, running the fShaper module, and cross-traffic senders are either located in the lab or in Google Cloud Platform (GCP) VMs across the globe. In all settings, the bottleneck link is not at the user's site, but rather is either introduced by the user's ISP (based on the user's subscription plan) or manually created via a router.

TABLE 2

| Content Provider Location | User Location | Cross-Traffic Sender Location | Provider-User/ CrossTraffic- User RTT (ms) | Bottleneck Capacity (Mbps) |
| --- | --- | --- | --- | --- |
| Lab | Lab | GCP LA | ~300/~400 | 100 |
| GCP Iowa | Illinois | GCP LA | ~160/~400 | 100 |
| GCP Tokyo | Taiwan | GCP HK | ~800/~600 | 60 |
| GCP Tokyo | Taiwan | GCP HK | ~800/~600 | 12 |

Figure 16A:
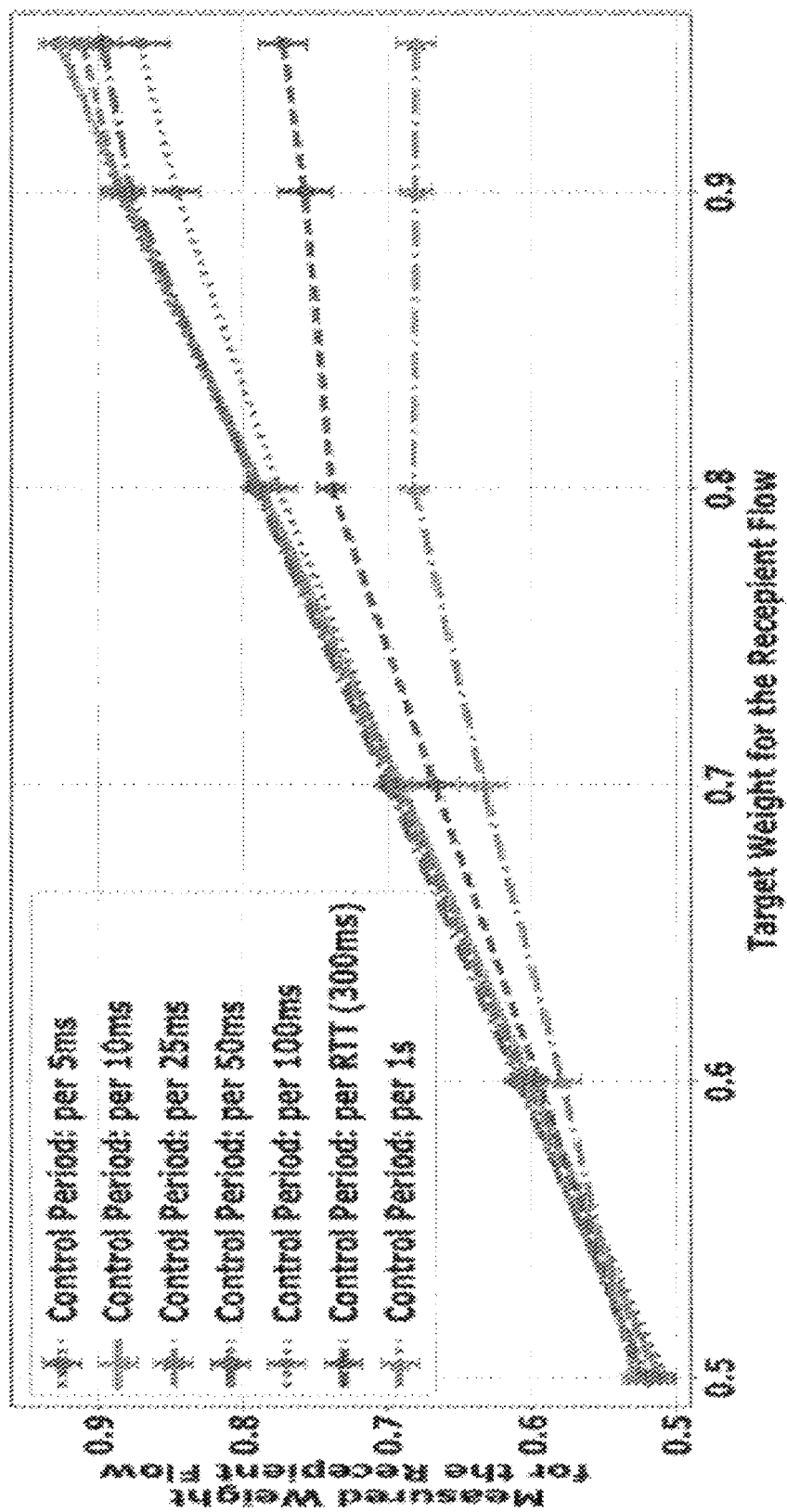
FIG. 16A is a graph illustrating fair shares enforced by the fShaper module with different control periods in an exemplary LAN (with cross-traffic from GCP LA).
Figure 16B:
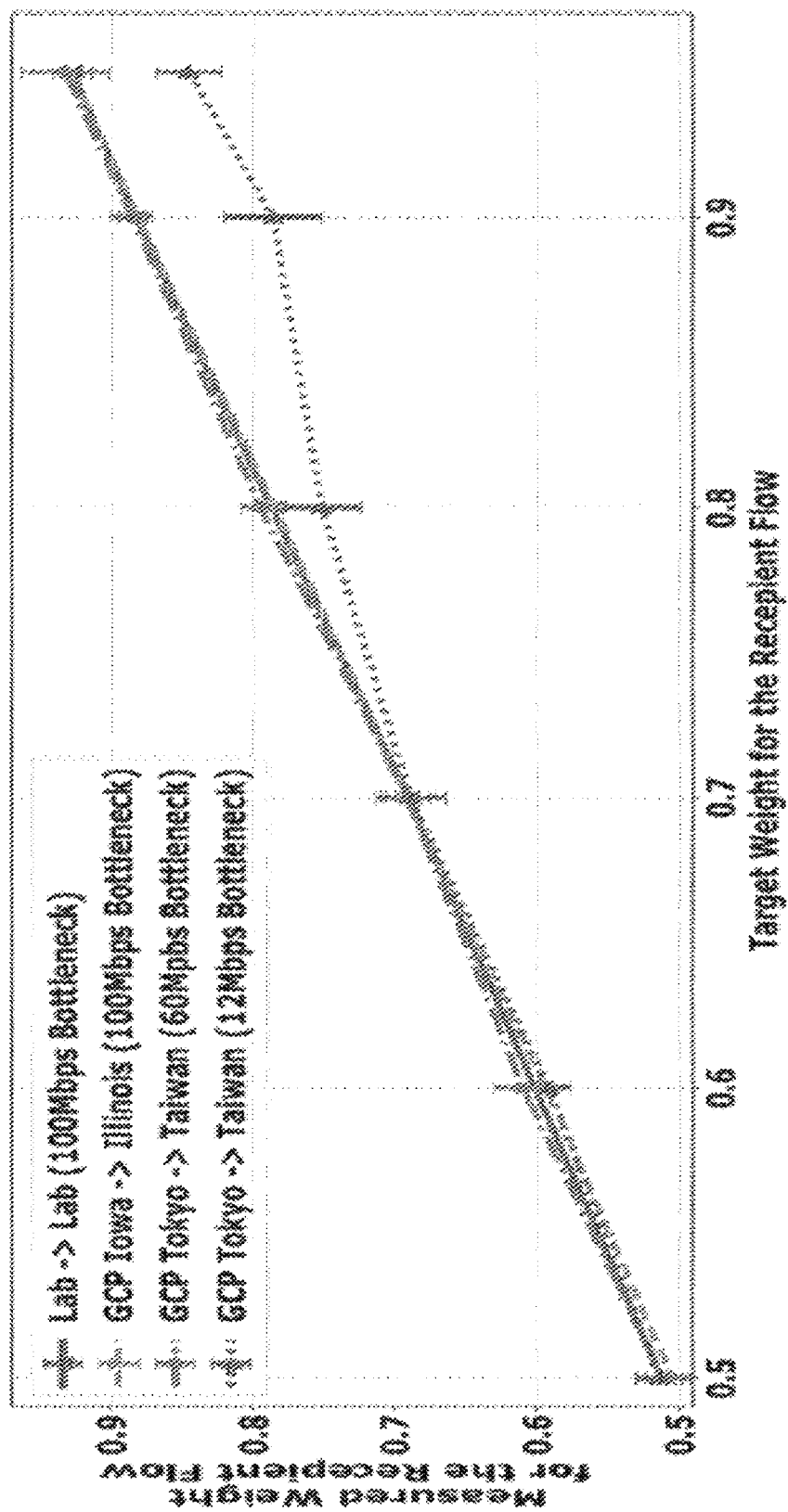
FIG. 16B is a graph illustrating fair shares enforced by the fShaper module in a different exemplary networking environment with $C_{interval}$ as 10 ms.

FIG. 16A is a graph illustrating fair shares enforced by the fShaper module with different control periods in an exemplary LAN (with cross-traffic from GCP LA). FIG. 16B is a graph illustrating fair shares enforced by the fShaper module in a different exemplary networking environment with $C_{interval}$ as 10 ms. In an example, we start with the basic case with a single donor and recipient flow. We run the experiments with different target weights, ranging from [1:1] to [19:1], and varying lengths of the control interval, ranging from tens of milliseconds to one second, computing each data point as an average across 15 runs of 90 seconds each, and plot the results in FIGS. 16A and 16B. Overall, the fShaper module may achieve the targeted goodput ratio between the donor and recipient, even if the recipient's target weight is much larger than its TCP Cubic fair share. However, the fShaper module may only achieve these goodputs at control intervals significantly smaller than the RTTs; we found that 10 ms tends to be sufficiently frequent for shaping Internet-scale flows. We also found that because the fShaper module approach in the example only limits cwnd, never reducing cwnd to zero, and does not otherwise shape or pace traffic, it does not exhibit fine-grained control of donor flows once their rate is low. For example, FIG. 16B shows a run with a 12 Mbps bottleneck link where internal fairness drops as the donor's cwnd decreases. This limitation is not inherent in FlowTele; additional changes to TCP congestion control (such as the suspension of flows for limited times) may provide better weighted-fairness with low bandwidth flows.

Figure 17A:
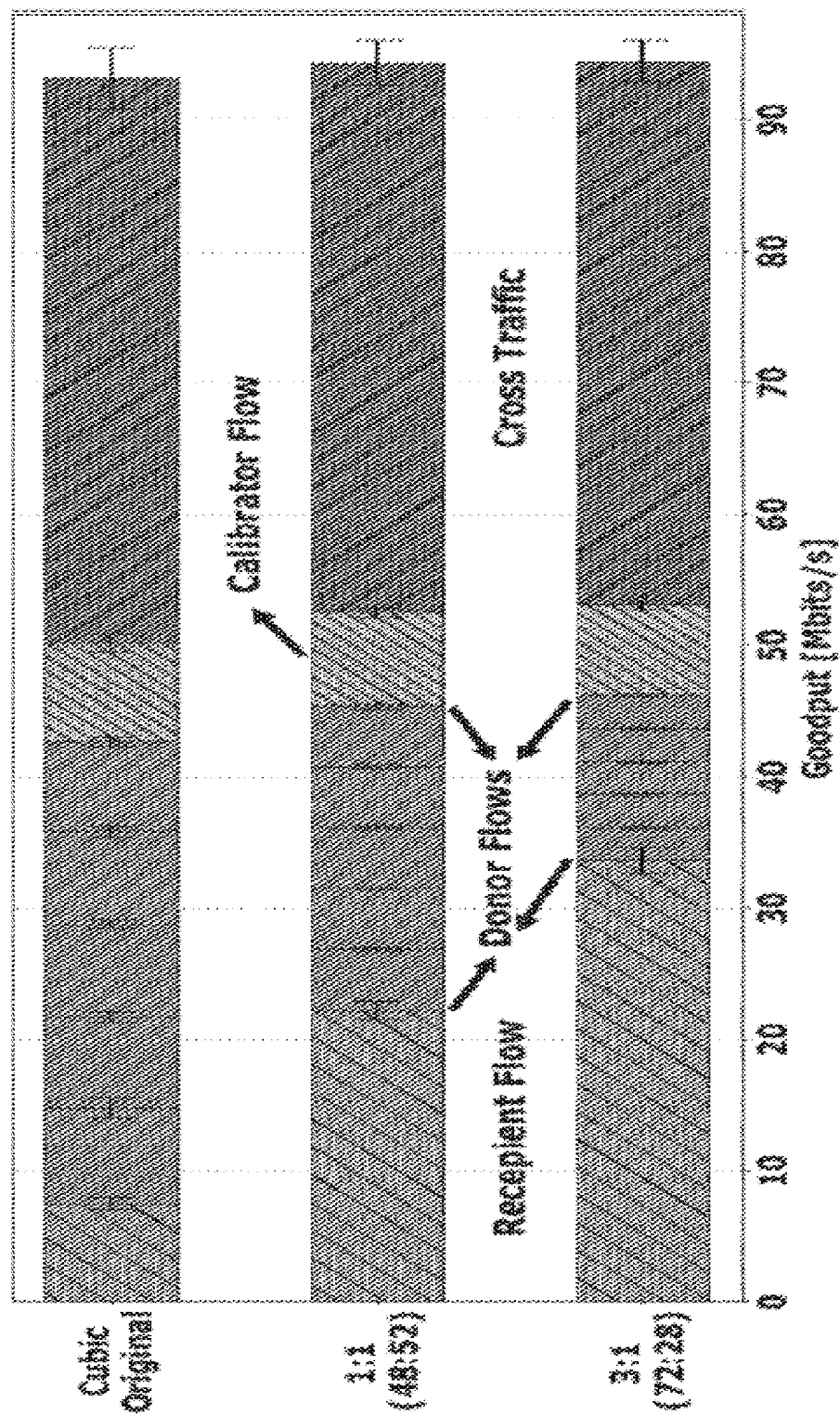
FIG. 17A is a graph illustrating an example for evaluating the fShaper module with five donor flows and one recipient flow.
Figure 17B:
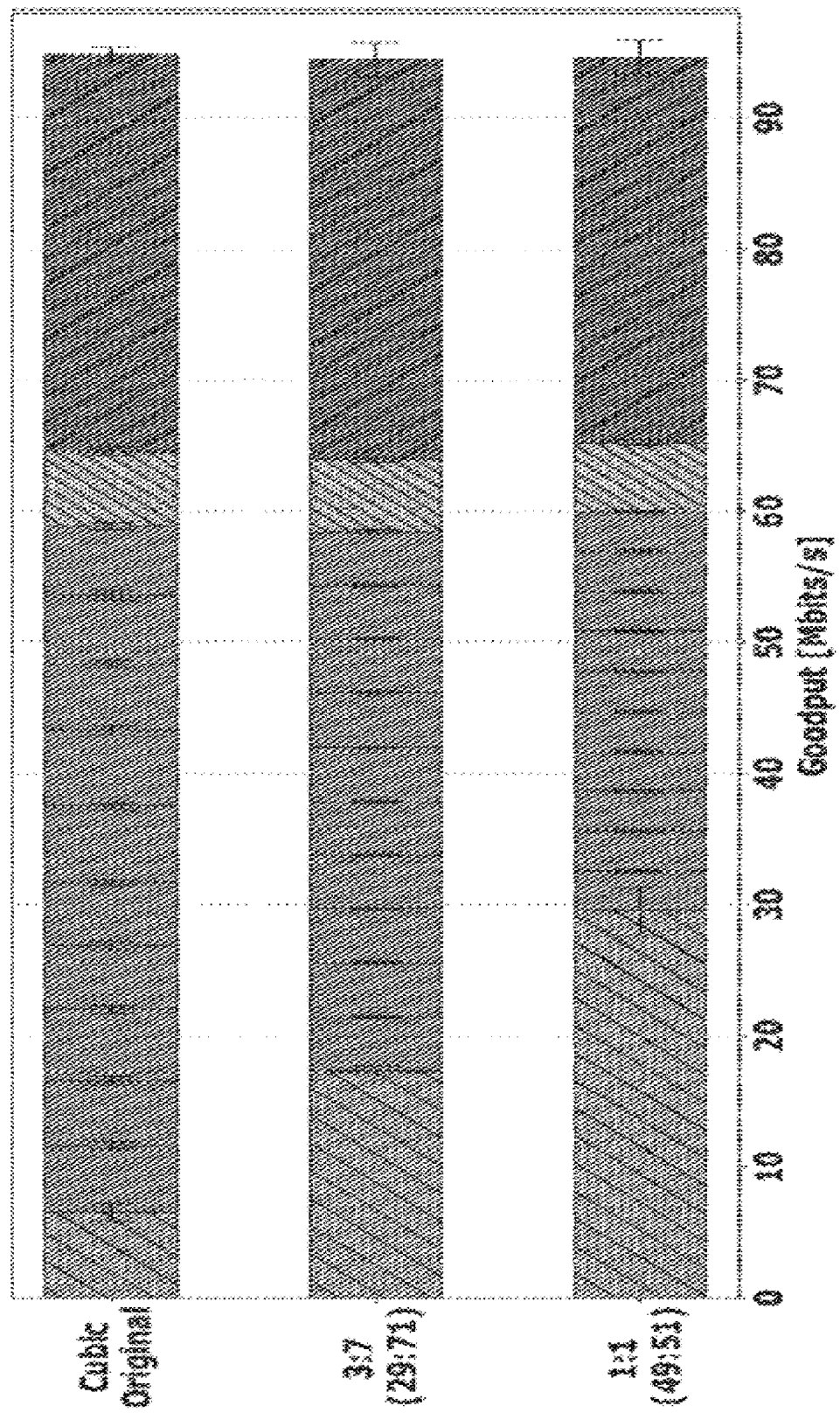
FIG. 17B is a graph illustrating an example for evaluating the fShaper module with ten donor flows and one recipient flow.

FIG. 17A is a graph illustrating an example with five donor flows and one recipient flow. FIG. 17B is a graph illustrating an example with ten donor flows and one recipient flow. In practice, several donor flows may provide bandwidth to a recipient. In an example, we performed two sets of experiments for this scenario: (i) one recipient flow and five donor flows, with two target allocations [1:1] and [3:1] (all five donor flows have the same target weight so that if their aggregate weight is 0.5, each donor flow's target weight is 0.1); (ii) ten donor flows and one recipient flow, with two target weight allocations [3:7] and [1:1]. The content provider and user are located at GCP Iowa and on the campus network, with cross-traffic (ten total flows) originating from GCP LA. In the example, we run fifteen (15) runs for ninety (90) seconds per run and plot the results in FIGS. 17A and 17B. Overall, the fShaper module may enforce very accurate internal weighted fairness in both cases without hurting external TCP-friendliness.

Figure 18:
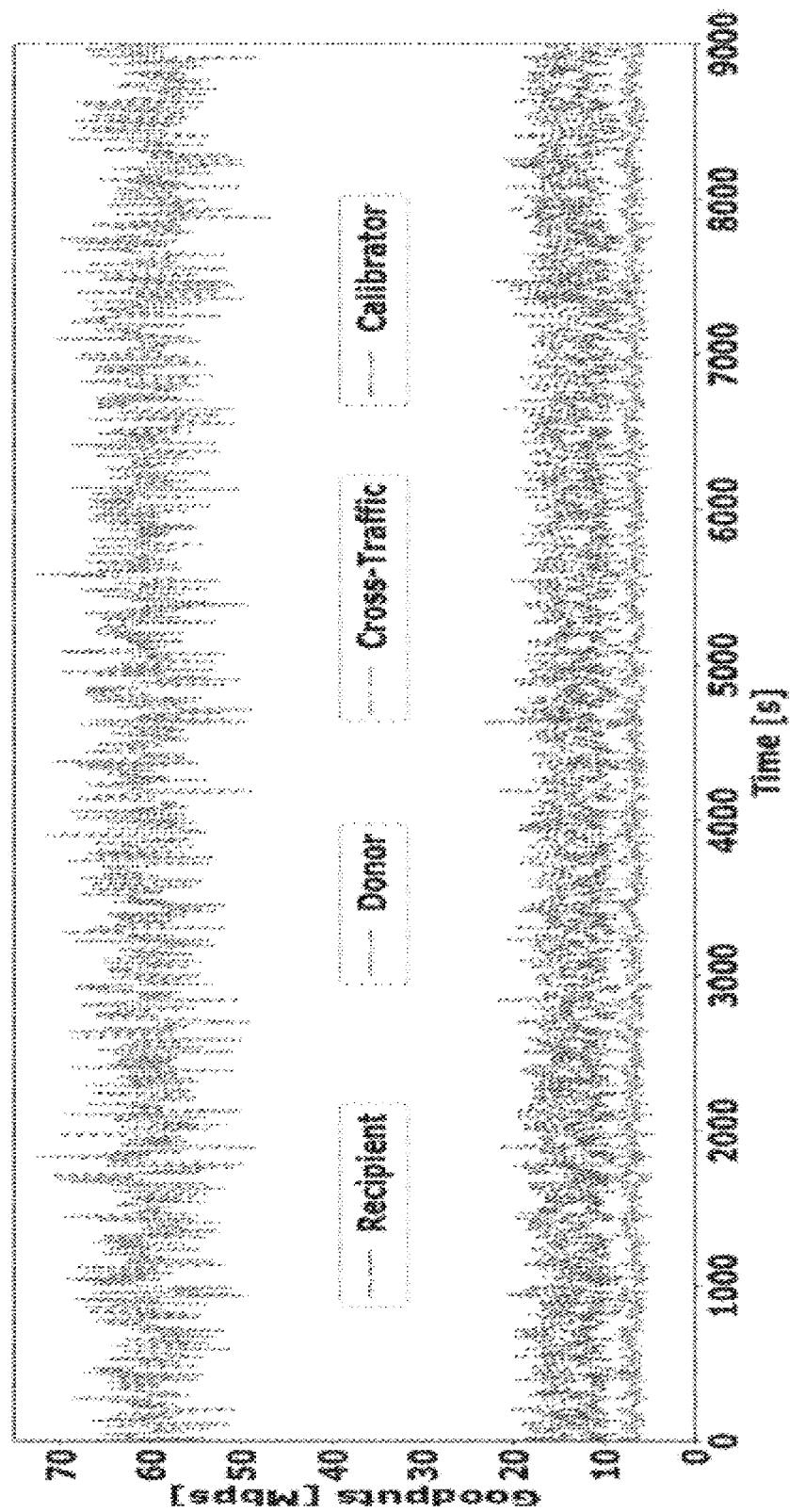
FIG. 18 is a graph illustrating an exemplary stable rate allocation in the fShaper module.

We performed some long (e.g., 2.5 hours) exemplary runs to explore the long-run behavior of CFCR, and plot the results in FIG. 18. We found that the behavior is stable; that is, the sending rates of the recipient and donor flows do not diverge over a long period of time.

In certain aspects, for example, we have a full implementation of FlowTele in approximately 9700 lines of code, including 791 lines of Python and 747 lines of MATLAB for the vAlloc module and its evaluation suite, 188 lines of Python for the fCoder module, 1300 lines of Python and 300 lines of C++ for the fCoder-ML module, 1364 lines of Python for the fShaper module, 762 lines of kernel C code for the TCP Cubic and Netlink modules, and 1493 lines of Python and 2793 lines of C++ for the simulation and emulation environment.

We ran an exemplary integrated evaluation for FlowTele on both the Internet and a hybrid emulation platform combining an emulated network with the Internet. Our Internet evaluation delivered traffic to a residential device in Asia, using sources from GCP in Hong Kong and Tokyo. By sending cross-traffic and controlled traffic from different sources, but over the same co-bottleneck, we could evaluate the effectiveness of real-time traffic shaping when our flows are competing against cross-traffic that have different loss and delay characteristics. The hybrid emulation platform may provide accurate control over network topologies and bottleneck bandwidths, while flows on the emulation platform may still send through the Internet to experience unpredictable cross-traffic and possibly routing changes. Additional detail and evaluation results on the hybrid platform will be discussed below.

Figure 19A:
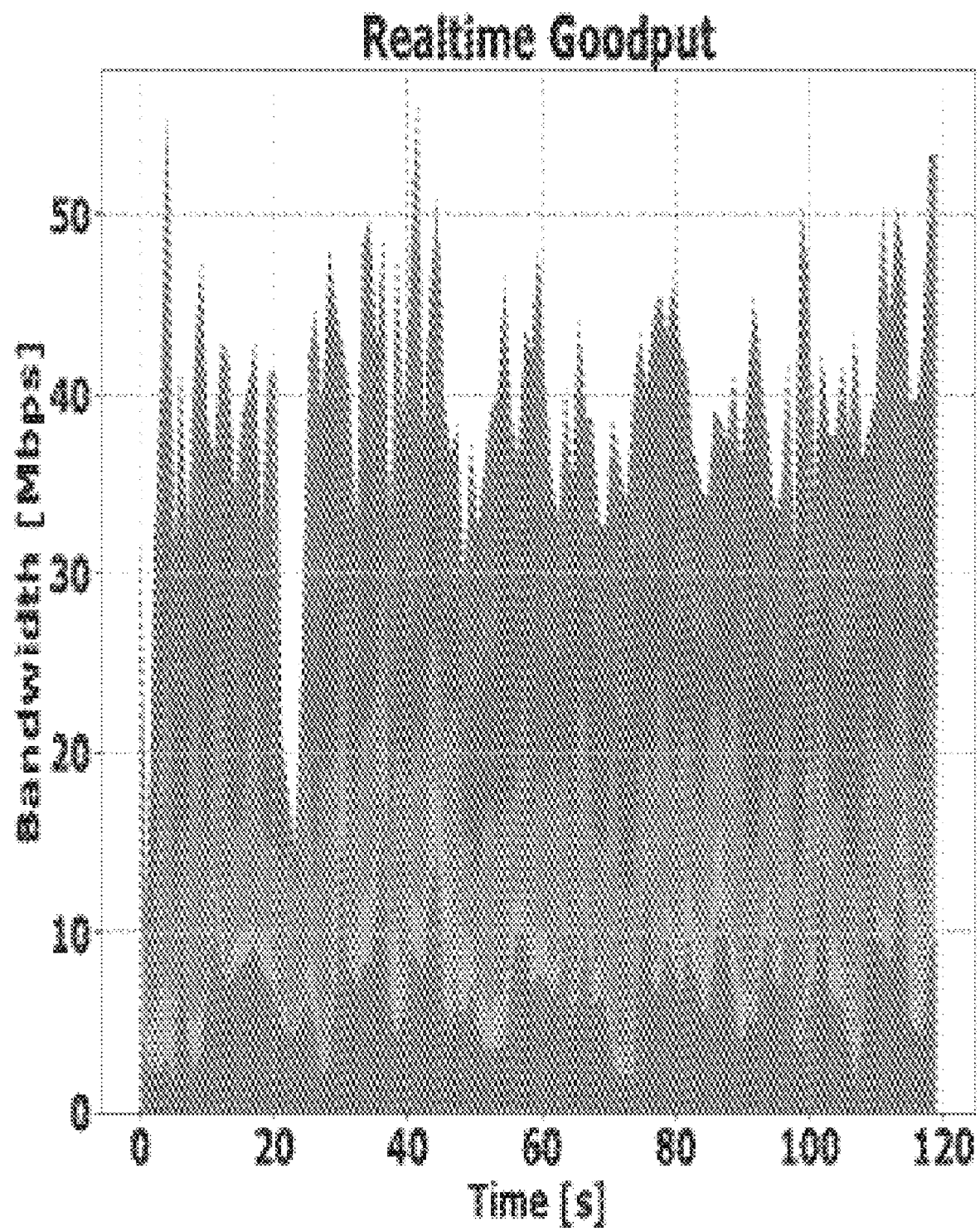
FIG. 19A is a graph illustrating example real-time Goodput flows.
Figure 19B:
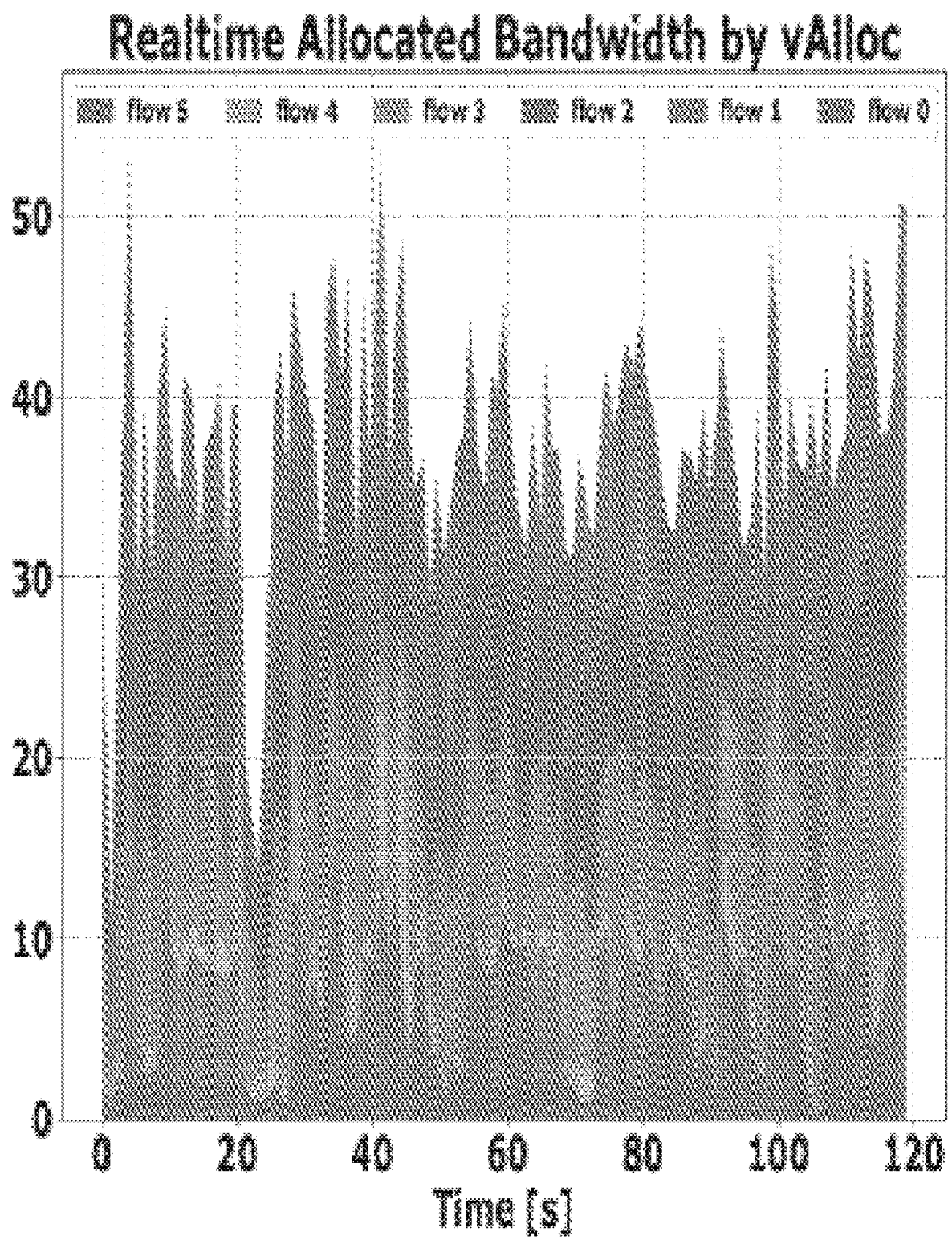
FIG. 19B is a graph illustrating example real-time allocated bandwidth, according to certain aspects of the disclosure.

FIG. 19A is a graph illustrating example real-time Goodput flows. FIG. 19B is a graph illustrating example real-time allocated bandwidth. Next, we discuss the results for our exemplary integrated evaluations over the Internet. We have five regular flows and one calibration flow in our Internet-scale experiments; our flow count is limited by the computational cost of the vAlloc module's MCKP solver. During the evaluation period, the vAlloc module may periodically choose bandwidth allocations for each flow and the fShaper module may execute those allocations. FIGS. 19A and 19B show the actual achieved goodput by each flow and the real-time bandwidth computed by the vAlloc module, respectively, in the example. Overall, FlowTele demonstrates effective and accurate traffic shaping with dynamic networking conditions. Some flows (such as flows #1 and #4) sometimes achieve higher goodput than their allocated bandwidth because these flows have low values, and therefore their target bandwidth allocations are small. As shown above, the accuracy of fShaper is lower for flows with very low rates. As a result, these flows sometimes achieve goodput higher than their targets. Such feedback may cause the vAlloc module to further reduce the allocations for these flows.

Figure 20A:
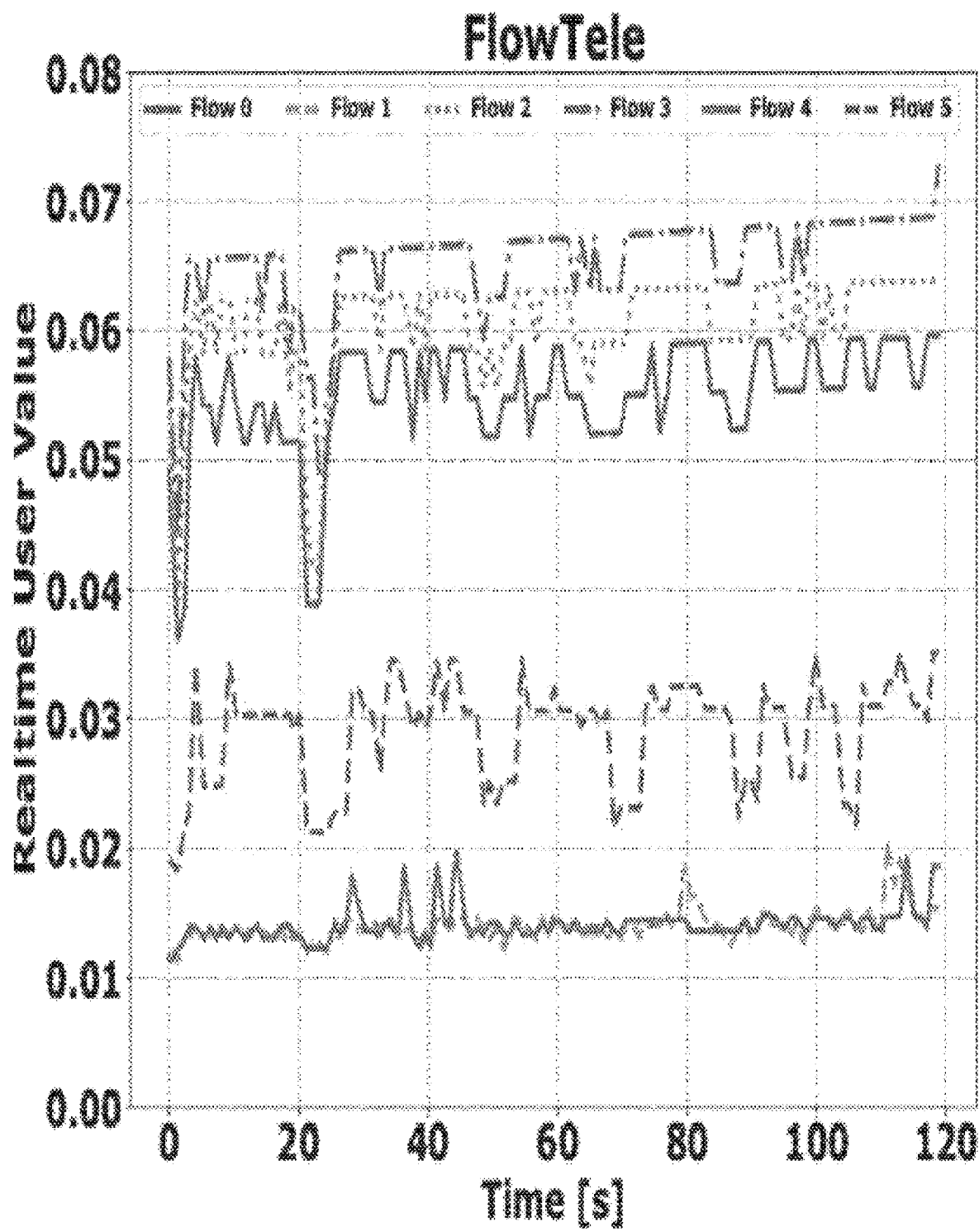
FIG. 20A is a graph illustrating exemplary real-time user values, according to certain aspects of the disclosure.
Figure 20B:
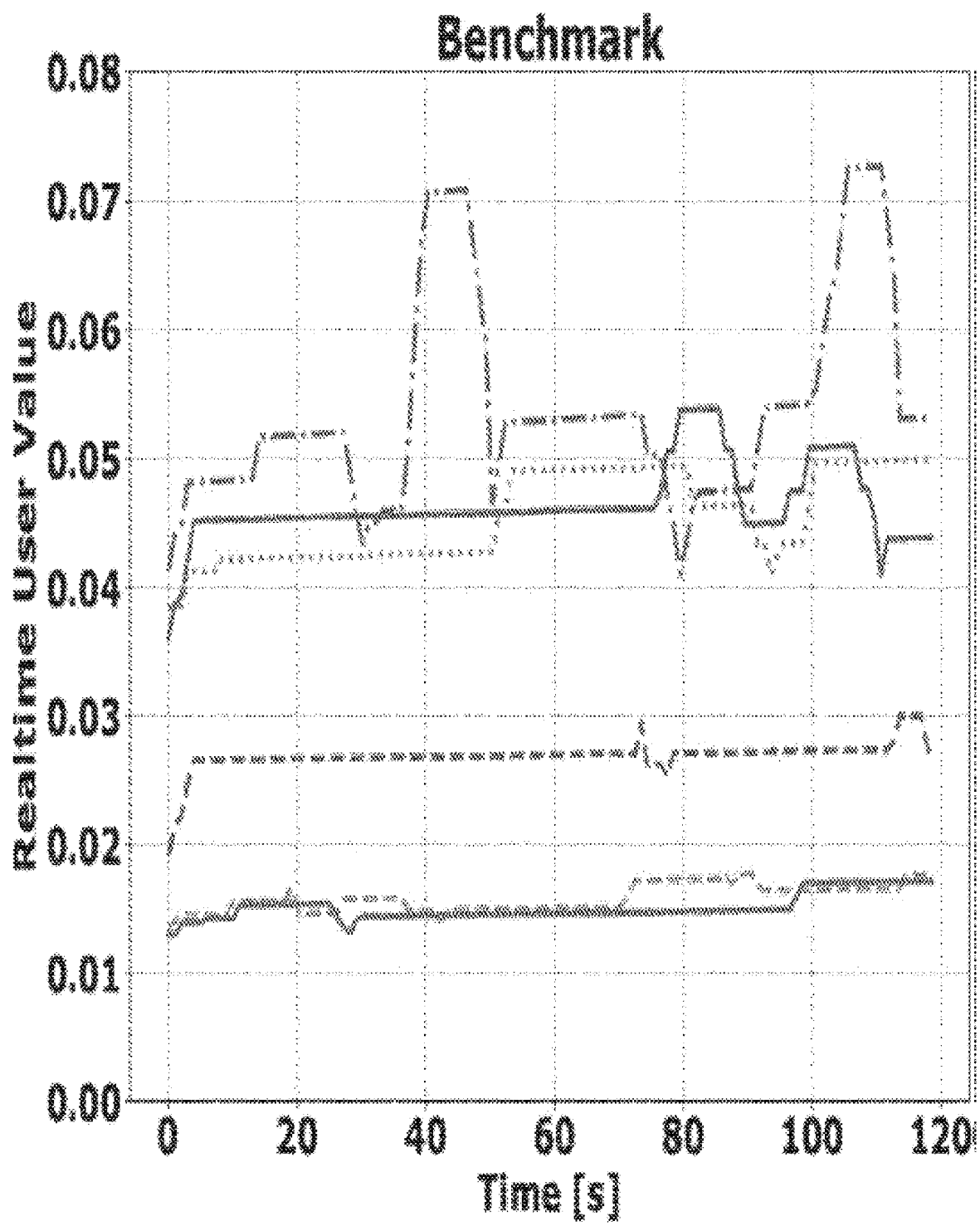
FIG. 20B is graph illustrating exemplary real-time user values, according to benchmarks where flows are not shaped.
Figure 20C:
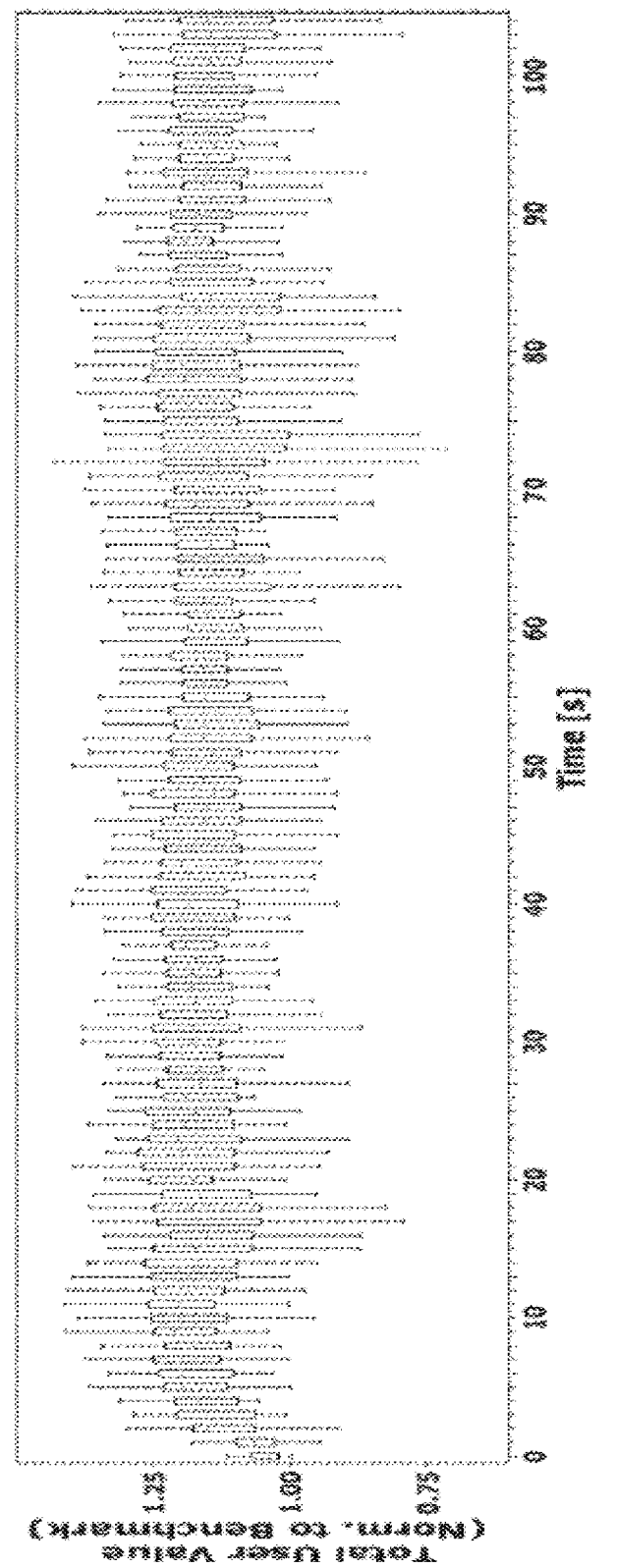
FIG. 20C is a graph illustrating exemplary total user value (normal to benchmark) versus time.

FIGS. 20A-20C show exemplary per-user real-time values. We compare FlowTele with the status quo where flows are not shaped (e.g., TCP fairness). When controlled by FlowTele, user values are clearly clustered into different categories, whereas in the non-controlled scenario, realtime values, especially for high-valued users, vary greatly. As a result, FlowTele achieves on average 15% more aggregate user value compared with the status quo.

Co-bottleneck detection is a key part of cooperative congestion control. Previous co-bottleneck detection work takes two main signals from TCP, packet loss and delay, and correlates them either directly or through summary statistics to detect co-bottleneck links. Loss-based methods may be robust but converge slowly, whereas delay-based methods may converge quickly but use potentially noisy latency signals. Delay-based methods measure either One-Way Delay (OWD) or RTT; however, accurate one-way delay measurements may require client support to reply timestamps. Since the design goal of the fCoder module is to detect co-bottlenecked flows among a set of co-located sources with neither in-network nor receiver-side support, the fCoder module may choose RTT analysis over OWD. In particular, the fCoder module may perform passive detection by correlating smoothed RTT data. The fCoder module may not achieve the highest detection accuracy in all types of scenarios; rather, the fCoder module may excel at detecting bottlenecks among flows with co-located sources, and the fCoder-ML module may extend the fCoder module to facilitate very fast detection of co-bottlenecks across large number of flows.

Many transport protocols have recently been proposed, such as BBR, PCC, QUIC in wide area networks, and DCTCP in data center networks. As discussed above, the fShaper module is not another TCP variant. Instead, it is cross-flow bandwidth reallocator built on top of the underlying transport protocol. We demonstrate an fShaper module on TCP Cubic, but the fShaper module may not be fundamentally limited by the transport protocol.

In general, network traffic shaping may be done locally; for instance, Internet Service Providers may shape their traffic to reduce peak utilization. When network flows are bottlenecked on remote links, flow senders may have limited shaping capabilities. Although it is possible for senders to enforce various queuing mechanism in private WAN or data center networks, fine-grained shaping in generalized networks is still challenging. Destination-driven policies may facilitate senders to reallocate bandwidth across flows at Cloud middleboxes. However, the systems and methods described herein, FlowTele, may not require intermediate deployment.

Because of the importance of video as an Internet traffic source, several studies have aimed to improve the quality of experience (QoE). While we instantiate the vAlloc module and evaluate FlowTele for video streaming applications, we rely on previous measurement data to model state machine transition probabilities and use previous user experience models to evaluate the social fairness of the vAlloc module. Furthermore, FlowTele may not be limited to video streaming rather, the vAlloc module may optimize any hybrid economic-and-performance metric for a variety of bandwidth-constrained applications.

In certain aspects, a second integrated evaluation may be based on a hybrid platform with both an emulated network and the Internet. Our hybrid platform gives us accurate control over the emulated network topologies, giving us fine-grained control over bottleneck bandwidths, while flows still experience unpredictable cross-traffic and possibly routing changes.

Figure 21:
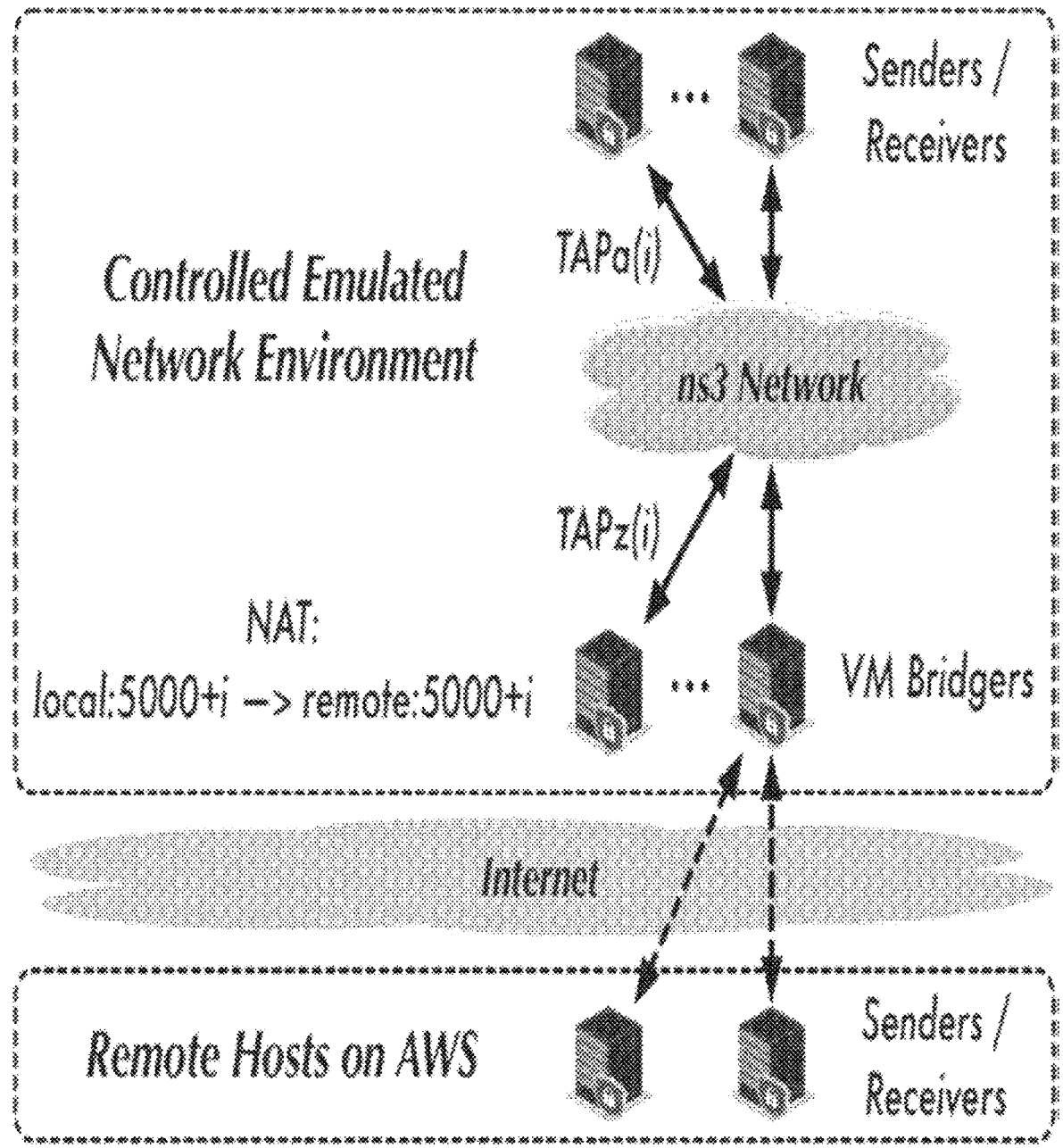
FIG. 21 is a block diagram illustrating an example hybrid platform, according to certain aspects of the disclosure.
Figure 22A:
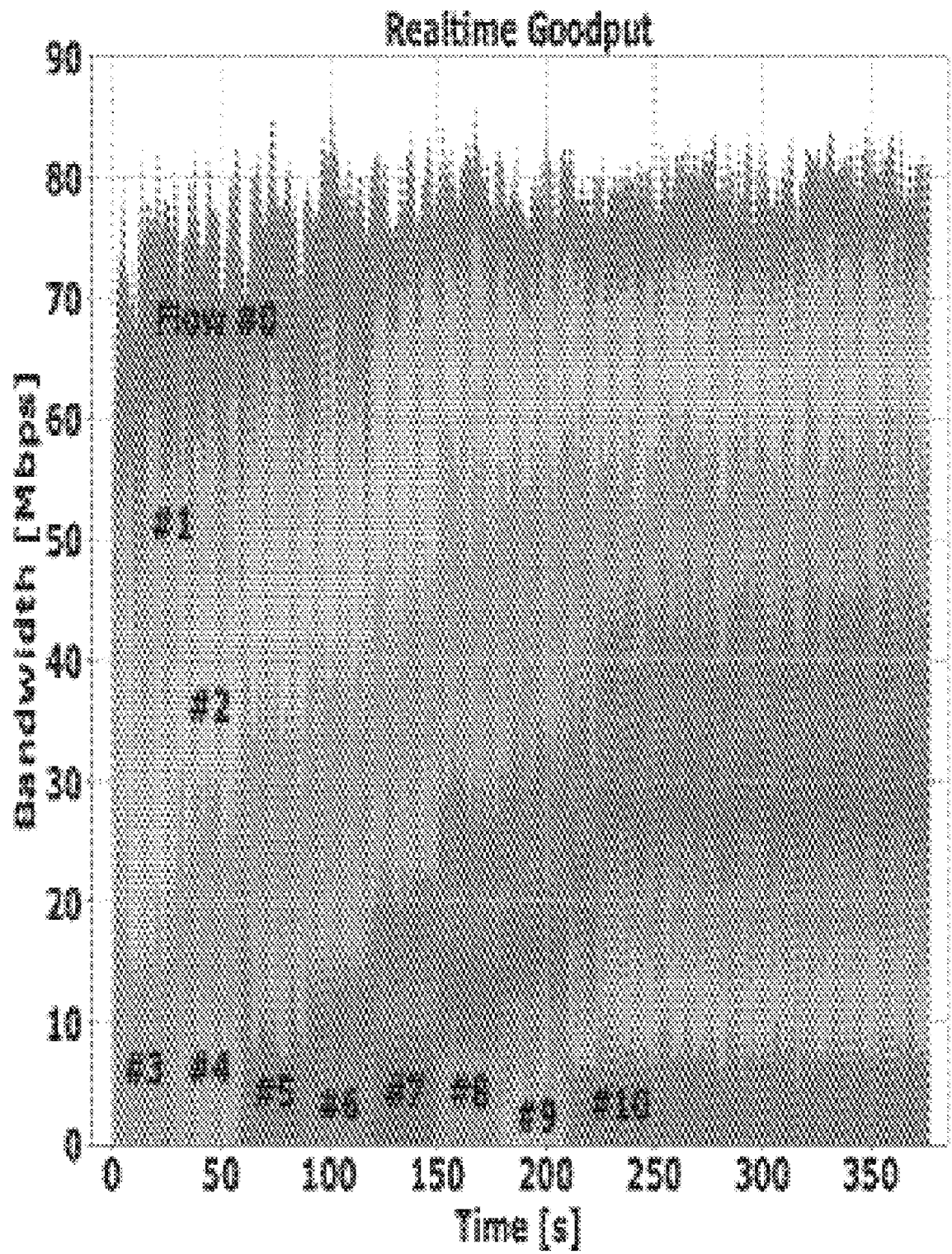
FIG. 22A is a graph illustrating example real-time Goodput flows.
Figure 22B:
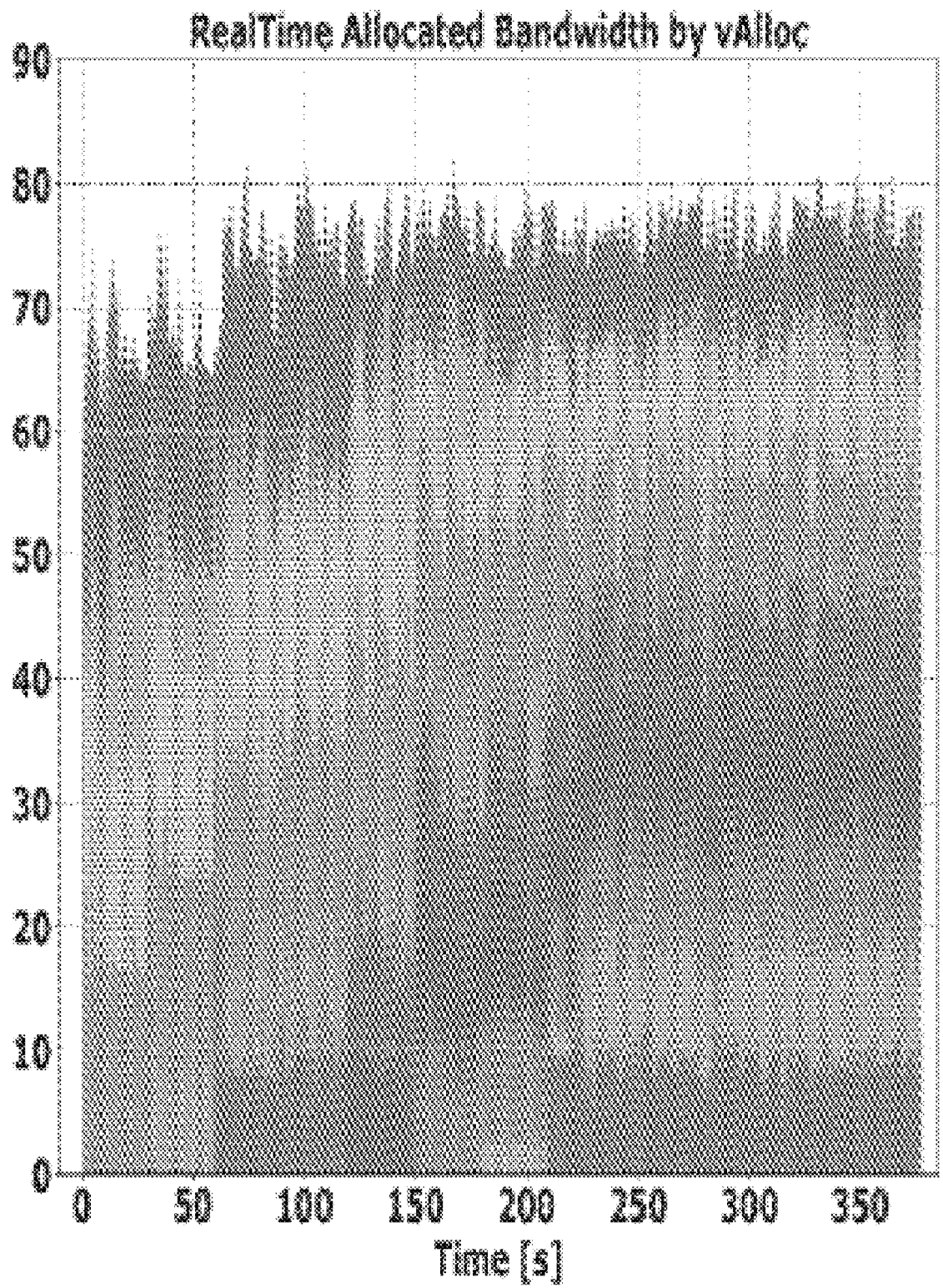
FIG. 22B is a graph illustrating example real-time allocated bandwidth, according to certain aspects of the disclosure.
Figure 23A:
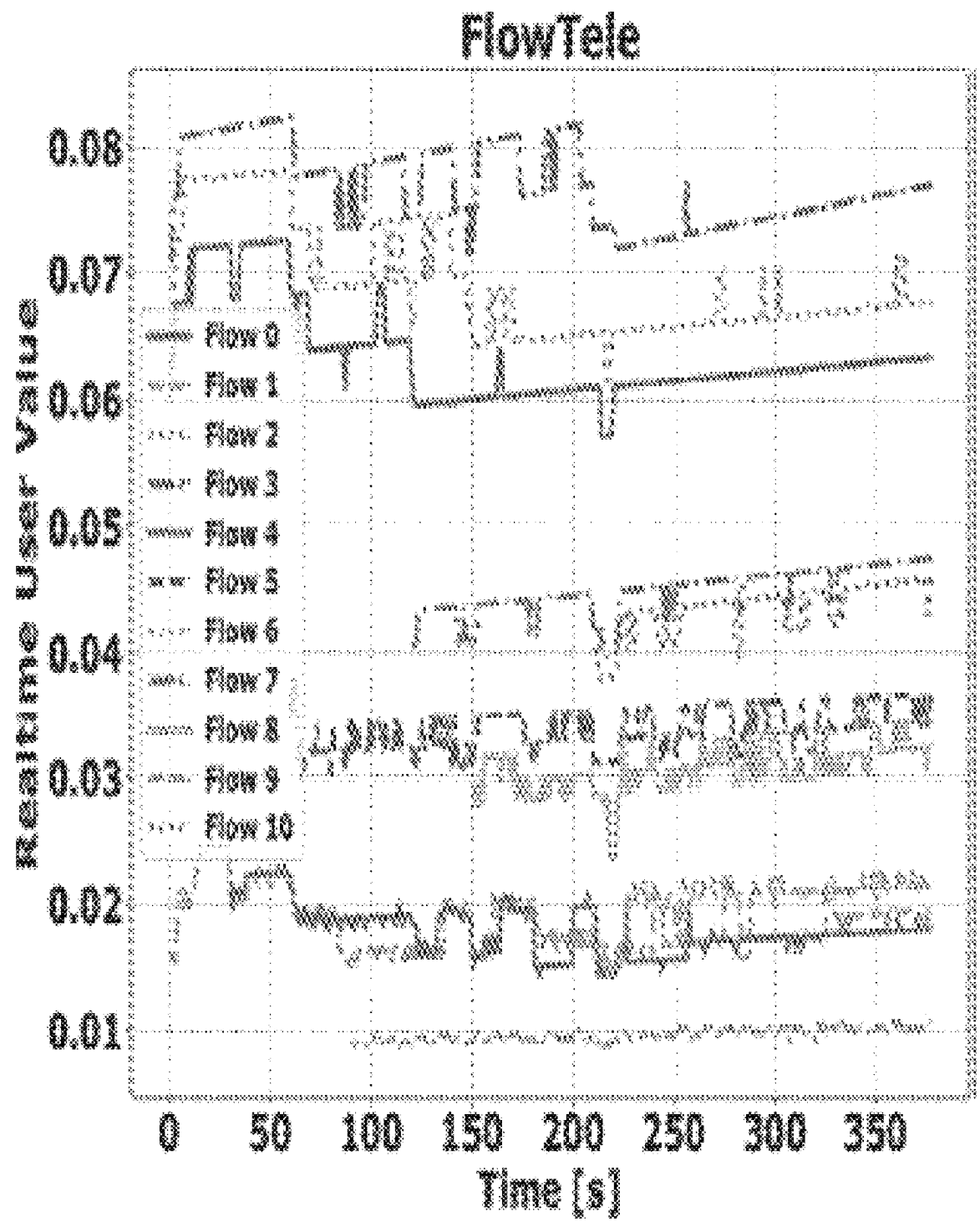
FIG. 23A is a graph illustrating example real-time user values, according to certain aspects of the disclosure.
Figure 23B:
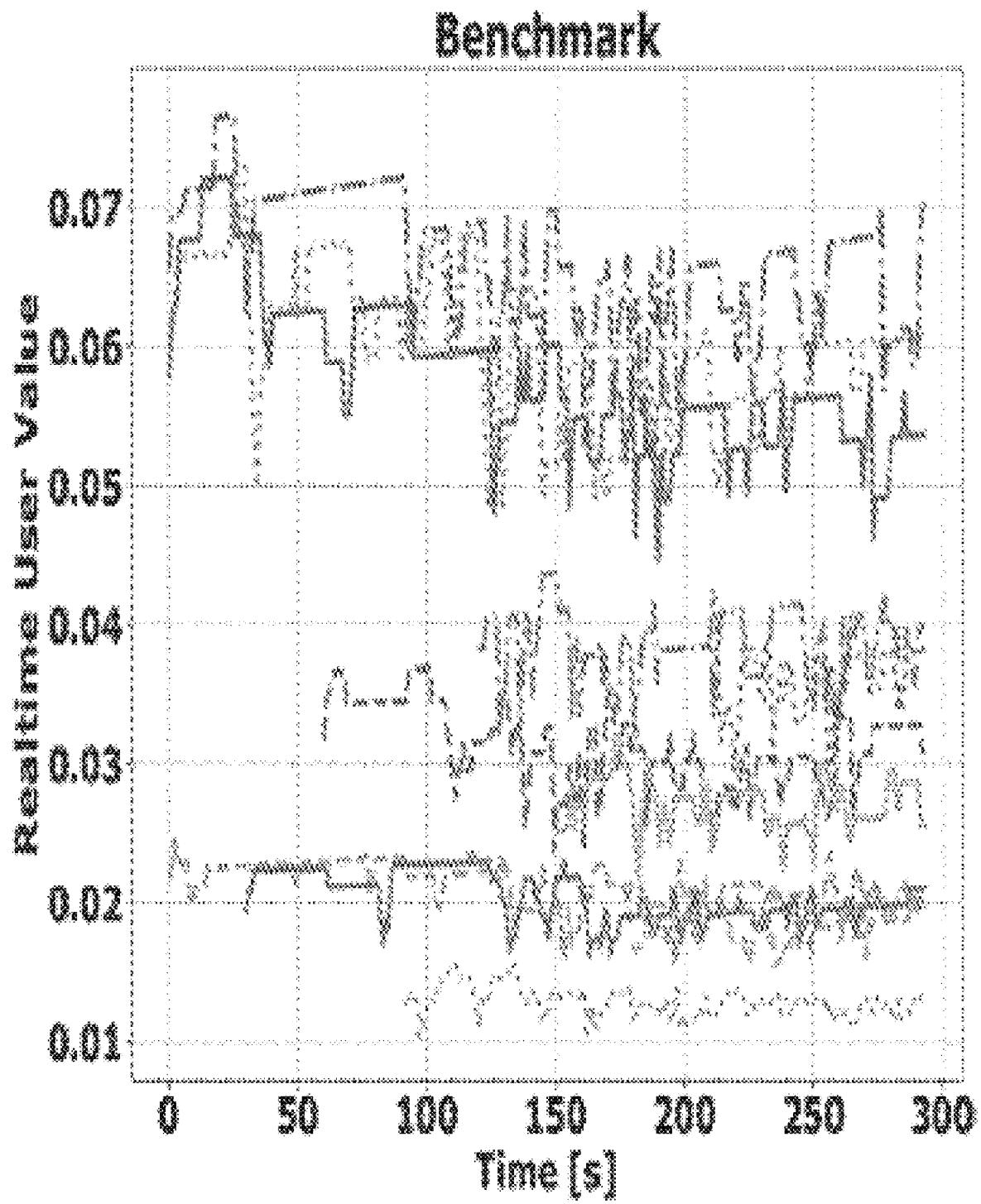
FIG. 23B is graph illustrating example real-time user values, according to benchmarks where flows are not shaped.
Figure 23C:
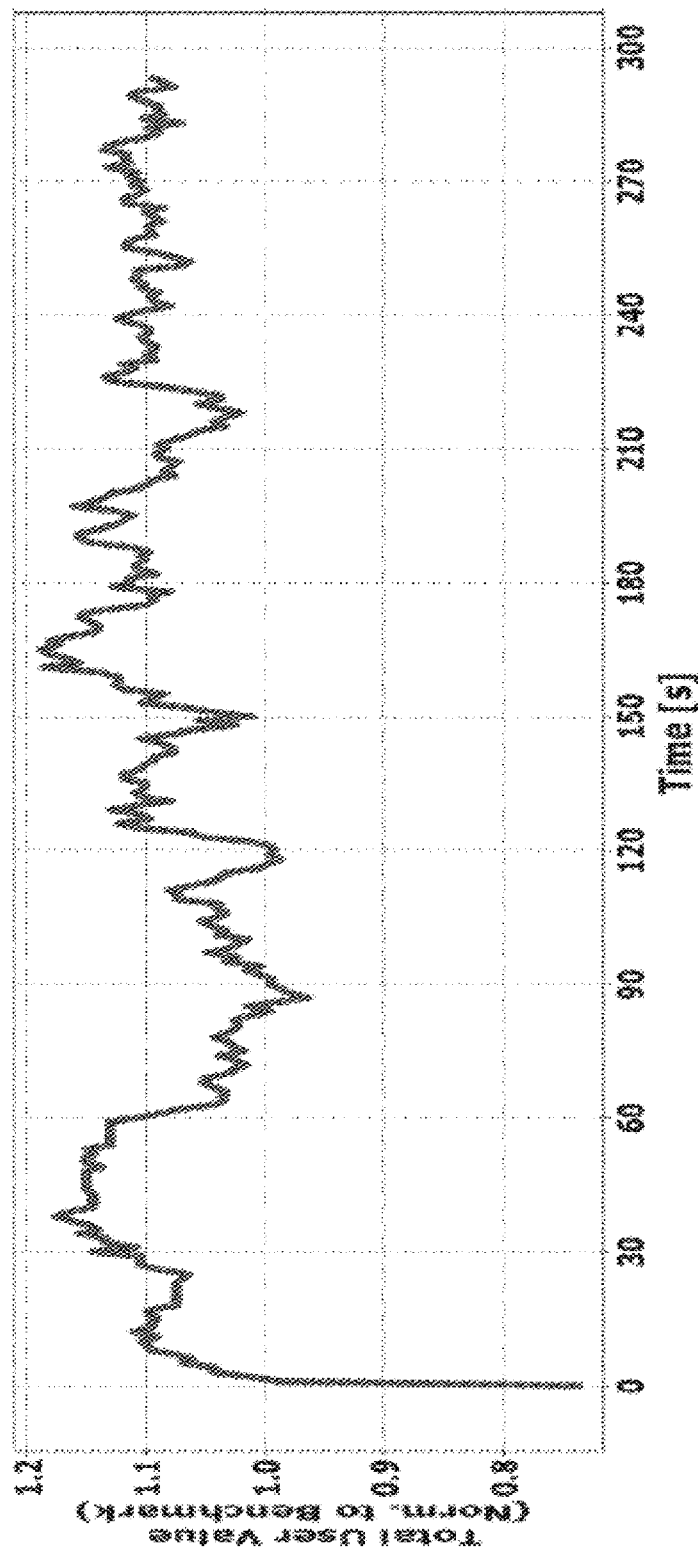
FIG. 23C is a graph illustrating exemplary total user value (normal to benchmark) versus time.

As illustrated in FIG. 21, the hybrid platform integrates local hosts (running on VMs), a ns-3 emulated network, and remote hosts (running on VMs) on AWS EC2. Local hosts and the ns-3 network are interconnected by Tap-Bridge, where the first group of local VMs are originating and consuming flows, and second group of local VMs serve as local proxies for remote hosts, forwarding packets between our emulated network and the Internet using NAT. In emulated ns-3 networks, packet processing is CPU-bound, and our commodity desktops could not handle our target throughput. Thus, in order to allow for high bandwidth flows, we created a virtual clock observed by our VMs that runs 30 times slower (configurable) than real-time. Specifically, we modified hpet_enable( ) in hpet.c to create a new HPET clock source that runs a configurable amount slower than real-time. In ns-3, we also modified the WallClockSynchronizer::GetRealtime( ) to get a slower wall clock. This clock virtualization may allow us to emulate hundreds of megabits per second on our platform.

Figure 24A:
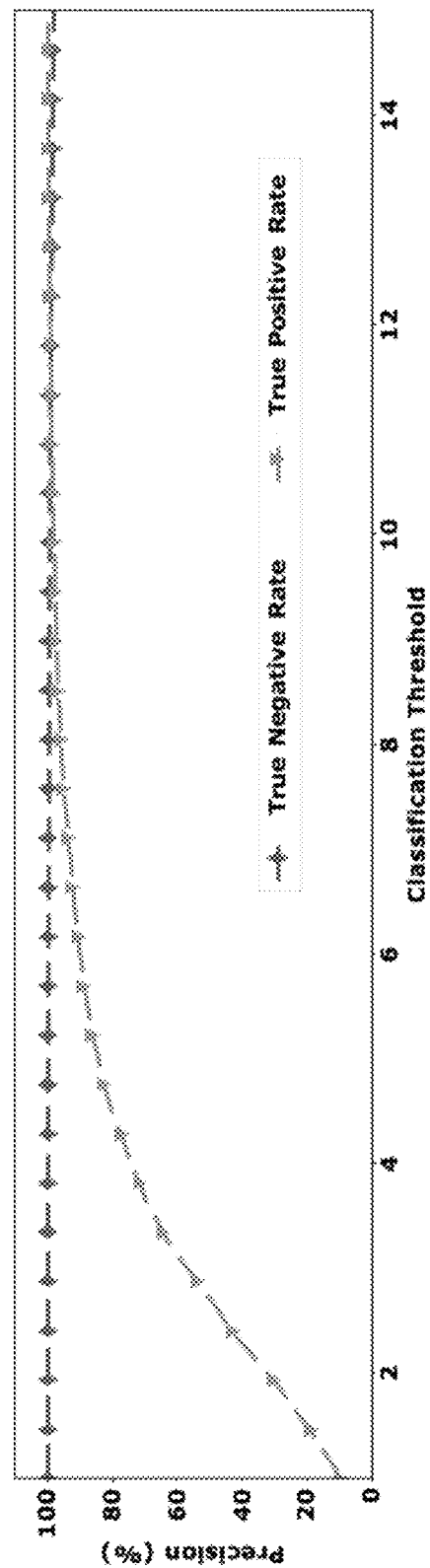
FIG. 24A is a graph illustrating exemplary classification performance of a co-bottleneck detector fCoder module with machine learning when $P_{weight}=1$.
Figure 24B:
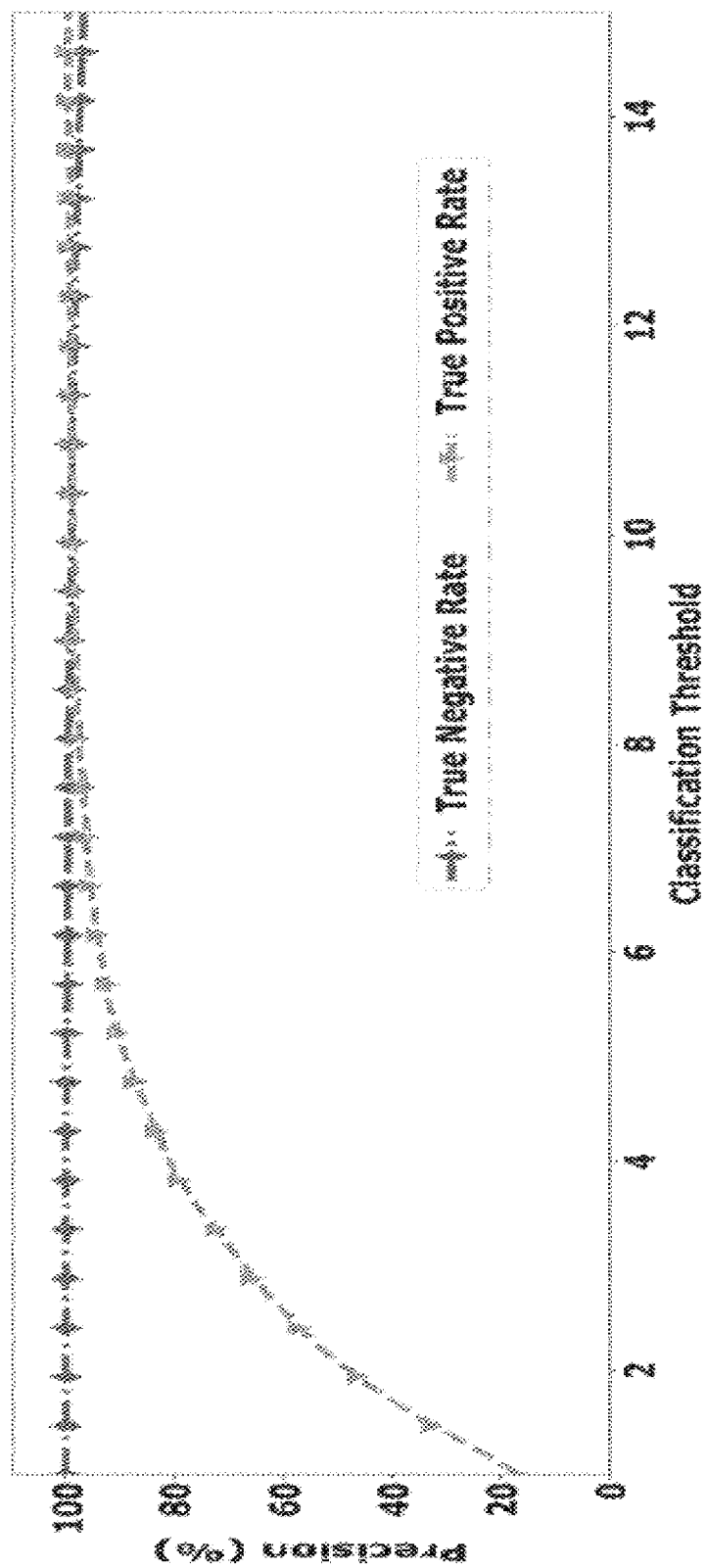
FIG. 24B is a graph illustrating exemplary classification performance of a co-bottleneck detector fCoder module with machine learning when $P_{weight}=3$.

We also evaluated the fCoder-ML module's performance with different $P_{weight}$, the factor to control the gap between negative and positive cases in the loss function EQ. (1). Results are shown in FIGS. 24A and 24B. With a higher $P_{weight}$, the fCoder-ML module may achieve a relatively high true positive rate at the same classification threshold, and a slightly lower true negative rate at large classification thresholds.

The results of our integrated evaluations in the hybrid Internet-and-ns-3 emulation environment are now discussed. We present hybrid results to have stronger control over the bottleneck link, and because our virtual clock facilitates the evaluation of additional simultaneous flows. Our hybrid evaluations may use ten (10) regular flows and one (1) calibration flow, as compared to five (5) regular flows and one (1) calibration flow in our Internet-scale experiments. Different from our Internet trials, we introduce additional co-bottlenecked flows with randomly sampled values joining the system dynamically throughout the run. The evaluation results are shown in FIGS. 22A, 22B, and 23A-23C. Overall, we observe the similar results on our emulation platform as those of the Internet trials discussed above.

We also evaluated the fCoder-ML module's performance with different $P_{weight}$, the factor to control the gap between negative and positive cases in the loss function equation (Eq. 14). Results are shown in FIGS. 7A and 24A-24B. With a higher $P_{weight}$, the fCoder-ML module may achieve a relatively high true positive rate at the same classification threshold, and a slightly lower true negative rate at large classification thresholds.

Figure 26A:
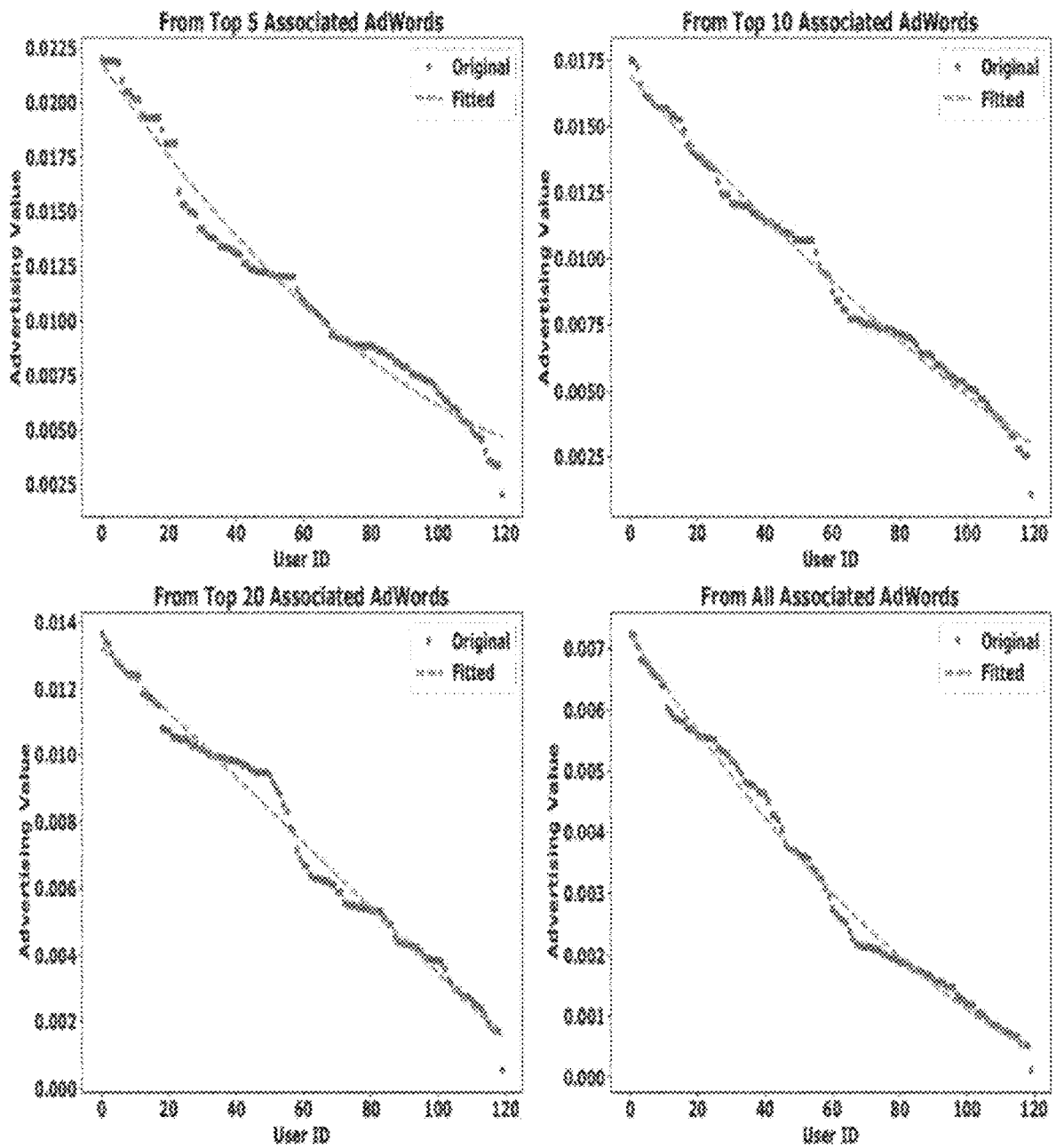
FIG. 26A illustrates graphs depicting example advertisement values of Facebook and Google AdWords and their fitted curves using quadratic distributions.
Figure 26B:
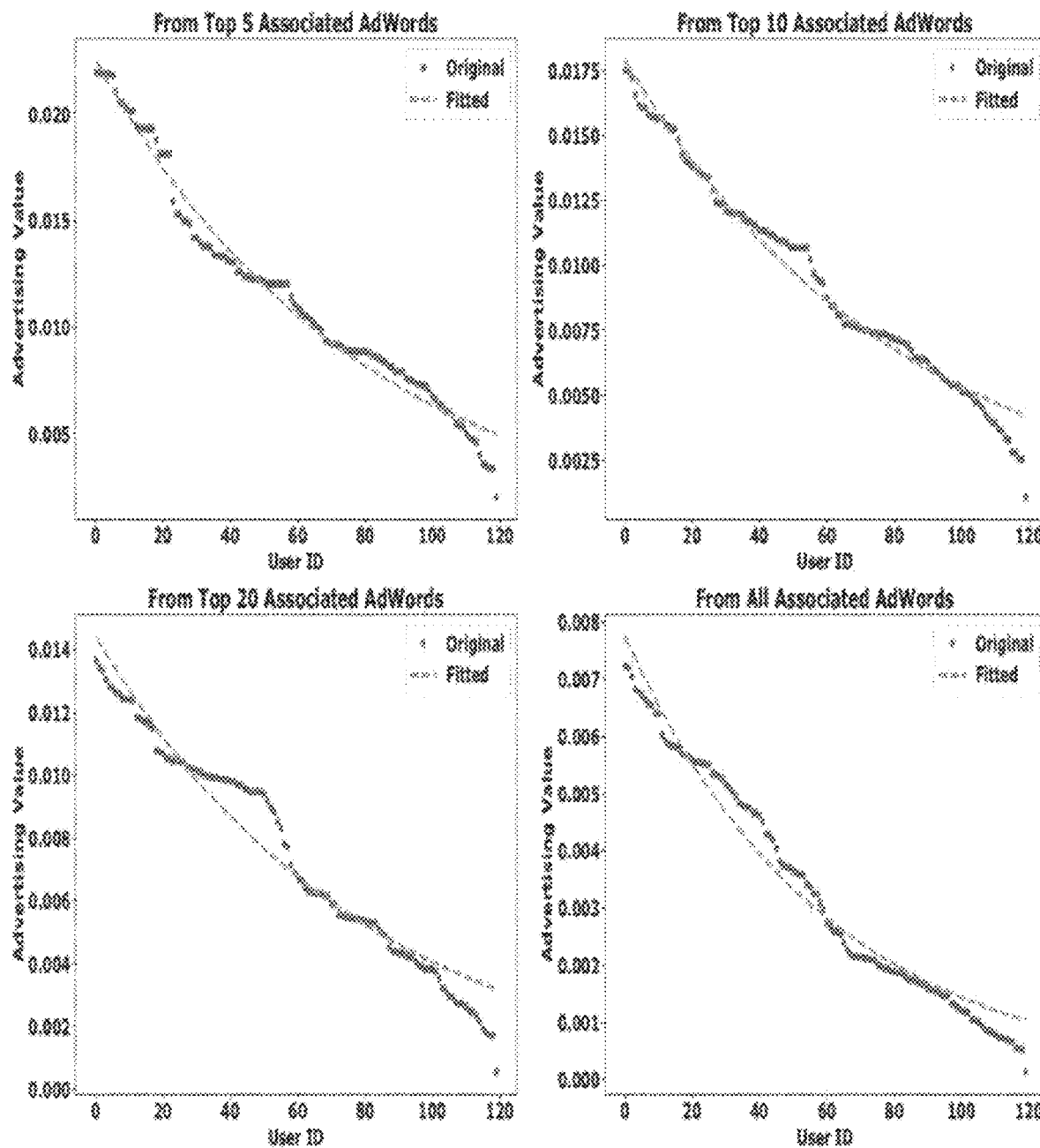
FIG. 26B illustrates graphs depicting example advertisement values of Facebook and Google AdWords and their fitted curves using exponential distributions.
Figure 26C:
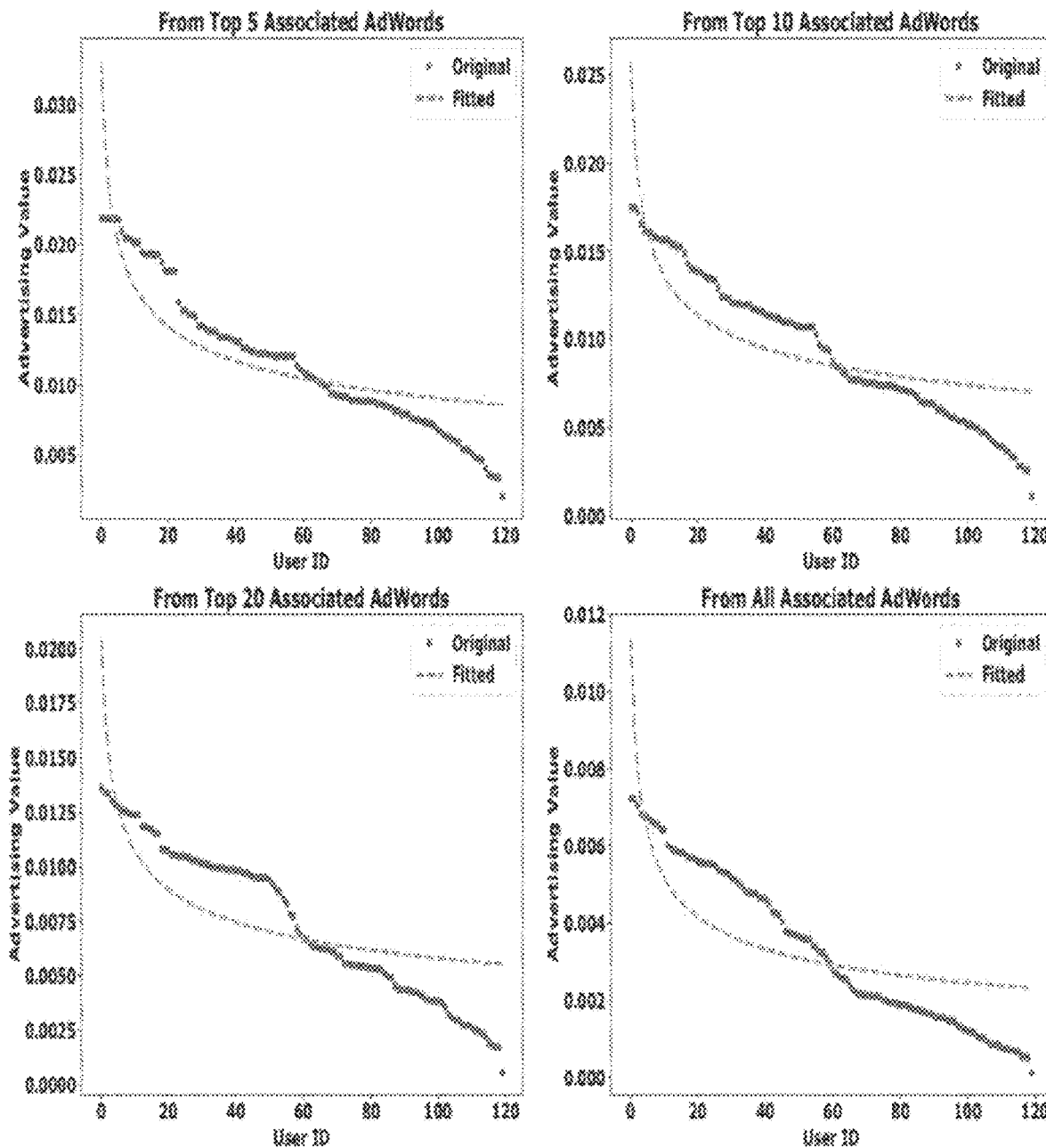
FIG. 26C illustrates example graphs depicting example advertisement values of Facebook and Google AdWords and their fitted curves using Weibull distributions.

FIGS. 25A-25I show the exemplary value distributions of Google AdWords we collected in nine additional cities. FIGS. 26A-26C plot the exemplary quadratic, exponential and Weibull fitting results, respectively, for our synthesized user profiles based on Facebook and Google datasets for different advertising strategies. The quadratic fitting shows the best coefficient of determination for this dataset, so we use it as one of our representative value distributions for the vAlloc module and integrated evaluation.

In our examples herein, we demonstrated the heterogeneity of user values to advertising-driven or paid-content content providers using real-world advertisement or paid-content pricing We then described the fCoder module configured to detect when flows share the same bottleneck, and the fCoder-ML module to speed the identification of flows that might share the same bottleneck, and demonstrated their accuracy and performance. Next, we described the vAlloc module that uses a MCKP-solver to choose next-interval bandwidth and buffer-time choices that maximize a content-provider metric (e.g., user value, user desirability, user experience, etc.). We also demonstrated that the vAlloc module may achieve better aggregate content-provider metrics subject to a bandwidth limit across a wide range of user models, and that the vAlloc module achieves these improved metrics without excessively sacrificing fairness to lower-value users. Furthermore, the vAlloc module outperforms intentionally unfair approaches that deliberately remove the lowest value users, so it may provide both better fairness and value as compared to naïve approaches. The final part of FlowTele described herein is the fShaper module, which takes bandwidth splits from the vAlloc module and delivers the target bandwidth weights to each flow. Herein, via the examples, we demonstrated that the fShaper module may accurately split available bandwidth to target ratios while retaining friendliness to cross-traffic. Finally, we evaluated a complete exemplary FlowTele implementation, with about 9700 lines of code, through Internet-scale experiments and hybrid Internet-and-ns-3 emulation. We also demonstrate that in reasonable scenarios, at equal bottleneck bandwidths, FlowTele may improve aggregate metrics, e.g., user value, by between 9% and 20%.

FIG. 27 illustrates another example FlowTele architecture 2700 for the for remotely allocating bandwidth among network users. The FlowTele architecture 2700 may include an embodiment of the FlowTele architecture 300, described herein with reference to FIG. 3. The FlowTele architecture 2700, which will be described hereafter, facilitates content providers to remotely shape their network flows based on a combination of self-desired factors in a manner that is TCP-friendly to cross-traffic sharing the same downstream bottlenecked path. The FlowTele architecture 2700 includes an fCoder module 2703, an fAllocator module 2706, an iShaper module 2709, a vAlloc module 2712, and a qAlloc module 2715. Each of the vAlloc module 2712 and the qAlloc module 2715 may be special-purpose instantiations of the more general fAllocator module 2706. The FlowTele architecture 2700 is powered by a stack of innovative designs.

The fAllocator module 2706 may compute per-flow bandwidth allocations to optimize content-provider-oriented metrics. The fAllocator module 2706 may receive data regarding co-bottleneck flows from the fCoder module 2703. The fAllocator module 2706 may output bandwidth estimate data to the fShaper module 2709. The fAllocator module 2706 may then receive allocation decision data from the fShaper module 2709 to be used in allocating bandwidth to various flows in the network.

To demonstrate the capability of fAllocator (and the generality of FlowTele as a whole), we instantiate fAllocator with two concrete designs for optimizing economic and social benefits, respectively, in the context of video streaming applications, the most bandwidth hungry applications that dominate the Internet traffic. The vAlloc module 2712 may be configured to optimize aggregate advertising or paid content revenue, and the qAlloc module 2715 may be configured to optimize fair quality-of-experience (QoE) among co-bottleneck flows. Any number of different concrete designs for special-purpose instantiations of the fAllocator module 2706 may be generated and used in conjunction with one another to target different user parameters, different metrics, and/or different aggregate goals for which to compute optimized solutions based on allocating bandwidth to content consumers/users.

The combination of user value distribution module 2742 and user behavior model 2745 of the vAlloc module 2712 may be a special-purpose instantiation of the user parameters module 2724 of the fAllocator module 2706. The aggregate revenue module 2751 of the vAlloc module 2712 may be a special-purpose instantiation of the desired metrics module 2727 of the fAllocator module 2706. The MCKP approximation solver module 2748 of the vAlloc module 2712 may be a special-purpose instantiation of the of the optimal bandwidth allocation solver module 2730 of the fAllocator module 2706.

Likewise, the combination of user bandwidth model module 2754 and user QoE model module 2757 of the qAlloc module 2715 may be a special-purpose instantiation of the user parameters module 2724 of the fAllocator module 2706. The aggregate QoE module 2760 of the qAlloc module 2715 may be a special-purpose instantiation of the desired metrics module 2727 of the fAllocator module 2706. The QoE maxmin solver module 2763 of the qAlloc module 2715 may be a special-purpose instantiation of the of the optimal bandwidth allocation solver module 2730 of the fAllocator module 2706.

The fShaper module 2709 may be configured as a source-control mechanism to remotely enforce accurate weighted fair share across a set of flows. At a very high level, fShaper may include any number of scheduler modules 2733 that provide input to a cross-flow rate allocator module 2739. The scheduler modules 2733 may operate in a manner similar to the schedulers 360 of the fShaper module 315 described with reference to FIG. 3. The cross-flow rate allocator module 2739 may include a congestion window reallocation algorithm that redistributes congestion windows among the set of co-bottlenecked flows in accordance with fAllocator's allocation output Through extensive Internet-scale evaluations, we demonstrate that fShaper achieves both internal weighted fairness, e.g., the outbound rates of controlled flows converge to desired weighted fair shares, and external TCP friendliness, e.g., the controlled flows in aggregate exhibit fairness against TCP cross-traffic.

The fCoder module 2703 may be configured to achieve accurate flow co-bottleneck detection and further scale fCoder's detection capability via Machine Learning techniques. The fCoder module 2703 may operate in a manner similar to the fCoder module 305 described with reference to FIG. 3. The fCoder module 2703 includes a flow profiling and correlation module 2718 and an ML-enhanced automation module 2721 that work together to detect co-bottleneck flows and provide corresponding data to the fAllocator module 2706.

FlowTele is the first system architecture that facilitates flow senders to reclaim complete control over their flows, even if they traverse ISP-owned external links, by remotely shaping traffic on Internet-scale networks in accordance with certain cross-flow bandwidth allocations. Notably, FlowTele may simultaneously achieve source-driven and in-network traffic management, a benefit that has to date been unachievable in globally distributed and heterogeneous networks, such as the Internet, where flow sources have little control over in-network routing and protocol deployment We fully implement FlowTele in about 7400 lines of code and evaluate it substantially through analytical simulations and largescale Internet experiments. The evaluation results show that, when traversing a shared bottleneck link, vAlloc may achieve a 15% improvement in revenue, and qAlloc may achieve a 12% improvement in minimum user experience, and a single instance of both can efficiently perform bottleneck allocations for O(100) flows.

Internet-scale co-bottleneck detection is challenging due to dynamic and unknown cross-traffic and routing. The fCoder module 2703 may take advantage of information that when two flows traverse the same bottleneck link, the queuing-induced latency at that bottleneck link will vary over time and be experienced similarly by both flows. Thus, the fCoder module may compute a profile for each flow based on real-time round-trip-time (RTT) measurements and cross-correlate these profiles to detect co-bottlenecked flow pairs. Because cross-correlation is computationally expensive, a twin neural network may be trained in an fCoder-ML module to promptly produce a set of candidate co-bottlenecked flow pairs, enabling deployment of the fCoder module in large-scale providers with millions of outbound flows.

A key piece that facilitates FlowTele to optimize content-provider-selected metrics across multiple co-bottlenecked flows is the fAllocator module, which computes and sets the desired bandwidth allocation among co-bottlenecked flows in order to achieve certain objective metrics. Since video streaming applications are bandwidth hungry and dominate Internet traffic, we discuss the fAllocator module configured for such applications. However, the methodology of the fAllocator module is generalizable to a variety of bandwidth-constrained applications where available bandwidth dictates user behavior or experience, and where a variety of bandwidths may create viable (though potentially different) experiences. In addition to video streaming applications such as VR gaming, videoconferencing, video livestreaming, and federated computing may all benefit from the FlowTele architecture discussed herein. At a high level, the fAllocator module proceeds as follows. For each user/flow, for each possible combination of (video quality, buffer length), fAllocator may determine the content-provider-selected metrics for that user and that (video quality, buffer length) pair. The fAllocator module may also determine bandwidth required in the next time interval in order to reach that (video quality, buffer length) pair at the end of the interval. Finally, for each co-bottlenecked flow, the fAllocator module may choose a target (video quality, buffer length) pair that maximizes or optimizes the content-provider-selected metrics subject to some aggregate limit on required bandwidth.

The fAllocator module may be architecturally agnostic to the content provider's choice of metric, and even how that metric is computed. For example, a content provider whose primary revenue source is through paid advertising or delivery of paid programming may aim to maximize revenue, particularly during times of low bottleneck bandwidth. In this case, the metric may be set as aggregate user value that the provider can extract over the bottleneck. Below, the vAlloc module, which is a concrete example embodiment of fAllocator that takes this approach, will be described. Note that while user value is described in this paragraph and example in the context of economic value, user value may be measured, computed, and evaluated in non-economic terms, also, as described earlier herein. Another example may be that a content provider chooses to provide an equitable distribution of quality of experience (QoE), even across disparate network connections (and consequently disparate buffer requirements). In this case, the metric may be set as QoE and the aggregation may be set as the minimum across all metrics, e.g., aiming to maximize the experience of the lowest-experience user. The qAlloc module, discussed below, is the second concrete example embodiment of fAllocator that takes this approach.

The exemplary FlowTele discussed herein with respect to FIG. 27 may require the content provider to shape outbound traffic to achieve the per-flow bandwidth allocations specified by fAllocator while simultaneously remaining friendly to non-participating traffic sharing the same bottleneck links. Towards this end, an fShaper module is configured as a source-control based mechanism to redistribute the provider's total TCP fair share over a bottleneck link among the set of provider-owned flows in accordance with fAllocator's outputs. The fShaper module may be implemented upon TCP Cubic and may demonstrate its effectiveness via substantial Internet-scale experiments. As an entirely sender-based mechanism, the fShaper module relies on neither in-network support nor special receiver implementations to fulfill its role in FlowTele.

The vAlloc module may be an economically-driven bandwidth allocator aiming to reap the optimal aggregate user value under downstream bandwidth constraint. We first discuss the nonuniformity in user value distribution that motivates vAlloc. We then discuss a generic user behavior modeling approach for video streaming to quantify the impacts of various bandwidth allocations on provider revenues. The actual per-user allocation may be formulated as a Multiple-Choice Knapsack Problem (MCKP), which we may solve effectively using the Fully Polynomial Time Approximation Scheme (FPTAS). We clarify that vAlloc is fundamentally different from a strawman design where a content provider naïvely throttles bottom low-valued users, which is neither socially friendly nor economically optimal, as we demonstrate by evaluation herein. We also show that while variations in user model do affect the extent of vAlloc's improvements, improvements are robust to changes in user model parameters. Furthermore, while vAlloc is evaluated against a user model drawn from prior work, all but the smallest content providers may have sufficient data to build an accurate user model for their users, which they can then use for their optimizations.

A key observation of the vAlloc module is that the economic value of a user to a content provider may not be uniform, and may even follow heavy-tailed distributions. As a result, a small shift in the behavior of high-value content consumers or users may provide disproportionate returns to the content provider, especially when a content provider experiences downstream congestion. This non-uniform distribution of user values arises from several etiologies: (i) many content providers rely on advertisements or paid content delivery agreements, the values of which are often heavy tailed (as shown below), to support their operations; (ii) users of social media provide additional value to content providers both by providing content that may attract more viewers; such social influence is often heavy-tailed (e.g., as measured by Twitter and Instagram followers or YouTube subscribers); (iii) even for content providers that charge a flat monthly rate to subscribers to receive their content, unequal distribution of viewing frequency may mean that certain users' traffic is more valuable, for example, in terms of revenue per hour watched or revenue per unit of content data delivered to the respective certain users than to other users.

We collected and analyzed two real-world datasets to quantitatively validate the non-uniform distribution of user values. First, we gathered a collection of Google AdWords by providing Google's AdWord suggestion mechanism with all two-letter prefixes and compiling all suggested words; this approach yielded over 6000 AdWords. Next, we chose a set of 14 cities across the United States by sampling the 2010 US Census list of Metropolitan Statistical Areas and determined the per-impression cost of each selected AdWord in each selected city. For each city, we sort the ad terms from highest value to lowest value and plot the ad term number on the x-axis against its value per impression on the y-axis. Two representative results are shown in FIGS. 2A and 2B, and more results are shown in FIGS. 25A-25I and 26A-26C. We fit each city's data using the Weibull distribution. These figures show that the value distribution of our collected AdWords is heavy-tailed.

The second collected dataset includes 120 Facebook profiles from the ADS dataset. Each profile includes a list of likes and dislikes, which we manually mapped into the list of our harvested Google AdWords. For each profile, we strategically select the top 100 most valuable AdWords to reflect each profile's potential interests in buying the associated products. We considered different advertising schemes: one where each advertisement is randomly drawn from the top 5 highest-value AdWord categories of interest to the profile, the top 10 highest-value categories, the top 20 categories, and all categories. For each advertising scheme, each user has a specific value, which we fit using three distributions: quadratic, exponential, and Weibull. FIGS. 2A and 2B show the top-5 and top-10 strategies with quadratic fitting; other results are shown in FIGS. 26A-26C.

A single unified user value distribution may not be feasible, because user values vary from provider to provider, from application to application, from economy to economy, and even from season to season (e.g., the pricing of political advertisements on Facebook). Rather, for the experiments described herein, we put together a collection of distributions that represent user value distributions characterizing our collected datasets. As a result, even without knowing the true user value distribution in any particular application, our analysis strongly suggests that user values are often non-uniform. Furthermore, the distributions we choose affect only our quantitative evaluation results; a service provider implementing FlowTele may have run-time information on user value and may not need to rely on a user value distribution.

In order to quantify the impact of bandwidth allocation on provider revenue, we first model user behavior for video streaming applications based on the Finite State Machine illustrated in FIG. 8. In our model, a content consumer or user progresses through various states of the streaming process, labeled Watch (when the user watches primary content) and Ad (when the user watches an advertisement or paid content). In addition, the state machine of FIG. 8 includes two transient states: Done when the current video has finished playing and Leave when the user leaves the current session. Since traffic management may only impact the streaming quality, in this model, different bandwidth allocations may only affect a user's willingness to continue to watch the video and advertisement (e.g., the two transition probabilities pwl and pal in the state machine). Other model parameters, specifically pdl, may also be a significant part of the revenue model. For example, if pdl=0, then the user's watching time may be entirely driven by video quality metrics, while if pdl=1, each user will watch at most one ad, and the bandwidth allocation policy may not have an impact on the advertising revenue from this user visit.

Buffer time and playback bitrate (e.g., driven largely by video resolution) may affect user engagement. We use such data to model pwl and pal using the methodology described below. In a real deployment of an embodiment of FlowTele, content providers may have comprehensive data about each of their users or content consumers, such as a user's preferred video type, its impact on the playback bitrate, and their users' willingness to stay watching given lower resolution or long buffering time, so that content providers may customize the transition probabilities on a per-user basis.

As long as goodput is consistently higher than the video bitrate, a very small buffer is sufficient to avoid buffering events; however, because network performance fluctuates, streaming providers use buffers to limit the impact of fluctuating network performance on user experience. In fact, previous research shows that stream stalls are the most significant factor in user retention. To characterize the amount of buffer needed, we evaluated several residential networks' available bandwidths by collecting several network traces from YouTube-video downloading to determine representative user bandwidth distributions. We sampled these network traces on 100 ms intervals and generate a Markov model for the amount of bandwidth available in each interval and its variance overtime. We then calculated the buffering fraction for various selected playback bitrates and maximum allowed buffer times, by simulating network conditions drawn from the Markov model and computing the resulting buffer times. We considered a range of bitrates based on typical video resolutions and buffer times ranging from 0.1-8 seconds. Then, based on the computed buffer times, we derive a buffering experience, represented by the frequency and ratio of buffering events experienced by a user during the streaming session. Next, based on measurements that quantify user watching time with respect to the user's buffering experience, we translate the profile tuple (buffer, bitrate, bandwidth) of a user to the user's watching time. Finally, we translate the video watching time to a departure probability by assuming that the user's departure is a Poisson process with parameter λ being the watching time of the user. For any given video length, we can then compute a pwl for the user given its profile tuple.

FIGS. 9A and 9B show the bandwidth distributions we collected for different network conditions and different times of day. While generating various users with varying profile tuples, we synthesize a range of distributions by linearly scaling our measured bandwidths to consider various network conditions (e.g., last-hop capacities). FIGS. 10A and 10B show the watching time data presented for varying buffer ratio (fraction of time spent buffering) and buffering events (number of distinct playback stalls) and we fit the curves using exponential (for the buffer ratio data) and quadratic (for the buffer event data) functions. FIGS. 11A and 11B show the computed pwl for a 260-second video streaming session (which was the average video length for top YouTube videos). For clearer presentation, we break the three variables buffer length, bitrate, and bandwidth into two pairs.

The vAlloc module may define the optimal bandwidth allocation as follows. To capture the user behavior in a streaming session, we divide the streaming session into small intervals and model user behavior as described above. For an allocation interval of length $\tilde{t}$, the state of the system is $st_i = \cup_{i \in S}(bi, ti)$, where $b_i$ and $t_i$ are the playback bitrate and buffer time for user $u_i$.

Given a system state, the content provider may compute the expected value of each user and thus the total expected value across all users. Our allocation aims to choose the next state $st_i+1$ to maximize or optimize the total expected value of $st_i+1$ subject to the bandwidth constraint of moving from $st_i$ to $st_i+1$.

To determine the expected value of a user in state $(b_i, t_i)$, we model the streaming system as an infinite stream of interleaved videos and advertisements or paid content, and compute the asymptotic user value based on the transition probabilities (e.g., pwl and pal) determined by the state $(b_i, t_i)$. Specifically, we set p1 to the probability that the user will continue stream to the next revenue point, and p2 to the probability that the user will continue to stream from one revenue point to the next one. For simplicity of notation, we describe the asymptotic user value when videos and advertisements or paid content have a fixed length of $\mathcal{L}_v$ and $\mathcal{L}_a$, respectively, and the value for all advertisements is $\bar{v}$; however, our model extends to heterogeneous video length and advertisement values. The asymptotic user value over the infinite stream may be given by:

$$V_{u_i} = \sum_{k=0}^{\infty} \bar{v} \cdot p_1 \cdot p_2^k = \frac{\bar{v} \cdot p_1}{1 - p_2}, \quad (1)$$

where $$p_1(t) = \frac{\mathcal{L}_v}{\mathcal{L}_v + \mathcal{L}_a} \cdot (1 - p_{w1})^{\frac{\mathcal{L}_v - t}{\tilde{t}}} \cdot (1 - p_{d1}) \cdot (1 - p_{a1})^{\frac{\mathcal{L}_a}{\tilde{t}}} + \frac{\mathcal{L}_a}{\mathcal{L}_v + \mathcal{L}_a} \cdot (1 - p_{a1})^{\frac{\mathcal{L}_a - t}{\tilde{t}}};$$

and $$p_2 = (1 - p_{w1})^{\frac{\mathcal{L}_v}{\tilde{t}}} \cdot (1 - p_{d1}) \cdot (1 - p_{a1})^{\frac{\mathcal{L}_a}{\tilde{t}}}.$$

p1(t) depends on the current state of the user (whether in watching a video or advertisement) and the time until the next revenue point; p2 is constant.

Given this user and revenue model, we consider how to choose an optimal next system state $st_i+1$ from $st_i$. For each user $u_i$, the cost of moving from the current state $(b_i, t_i)$ to the next state $(b_i+1, t_i+1)$ depends on the relative playback bandwidths $b_i$ and $b_i+1$. Specifically, if $b_i+1 \leq b_i$, the current buffered content may still be used, so the bandwidth cost may be $c_i+1 = b_i+1 \cdot \max\{0, \tilde{t}+t_i+1-t_1\}$, where $\tilde{t}$ is the length of the control interval. Otherwise, the current buffer may be unusable, and the bandwidth cost is $c_i+1 = b_i+1 \cdot \max\{0, \tilde{t}+t_i+1\}$. During allocation, all possible values of bitrate are selected based on YouTube data and buffer times are selected from a set of discrete values. Under this model, optimizing the allocation among the current set of users is an instance of the Multiple-Choice Knapsack Problem (MCKP), where for each item (user) the choices are the possible (bitrate, buffer) pairs, the value of each choice is the expected user value of that (bitrate, buffer) pair, the cost is the bandwidth cost $c_i+1$ computed as described above, and the capacity of the knapsack is the total amount of available bandwidth from the previous interval. Because MCKP is NP-hard, we may not always use an exact solution; rather, we may use the FPTAS fully-polynomial approximation to find a solution that has value at least 99% of the optimal solution.

A single instance of the MCKP makes an optimal decision only for the next interval. There may be other choices for the next interval that do not immediately have higher values but serve as a stepping stone to reach higher values in the long run. Planning a sequence of (bitrate, buffer) pairs that reach a final goal state subject to a per-interval bandwidth limit is an instance of the Multi-Dimensional Multiple-Choice Knapsack Problem (MMKP), since each interval is one dimension in this problem. One challenge of expanding our approach to multiple dimensions is that multiple-dimensional knapsack problems do not have fully-polynomial approximations unless P=NP. As a result, our evaluations examine only single-dimensional MCKP.

The highlights of our vAlloc module evaluations are as follows: (i) the vAlloc module achieves over 90% of the total user value when available bandwidth drops to roughly 50% of maximum bandwidth, and outperforms several other bandwidth allocations mechanisms by non-trivial margins. (ii) the vAlloc module is general and sensitive to various user behavior models and value distribution parameters.

We compare the vAlloc module with two classes of bandwidth allocation schemes: the status quo where users' bandwidth are decided by the transport protocol and a strawman design in which content providers remove the lowest-valued users from the system and serve the rest equally. We considered both user-value distributions derived from real data. Our evaluation sets the transition probabilities in the state machine (FIG. 8) such that pwl=pal are computed dynamically, pdl=0.25, pwd=1 only when a video is finished and 0 elsewhere, pwa=1−pwl−pwd, pda=1 (i.e., a new ad is added whenever the previous video finishes), and paw=1−pal. We also analyze different values for leaving probabilities (e.g., pwl, pal and pdl) to demonstrate the generality of our performance improvement.

FIGS. 12A and 12B show the aggregate user values achieved by vAlloc and other bandwidth management mechanisms. We consider a user population where new users come over time independent of the number of existing users. The vAlloc module clearly outperforms the competing mechanisms. The advantage of vAlloc peaks when the available bandwidth is about 50% of the maximum bandwidth, and vAlloc is even better as the distribution becomes more heavy-tailed. Finally, our results also show that simply removing low-valued users during times of bandwidth limitation is neither optimal nor fair.

Figure 14A:
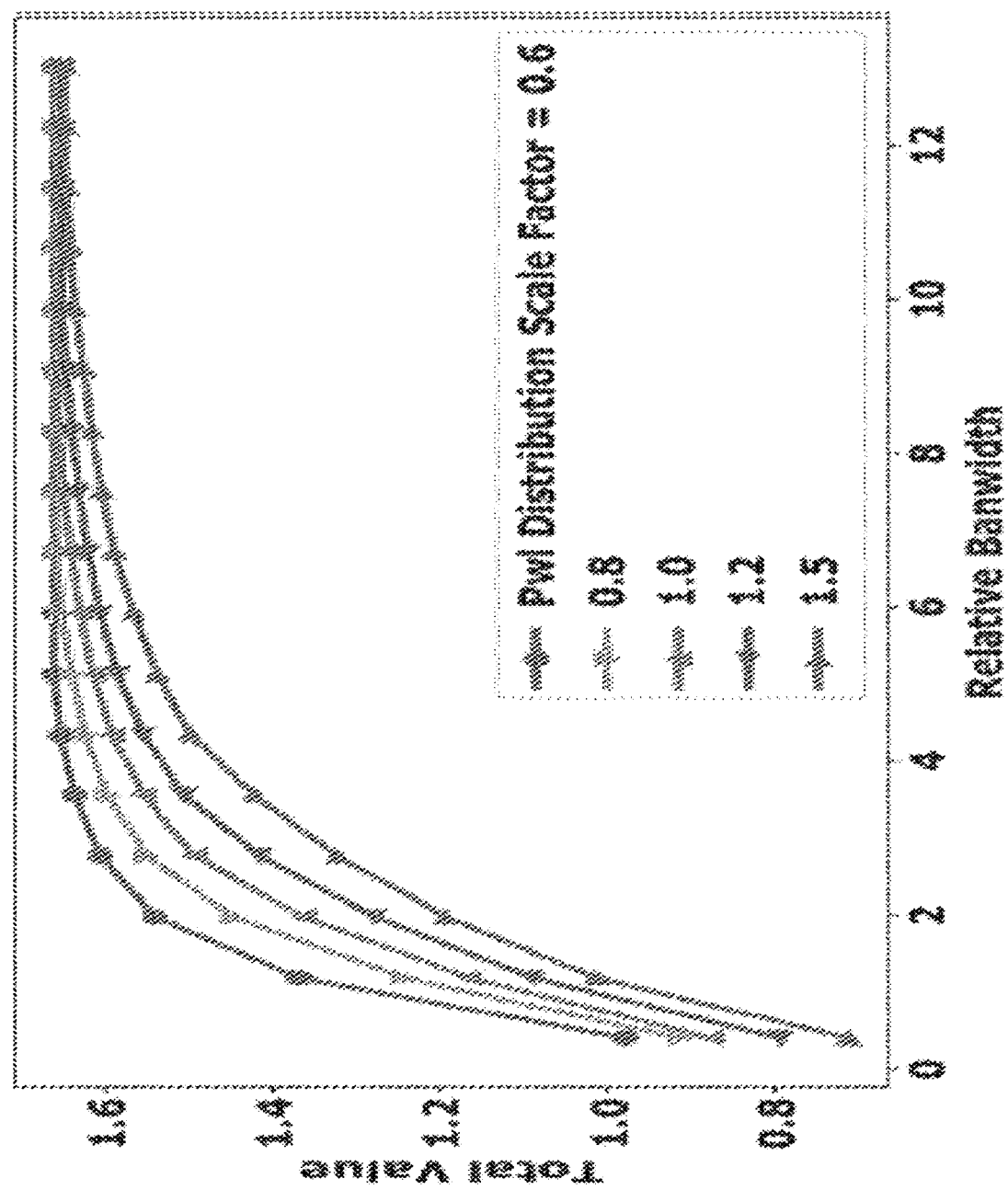
FIGS. 14A and 14B are graphs illustrating example scaled $p_{wl}$ distributions using quadratic user value distributions and Weibull user value distributions, respectively.
Figure 14B:
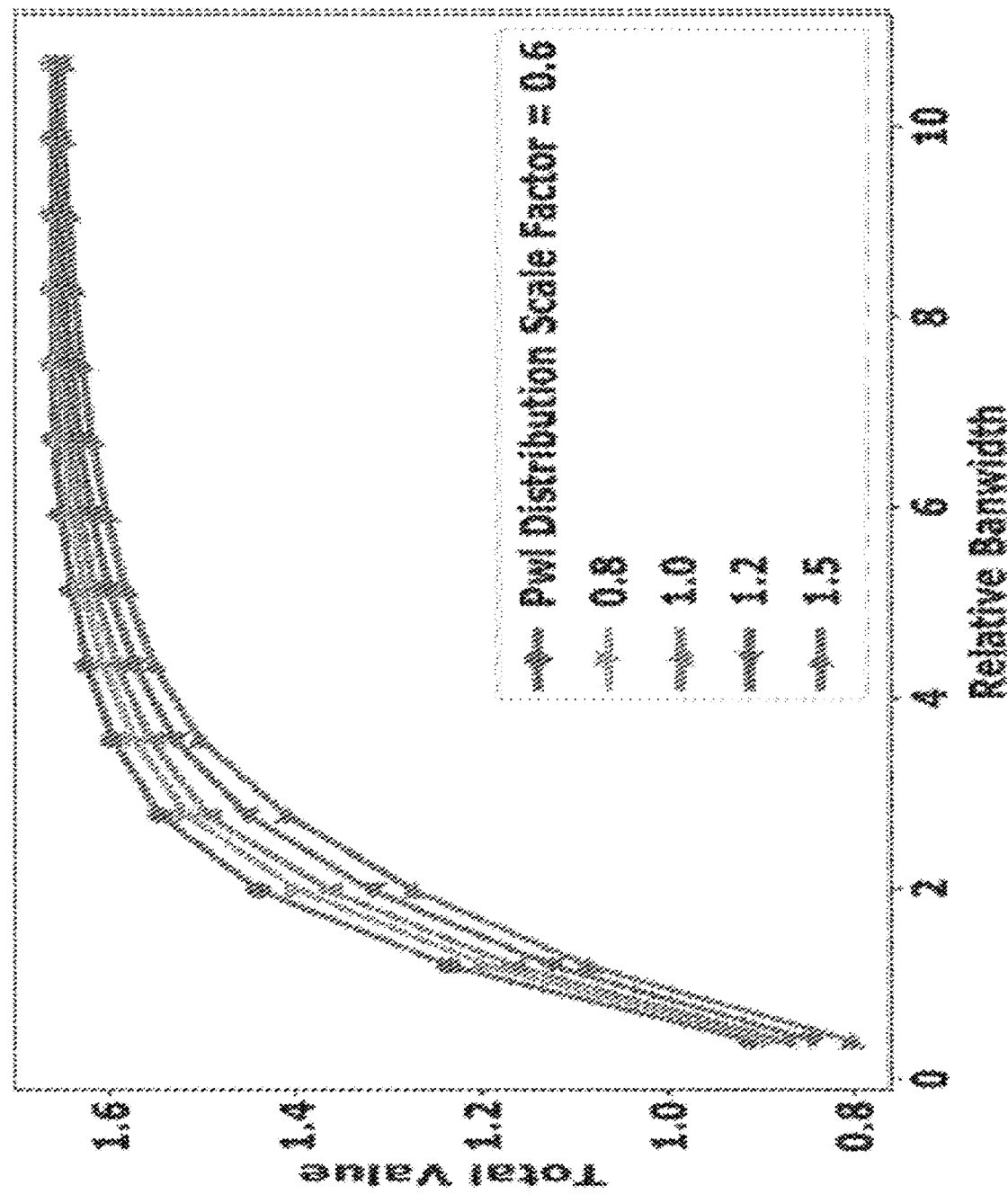
Figure 14C:
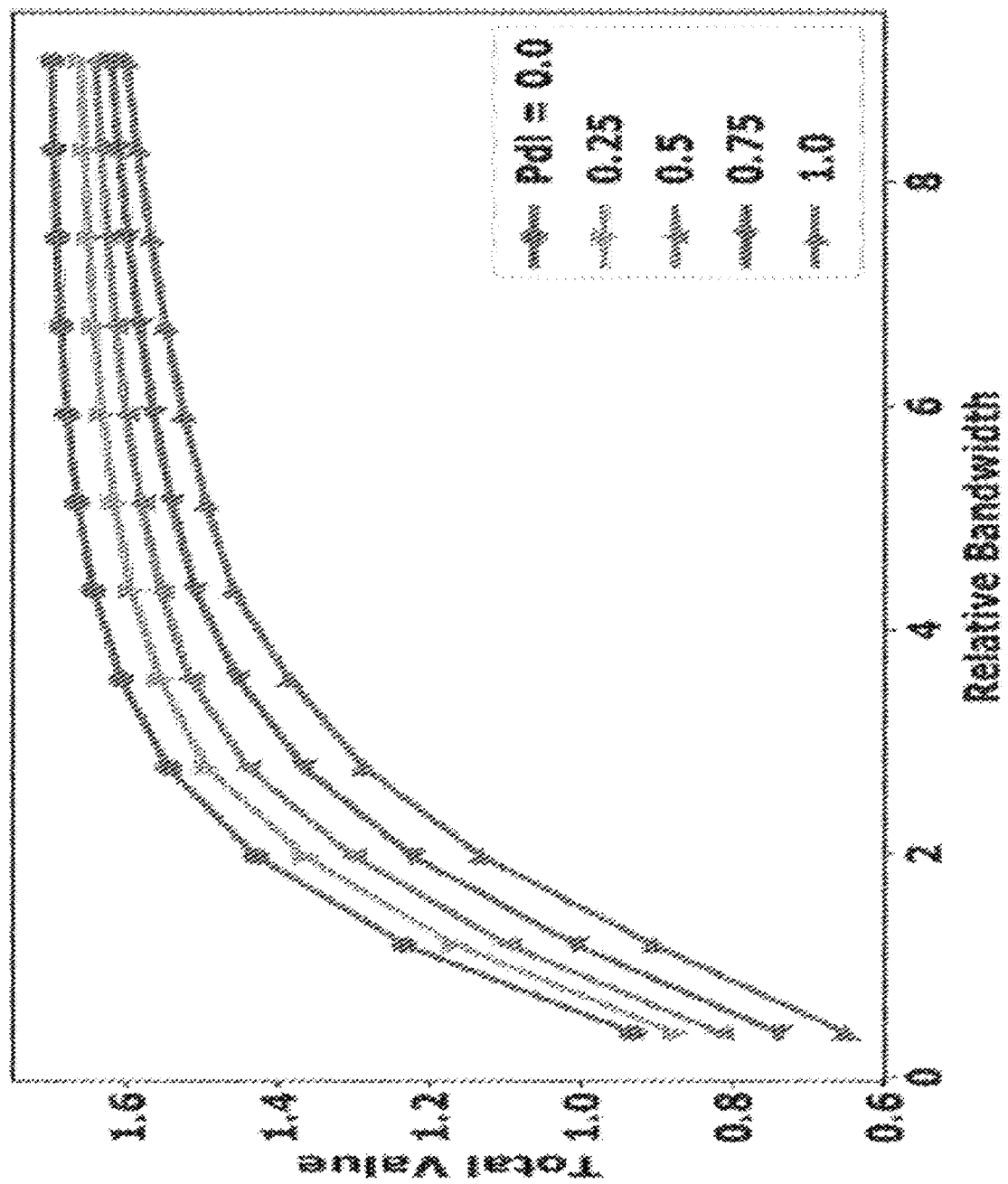
FIGS. 14C and 14D are graphs illustrating example $p_{dl}$ using quadratic user value distributions and Weibull user value distributions, respectively.
Figure 14D:
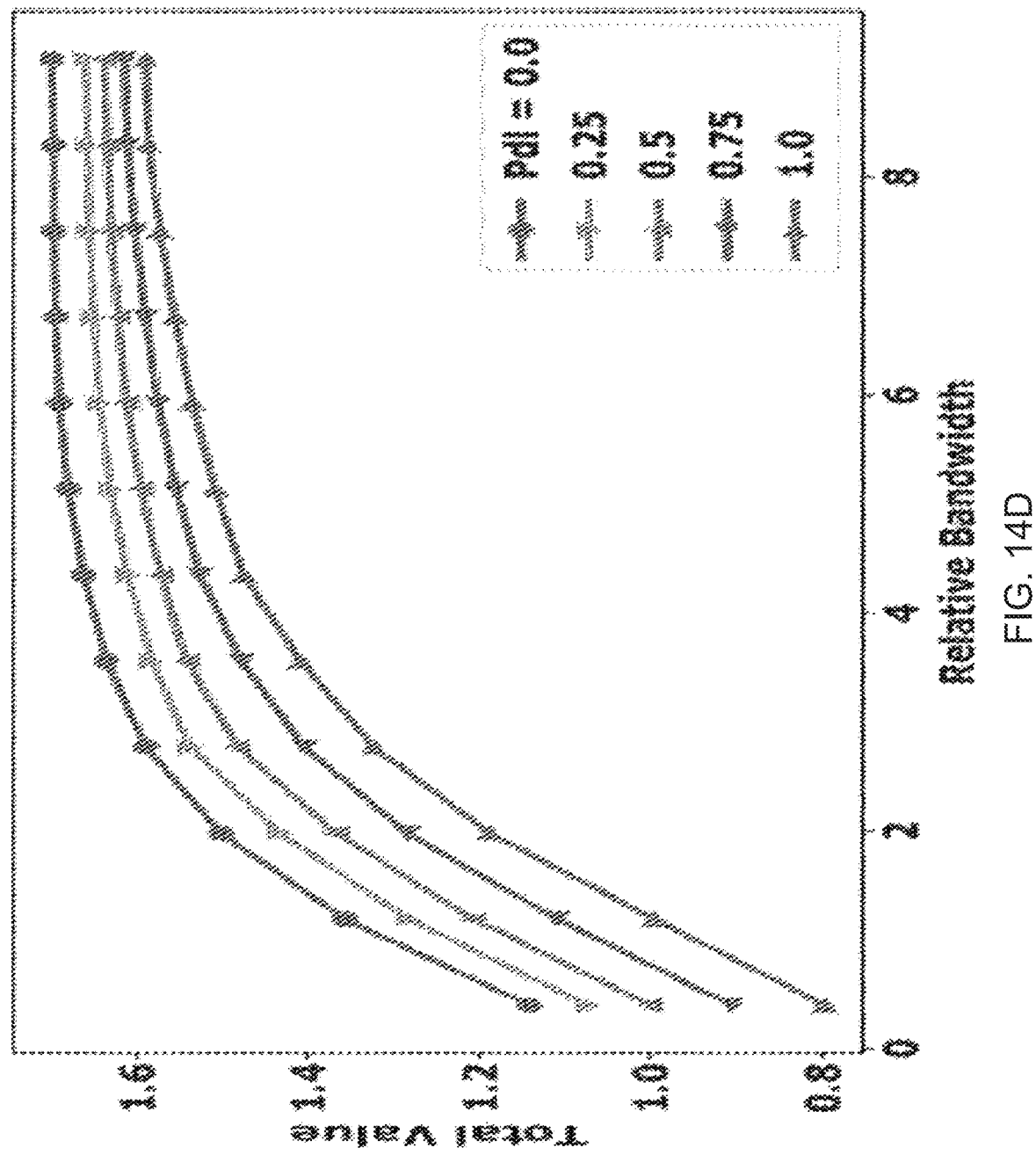
Figure 14E:
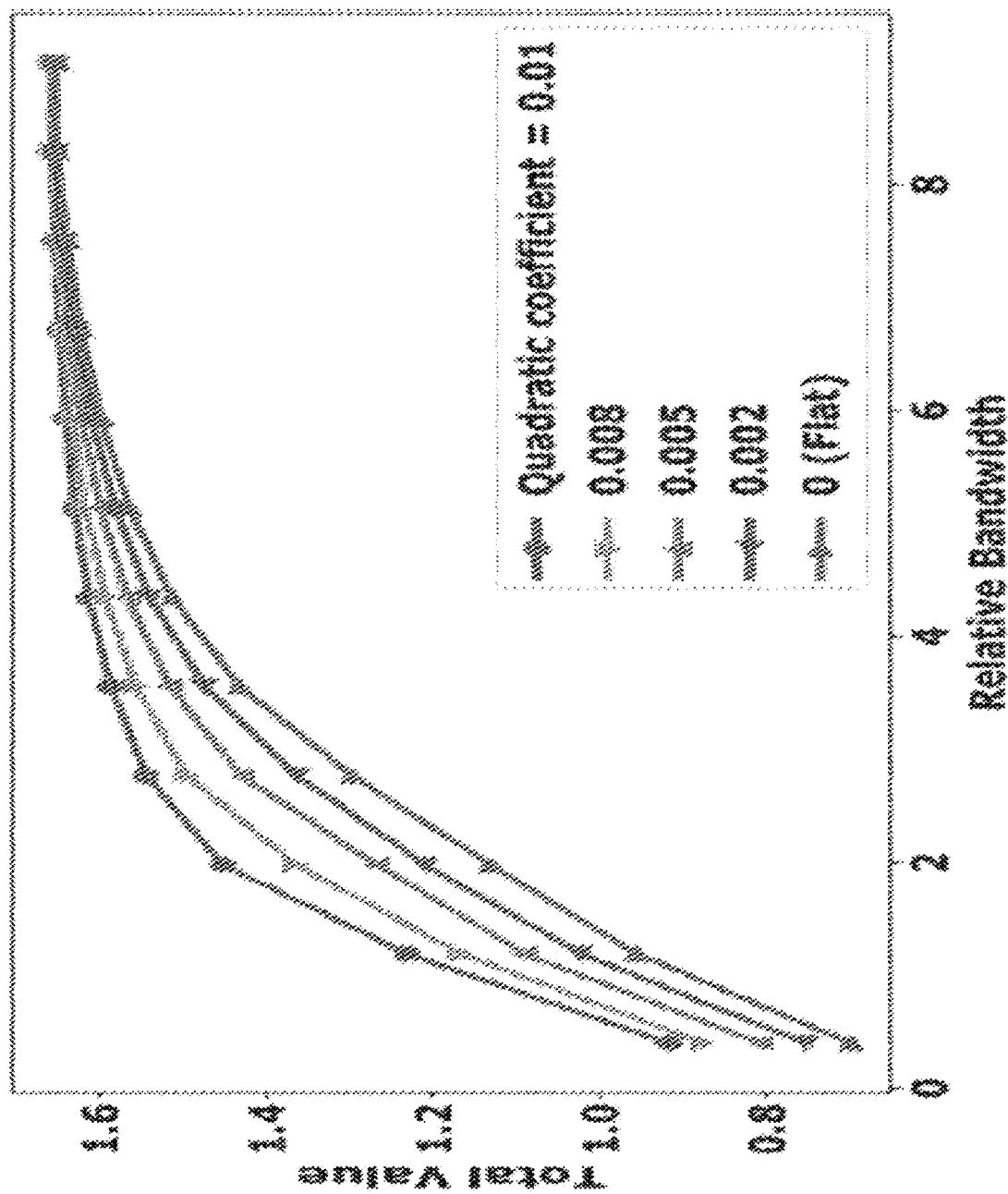
FIGS. 14E and 14F are graphs illustrating example user value distribution parameters using quadratic user value distributions and Weibull user value distributions, respectively.
Figure 14F:
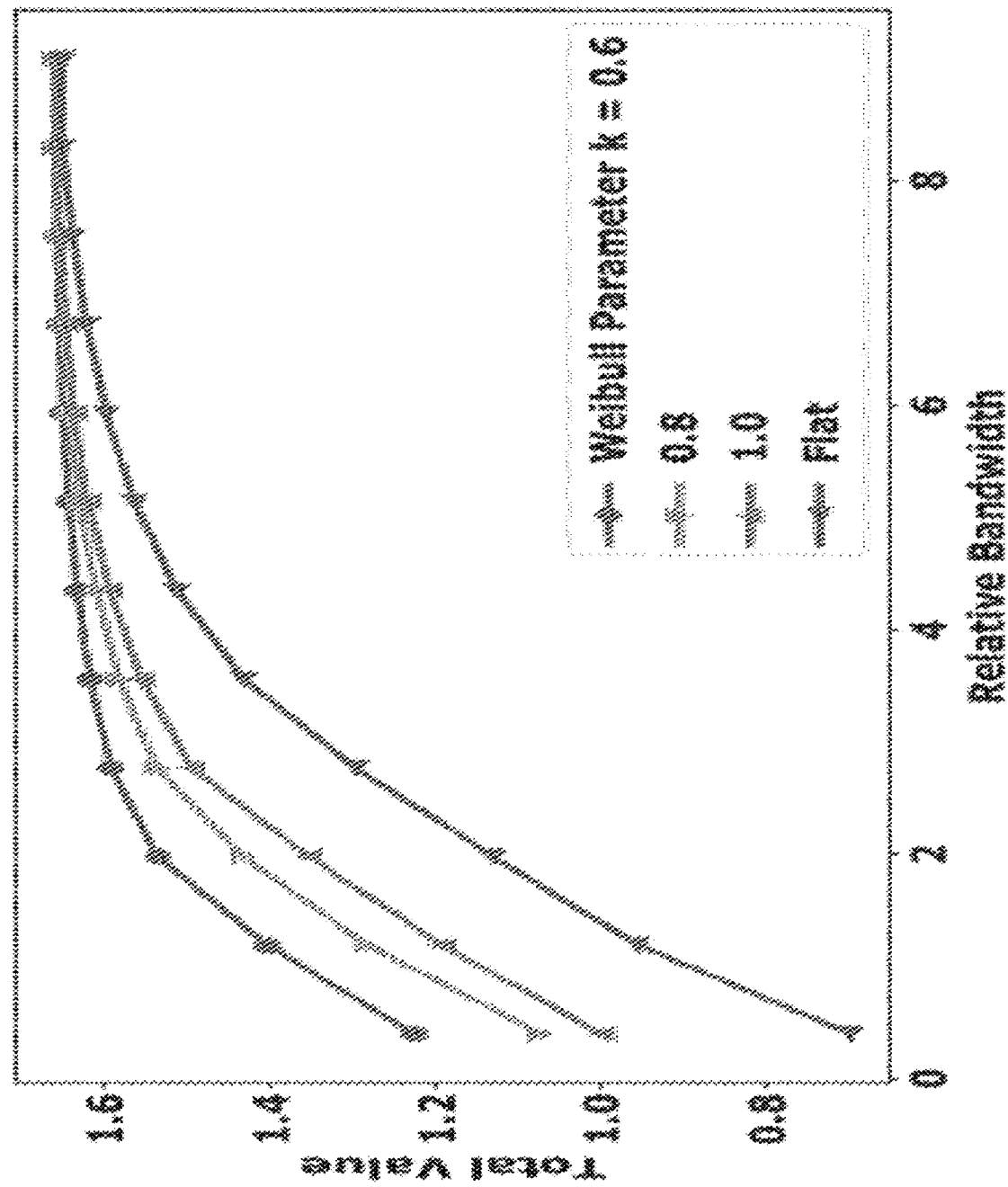

Finally, we evaluate the vAlloc module under different parameters for the user behavior model and value distribution. Since actual parameters may vary from provider to provider, we aim to show that vAlloc's allocation continues to provide strong improvements across a variety of different parameters. Since bandwidth reallocation impacts only the three leaving probabilities (i.e., pwl, pal, and pdl) in the state machine, we evaluate the vAlloc module with different pwl and pdl (pal is set the same as pwl). To create different pwl, we linearly scale the probability distributions shown in FIGS. 11A and 11B. For pdl, we evaluate several discrete values. We also considered different parameters for both our user value distributions (quadratic and Weibull). FIGS. 14A, 14B, and 14C show our results. In general, the vAlloc module performs well across a variety of user models, providing least benefit when bandwidth allocation cannot affect user value (i.e., pdl=1 or flat user value distributions), and more benefit when bandwidth allocation has greater impact (i.e., pdl=0 or more heavy-tailed user value distributions).

When watching a video, Quality-of-Experience may be driven by both video quality and buffering events. Because users have varying Internet connection quality both in terms of best-case bandwidth, which is typically the value advertised by the ISP (e.g., "advertised bandwidth"), and in terms of bandwidth variance, some users need larger buffers to have the same quality of experience as other users. The qAlloc module, which facilitates FlowTele to evenly distribute the QoE among users when the content provider is bandwidth-constrained on the downstream links. We clarify that the qAlloc and vAlloc modules are not comparable, and therefore it is invalid to say "qAlloc is better than vAlloc" or vice versa. They are two instances of fAllocator that show that FlowTele may be used to optimize very different metrics as selected by the content provider.

Researchers have proposed various QoE models for streaming services; our instantiation of qAlloc focuses on video quality and buffering events since they are the two significant factors for video QoE that are most directly influenced by the bandwidth allocated to each user. Factors that do not depend on bandwidth allocations, such as color, video objects and motion, are minimally affected by the qAlloc module. We use a video quality metric which models video quality as:

$$VQ(t) = VQ_{MAX}(t) + \frac{1 - VQ_{MAX}(t)}{1 + (vbr(t)/\tau(t))^{v_1}} \quad (2)$$

$$VQ_{MAX}(t) = \max\left(1, \min\left(5, 1 + 4 \cdot \frac{v_3 \cdot vrs(t)}{v_2 + vrs(t)}\right)\right) \quad (3)$$

$$\tau(t) = \frac{v_4 \cdot vrs(t) + v_6}{1 - \exp(-v_5 \cdot vrs(t))}, \quad (4)$$

where $VQ(t)$ is the video quality at time t, $VQMAX(t)$ is the maximum video quality of a given resolution, vrs (t) is the resolution in pixels, vbr (t) is the video bitrate, and v1~v6 are constant parameters. Our video bitrate values are selected from the YouTube's recommended video bitrate for uploads, divided by four. We fix audio quality at the highest possible value of 5 (since audio requires much less bandwidth than video), giving a combined audio-visual quality of:

$$AV\,Q'(t) = av_1 + av_2 \cdot 5 + av_3 V\,Q(t) + av_4 \cdot 5 \cdot V\,Q(t) \quad (5)$$

$$AV\,Q(t) = \max(1, \min(5, AV\,Q'(t))), \quad (6)$$

where av1~av4 are constant parameters. The Audio-Visual Coding Quality (AVCQ) is given by:

$$AVCQ = \frac{\sum_{t=1}^{T} w_1(t) \cdot w_2(t) \cdot AVQ(t)}{\sum_{t=1}^{T} w_1(t) \cdot w_2(t)} \quad (7)$$

$$w_1(t) = t_1 + t_2 \cdot \exp\left(\frac{t/T}{t_3}\right) \quad (8)$$

$$w_2(t) = t_4 - t_5 \cdot AVQ(t), \quad (9)$$

where w1 (t), w2 (t) model the impact of temporal effect and different qualities on QoE.

The MSQ (Media Session Quality), which takes stalling events into consideration, is used as our final QoE expression:

$$MSQ = 1 + (AVCQ - 1) \cdot S \qquad (10)$$

$$S = \exp\left(-\frac{N}{s_1}\right)\exp\left(-\frac{L/T}{s_2}\right)\exp\left(-\frac{A/T}{s_3}\right), \qquad (11)$$

where N is the total number of stalling events, L is the total length of stalling events, A is the average interval between stalling events, T is the length of the period, and $s_1$~$s_3$ are constant parameters.

The qAlloc module may use the MSQ from Equation (10) as the basis for its Quality-of-Experience; MSQ is driven by two factors: AVCQ, which may be determined by video bitrate and resolution, and S, which may be determined by stalling events. In our model, each flow i has a current video bitrate $C_{0,i}$ and buffer length $l_{0,i}$ at time t, and we compute MSQ through time t+T given bandwidth allocation $B_{1,i}$ and new video bitrate $C_{1,i}$ (which may be the same as the previous video bitrate). Together, these yield vbr(t) in Equation (2). For each possible video bitrate, the number of pixels in the corresponding resolution are given in the H.264 standard, giving us vrs (t) in Equations (3) and (4). AVCQ may then be calculated using Equations (2), (6), and (7).

We obtain stalling events, as characterized by N, L, A, by starting from the end-user bandwidth Markov model, calculating the standard deviation of available bandwidth $$B_{avail}(t_n) = \text{Markov}(B_{adv}, B_{std}, B_{avail}(t_{n-1})) \qquad (12)$$

and simulating video playing and stalling given $B_{1,i}$, $l_{0,i}$ and the link Markov Model above.

$$B_{actual}(t_n) = \min(B_{1,i}, B_{avail}(t_n))$$

$$l(t_0) = l_{0,i}$$

$$l(t_n) = \begin{cases} \max\left(0, l(t_{n-1}) + \frac{B_{actual}(t_{n-1}) \cdot \Delta t}{C_{1,i}} - \Delta t\right) & \text{if plays out,} \\ l(t_{n-1}) + \frac{B_{actual}(t_{n-1}) \cdot \Delta t}{C_{1,i}} & \text{otherwise} \end{cases}$$

Whenever the buffer reaches $l(t_n)=0$, we consider the video to be stalled. We repeat the simulation thirty (30) times to calculate the mean of N, L, A, and use those mean values to obtain S from Equation (11), and MSQ from Equation (10):

$$Q_{oE}(B_{adv}, B_{std}, C_{0,i}, C_{1,i}, l_{0,i}) = 1 + (AVC\ Q(B_{actual}(t), C_{1,i}) - 1) \cdot S(N, L, A) \qquad (13)$$

The goal of the qAlloc module may be to provide fair Quality of Experience by maximizing min $q_i(T)$ at each period T, where $q_i$ is the QoE over that period for user/flow i. Towards this end, we choose a video bitrate, allocate bandwidth over the period T, and optimize the lowest performing user's QoE subject to the bandwidth we expect to have over the next interval:

$$\max \min_i q_i(C_{0,i}, l_{0,i}, C_{1,i}, B_{1,i}, T)$$

$$\text{s.t.} \sum_i B_{1,i} \le B_{total},$$

where $q_i$ is the QoE of flow i; $C_{0,i}$ and $C_{1,i}$ are the video bitrates before and after current time period, respectively; $l_{0,i}$ is the amount buffered at the start of this period; $B_{1,i}$ is the bandwidth allocation to flow i; $B_{total}$ is the total bandwidth of the co-bottleneck link.

A greedy solution may be used for this optimization problem, for example, as described in the QoE Optimization Algorithm in FIG. 28, which is briefly described here. First, for each flow i, BuildTable computes a "qtable" for i that describes the lowest-bandwidth approach to achieve any given QoE from any given start state (e.g., the bitrate $C_0$ and buffer time $l_0$); this is computed by exploring all possible allocations of bitrate $C_1$ and bandwidth $B_1$, computing the QoE given this allocation and the link characteristics (e.g., the advertised bandwidth and bandwidth variance based on the Markov model described herein) experienced by flow/user i, and then choosing for each QoE the lowest-bandwidth allocation that meets that QoE. All possible bitrate allocations may be obtained from YouTube resolutions, and all possible bandwidth allocations may range from a small value (e.g., 1 Mbps) to a very large value (e.g., 220 Mbps) such that further increasing bandwidth may not improve QoE.

Next, in each control interval, FindBestAllocation performs a binary search over all possible QoEs to find the highest QoE that can be achieved by all users. In particular, for a given QoE target q, it uses each flow's qtable row to find the lowest-bandwidth approach to that QoE, and marks q as achievable if and only if the aggregate bandwidth requirement across all flows is within the bottleneck bandwidth Btotal. FindBestAllocation's binary search finds the largest achievable QoE q, upon which it returns the bitrate $C_{1,i}$ and bandwidth allocation $B_{1,i}$ necessary to achieve that QoE.

In order to accommodate the greedy solver to maximizing the minimum QoE, qAlloc may be parameterized so that it makes long-term decisions but can fine-tune its approach on short intervals. In particular, a QoE evaluation interval T of 20 seconds, for example, may be chosen, while qAlloc makes decisions once per second (e.g., the control interval). This parameterization means that qAlloc chooses bandwidth allocations that maintain QoE for a relatively long period of time (such that qAlloc will not aggressively drain the buffer to optimize a very short-term QoE), while giving it a chance to revise those allocations with fine-grain steps as the end of the period gets closer. For example, the choices qAlloc makes at time 0 seconds may maximize or optimize the QoE between 0 and 20 seconds, but the choices qAlloc makes at time 10 seconds may maximize or optimize the QoE between 10 and 30 seconds, allowing qAlloc to react to its own side-effects (e.g., the depletion of one flow's buffer) well before they become urgent.

Because of the long-term QoE computation per evaluation interval and fine-grained turning per control interval, the solver may make multiple allocation decisions for the same period of time. Naively changing resolution (e.g., bitrate) per control interval may result in frequent quality switching, which downgrades the QoE of the video. Thus, qAlloc may not allow more than one pending resolution change for the same flow, meaning that if qAlloc already has a pending bitrate allocation for a flow, it may no longer accept a new bitrate allocation from the solver until the current buffer is drained and the flow starts to use the new buffer. Second, qAlloc may discard excessive buffers when switching resolution; in particular, if the buffer length of the current resolution exceeds a predefined threshold (e.g., 10 seconds, as used in evaluation), the remainder may be discarded. This behavior may ensure that any resolution improvement will reach the flow faster (e.g., potentially before current buffer is completely drained), while leaving enough buffer in place to handle possible reductions in bandwidth.

TABLE 3

Experimental settings of Group One qAlloc evaluation.

| Experiment Set | Number of End-User Links | Advertised Bandwidth | Bandwidth Standard Deviation |
|---|---|---|---|
| 1 | 1 | 4 Mbps | 431 kbps |
|  | 1 | 6 Mbps | 1.030 Mbps |
|  | 3 | 8 Mbps | 1.097 Mbps |
|  | 5 | 10 Mbps | 1.112 Mbps |
| 2 | 3 | 8 Mbps | 328 kbps |
|  | 4 | 8 Mbps | 1097 kbps |
|  | 3 | 8 Mbps | 2088 kbps |

TABLE 4

Experimental settings of Group Two qAlloc evaluation.

| Set | Number of End-User Links | Advertised Bandwidth | Bandwidth Standard Deviation |
|---|---|---|---|
| 1~10 | 100 | Uniform [8, 30] Mbps | Uniform [0, 0.2]• advertised_bandwidth |

We first present the evaluation for standalone qAlloc, and defer integrated evaluation to later in this document. The simulation platform may include emulated network links, virtual video-streaming clients and a sender, the qAlloc module, and a QoE monitor to measure QoE metrics. The sender and virtual clients may be connected via a shared link and multiple end-user links (e.g., with each end-user link connecting with one client). To emulate an end-user link, the real-time link bandwidth is generated based on the Markov model described herein. A total bandwidth limit on the shared link may be enforced to control whether the shared link is the bottleneck or not. Each virtual client may update its buffer length based the current video bitrate and its actual achievable bandwidth, emulating video playback, stalling, and video quality changes.

To demonstrate the ability of qAlloc to improve the QoE fairness by better allocating the total bandwidth, we compare QoE performance with and without qAlloc. allocating the shared link bandwidth. To ensure that the comparison focuses on bandwidth allocation, the algorithm for choosing resolution remains the same (e.g., both scenarios use the solver Algorithm in FIG. 28 to decide the resolution in each evaluation interval). When qAlloc does not control bandwidth allocations for the shared link, we give each flow its fair share over the shared link. We conduct the following two groups of experiments to evaluate qAlloc.

Figure 29:
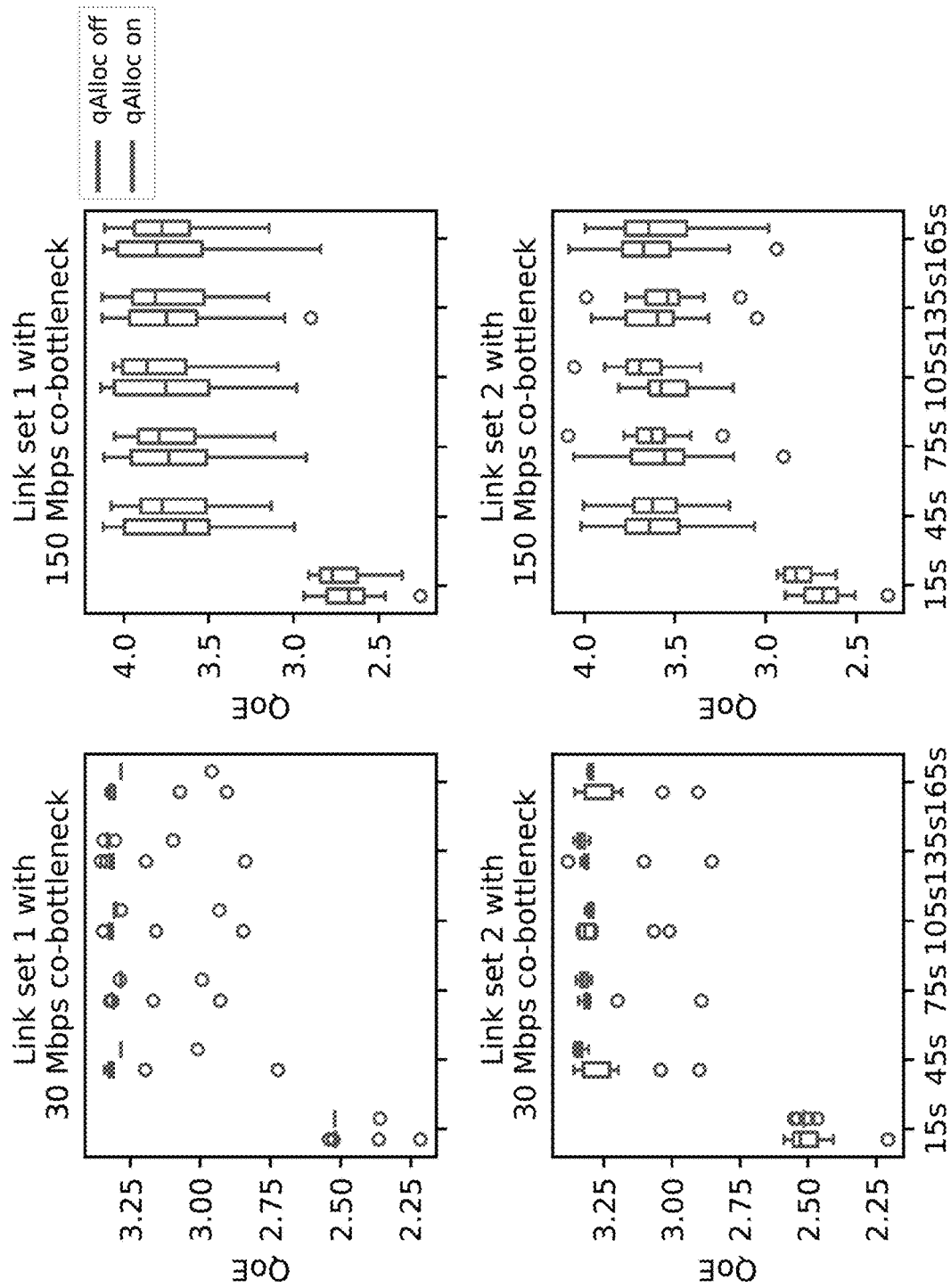
FIG. 29 is a set of four graphs illustrating exemplary qAlloc results for a Group One of experiments, in which total bandwidth was 30 Mbps and 150 Mbps.

In the first experiments group (Experiments Group One), we choose two sets of end-user links shown in Table 3. Both sets have ten (10) end-user links (e.g., virtual clients), whereas they have different bandwidth settings. We enforce two bandwidth values on the shared link: 30 Mbps and 150 Mbps. The 30 Mbps case represents a 3 Mbps per-flow fair share, making the shared link the co-bottleneck; in the 150 Mbps case, the user link is the primary bottleneck, so qAlloc is expected to provide less improvement. We run the simulations for 180 s and plot the QoEs for each 30 s interval against time in FIG. 29, the qAlloc results for Experiments Group One. The left column shows the cases with a total bandwidth of 30 Mbps, and the right column shows the cases with a total bandwidth of 150 Mbps.

Our results show that, when the shared link is the co-bottleneck, qAlloc may improve min qi by over 10%-20% across both link sets, and also reduce the range of QoEs, resulting in reduced unfairness. This demonstrates that qAlloc may avoid poor QoE induced by bandwidth fairness, thus making all flows more equal in terms of QoE, which is exactly the objective of qAlloc. When the shared link is not the bottleneck, qAlloc may improve the fairness by a smaller margin.

Comparing the results across the two link sets (e.g., for the 30 Mbps shard link), we see that qAlloc results in tighter QoE in the second set compared to the first. This is because in the first set, inter-user QoE variation is mostly driven by each user's advertised bandwidth, which limits the resolution choices available to the lowest-bandwidth users; in the second set, inter-user QoE variation is mostly driven by the shared-link bandwidth variation. As a result, qAlloc's real-locations among users can largely flatten the QoE experienced by each user.

In the second group of experiments, (Experiment Group Two), to evaluate qAlloc in larger scenarios, we generated 100 end-user links with random advertised bandwidth and variance, and repeated 10 sets of such experiment, as shown in Table 4. For each set of links, we perform three runs, sort the QoEs among flows, and average them across three runs and all intervals. We plot the resulting QoEs for each link set in FIG. 30 with both 400 Mbps and 3 Gbps shared link bandwidth. Our results show that qAlloc improves the minimum QoE by an average of 10% and 3% respectively. Because this group reflects significant inter-user variability and a large number of links, the difference between the two shared link bandwidths is even more pronounced. When nearly all flows are constrained by the shared link, qAlloc achieves significant gains in QoE fairness, increasing the minimum QoE from between [2.9, 3.1] to ab out 3.2, with almost no penalty to average QoE. In the second case, where bottlenecks are mostly caused by the end-user link (e.g., the last hop), qAlloc displays a greater range of QoEs, and mainly achieves a min $q_i$ that is no worse than uncontrolled case.

Figure 30:
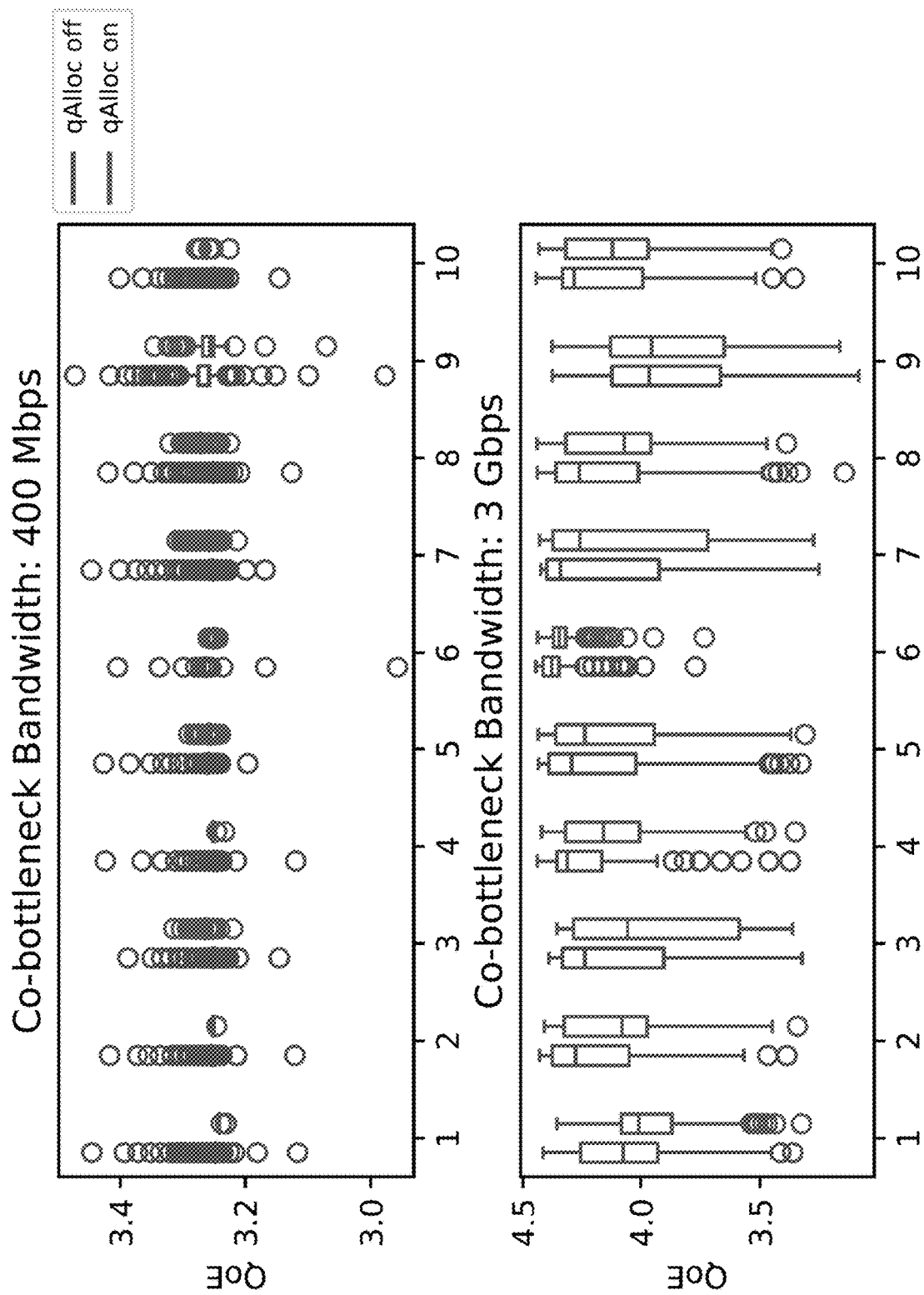
FIG. 30 is a set of two graphs illustrating exemplary qAlloc results for QoEs of link set 1~10 for a Group Two of experiments, in which co-bottleneck bandwidth was 400 Mbps and 3 Gbps, respectively.

FIG. 30 is a set of two graphs illustrating exemplary qAlloc results for QoEs of link set 1~10 for a Group Two of experiments, in which co-bottleneck bandwidth was 400 Mbps and 3 Gbps, respectively.

The FlowTele architecture calls upon the content provider to shape outbound traffic to achieve the per-flow bandwidth allocations specified by fAllocator while simultaneously remaining friendly to non-participating traffic sharing the same bottleneck links. Though a source can readily control its outbound bandwidth through UDP flows, using UDP may involve client-side deployment, and maintaining external TCP-friendliness may involve the use of a mechanism like Equation-Based Rate Control. A source may likewise limit its TCP outbound bandwidth by controlling its sending rate, but the bandwidth it gives up in this way does not get automatically reallocated to co-bottlenecked flows sent from the same source, but rather shared among remaining co-bottlenecked flows. Finally, fShaper may also estimate the source's aggregate TCP fair share of the bottleneck bandwidth to fAllocator, so that fAllocator may allocate bandwidth subject to this limit.

The fShaper module may meet the requirements and challenges described herein, and accomplish the following goals: (i) internal weighted fairness: the component flows of an fShaper source should have throughputs that converge to the target weights given by fAllocator, while having (ii) external friendliness: the component flows in aggregate neither undershoot nor overshoot the throughput of uncontrolled flows when competing with other cross traffic on a bottleneck link; i.e., the aggregate flows controlled by fShaper are friendly to external TCP cross-traffic. In other words, fShaper merely redistributes bandwidth among its component flows, transparent to crosstraffic sharing the same bottleneck.

The fShaper module may first estimate the source's total TCP fair share of the bottleneck-bandwidth, and then allocate the total fair share among the component flows (e.g., based on fAllocator's allocation decisions) by directly overwriting each flow's congestion window and leaving it fixed for each allocation interval. To this end, an fShaper source may divide its component flows into three categories: recipient, donor and calibrator. Recipient flows may have target weights (e.g., given by fAllocator) greater than their TCP fair share and donor flows have target weights less than their TCP fair share. Calibrator flows are passive observers for which fShaper does not update the congestion windows, e.g., they are just regular TCP flows. Thus, calibrator flows form a statistical representation of the source's per-flow TCP-friendly rate. By measuring the sending rates of calibrator flows, fShaper may obtain an accurate measurement of the source's fair share of the bottleneck.

We may estimate the source's fair share as:

$$\mathcal{B}_{fairshare} = \frac{N_{total}}{N_{calibrator}} \cdot \mathcal{B}_{calibrator},$$

where $\mathcal{B}_{calibrator}$ is the total throughput of all calibrator flows. For each calibrator flow, we estimate its throughput as:

$$\mathcal{T}_i = \frac{\mathcal{F} \cdot MSS}{RTT},$$

where $\mathcal{F}$ is the number of packets in flight, RTT is the round-trip time, and MSS is the segment size. A flow's throughput could also be estimated based on loss rate; or you can use values that are readily available in the kernel TCP implementation.

The bandwidth available for recipient and donor flows is $$\mathcal{B}_{available} = \mathcal{B}_{available} - \mathcal{B}_{calibrator} = \left(\frac{N_{total}}{N_{calibrator}} - 1\right) \cdot \mathcal{B}_{calibrator}.$$

We distribute $\mathcal{B}_{available}$ among recipient and donor flows according to $$\mathcal{T}_j = \frac{\text{weight}_j}{\sum \text{weight}_j} \cdot \mathcal{B}_{available},$$

where weight$_j$ is the j-th flow share computed by fAllocator. To achieve the target throughput Tj, fShaper directly updates cwnd for flow j, setting $$cwnd_j = \frac{\mathcal{T}_j \cdot RTT_j}{MSS}.$$

The cwnd of recipient and donor flows and $\mathcal{B}_{available}$ are updated every T seconds, and we average the values of packets in-flight and RTT, sampling every t seconds to smooth the effects of time synchronization across different TCP flows. Based on extensive experiments, for our evaluation environment, we set T to 0.1 second and t to 10 milliseconds.

We evaluate the fShaper module through various experiments in the Internet. The topology settings for these experiments are shown in Table 5.

TABLE 5

The network settings used in fShaper evaluation.

| Content Provider Location | User Location | Cross-Traffic Sender Location | Provider-User/ CrossTraffic-User RTT (ms) | Bottleneck Capacity (Gbps) |
|---|---|---|---|---|
| GCP Tokyo | Taiwan | GCP Taiwan | ~40/~7 | 1 |
| GCP Los Angeles | Illinois | GCP Montreal | ~55/~31 | 0.45 (with Wi-Fi last mile) |

TABLE 6 fShaper results.

| | | Ratio: Self-Flows/ Cross-Traffic | Ratio: donor/ recipient | Among donor Flows | Among recipient Flows |
|---|---|---|---|---|---|
| Majority Scenario | | | | | |
| the 4:1 case | Target | 56.68/43.32 (all Cubic flows) | 4/1 | Equal Share | Equal Share |
| | Achieved | 59.05/40.95 | 79.94/20.06 | 0.0075 Mbps (Goodput s.t.d.) | 0.0077 Mbps |
| the 3:1 case | Target | 56.68/43.32 | 3/1 | Equal Share | Ratio: [40:30:30] |
| | Achieved | 56.59/43.41 | 74.71/25.29 | 0.0106 Mbps | [39.97:39.99:30.04] |
| the 9:1 case | Target | 56.63/43.32 | 9/1 | Equal Share | One recipient |
| | Achieved | 55.15:43.85 | 89.84/10.16 | 0.0072 Mbps | One recipient |
| Minority Scenario | | | | | |
| the 4:1 case | Target | 46.50/53.50 (all Cubic flows) | 4/1 | Equal Share | Equal Share |
| | Achieved | 46.12/53.88 | 79.95/20.05 | 0.0077 Mbps | 0.0064 Mbps |

TABLE 6-continued fShaper results.

|  |  | Ratio: Self-Flows/ Cross-Traffic | Ratio: donor/ recipient | Among donor Flows | Among recipient Flows |
|---|---|---|---|---|---|
| the 3:1 case | Target | 46.50/53.50 | 3/1 | Equal Share | Ratio: [40:30:30] |
|  | Achieved | 46.87/53.13 | 74.64/25.36 | 0.0097 Mbps | [39.96:30.00:30.04] |
| the 9:1 case | Target | 46.50/53.50 | 9/1 | Equal Share | One recipient |
|  | Achieved | 46.22/53.78 | 89.84/10.16 | 0.0076 Mbps | One recipient |

We evaluated fShaper's ability to achieve three different ratios of control. For each set of ratios, we used 100 FlowTele flows, of which 25% are randomly selected as calibrator flows. We configure recipient and donor flows in each case as: (i) the 9:1 case: a single recipient flow with a target share 10%, (ii) the 3:1 case: three recipient flows with target shares [40%, 30%, 30%], and (iii) the 4:1 case: 7 recipient flows with total target share 20% equally distributed among them. All donor flows are equal in each case. For each set of ratios, we considered two cases: one in which fShaper flows comprise over half of the bottleneck capacity, which we call the majority scenario, and one in which fShaper flows comprise less than half of the bottleneck capacity, which we call the minority scenario. We ran each ratio and scenario fifteen (15) times and plot the experimental results for the US network setting in FIG. 12. We further list detailed results in Table 6. The results demonstrate that fShaper achieves accurate internal weighted fairness among FlowTele flows in all controlled cases, while maintaining the same level of external friendliness as TCP Cubic flows. Specifically, the total goodputs of FlowTele flows in all cases are very close to the Control Group where all flows are running TCP Cubic, indicating FlowTele flows in aggregate are TCP-friendly to external cross-traffic. Within the FlowTele flows, the allocation for recipient flows (in aggregate) and donor flows (in aggregate) are close to the target allocation in all cases. The donor flows in all cases achieve almost equal goodputs (with very small standard deviation among them). The recipient flows in all cases also achieve the desired weighted fair shares.

Figure 34:
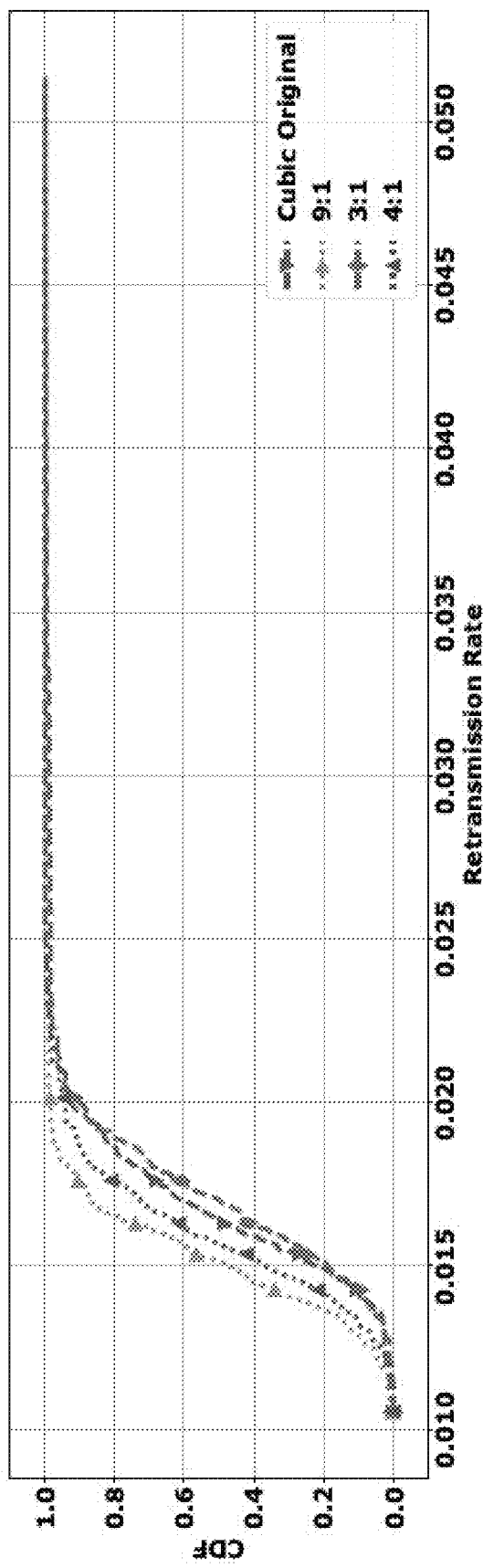
FIG. 34 is a graph that illustrates a stable retransmission rate in fShaper and realtime vAlloc allocated bandwidth.

We further evaluate the retransmission rate of fShaper-controlled flows. As shown in FIG. 34, these flows exhibit very similar retransmission rates as TCP Cubic flows. This indicates that although FlowTele does not directly react to packet losses of individual non-calibrator flows, its periodic cwnd overwrites do not have result in excessive losses in controlled flows.

We implement an embodiment of FlowTele in roughly 7400 lines of code (mostly in Python and C++). We run an integrated evaluation of FlowTele using the first network setting in Table 5. We have total 200 flows with 50 calibrator flows. User (flow) values are randomly sampled from a Weibull distribution modeled after the top-10 AdWords value sampled as described in § 3.1. The fair share of the cross traffic is roughly 55% of the total bottleneck capacity. Running on GCP Compute Engine servers, our single-threaded allocator calculated the allocation for its 150 flows in 10 ms with a maximum error of 1%; we need only calculate the allocation once every second, demonstrating the computational efficiency of our system. In large content providers, thousands of flows could share an ISP bottleneck; in such cases, the content provider can simply divide cobottlenecked flows into groups, and share bandwidth only within each group, while sharing the calibration flows between groups.

Figure 36A:
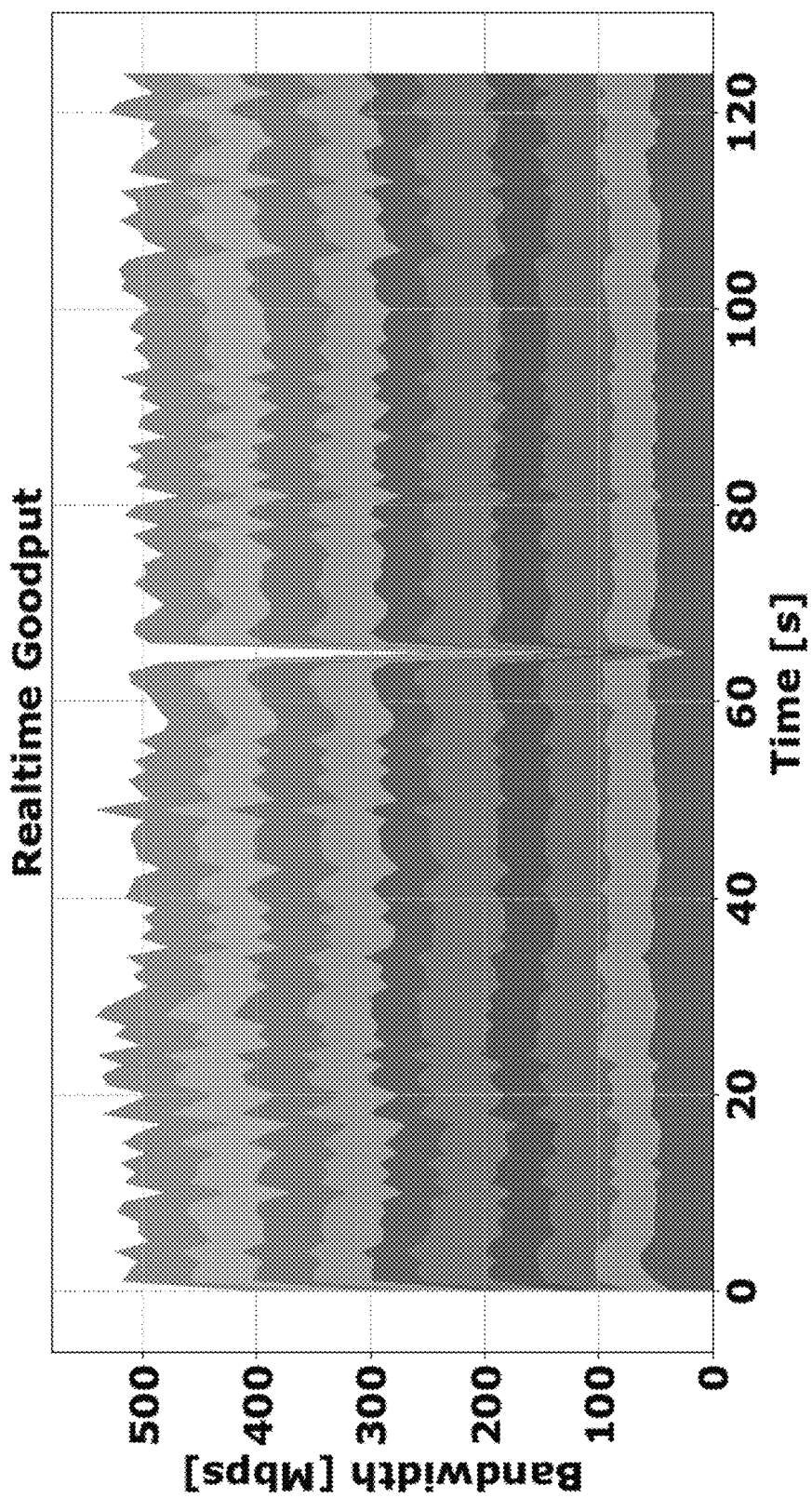
FIGS. 36A and 36B are a pair of graphs illustrating exemplary results of realtime vAlloc allocated bandwidth and actual achieved goodput, aggregated by decile.
Figure 36B:
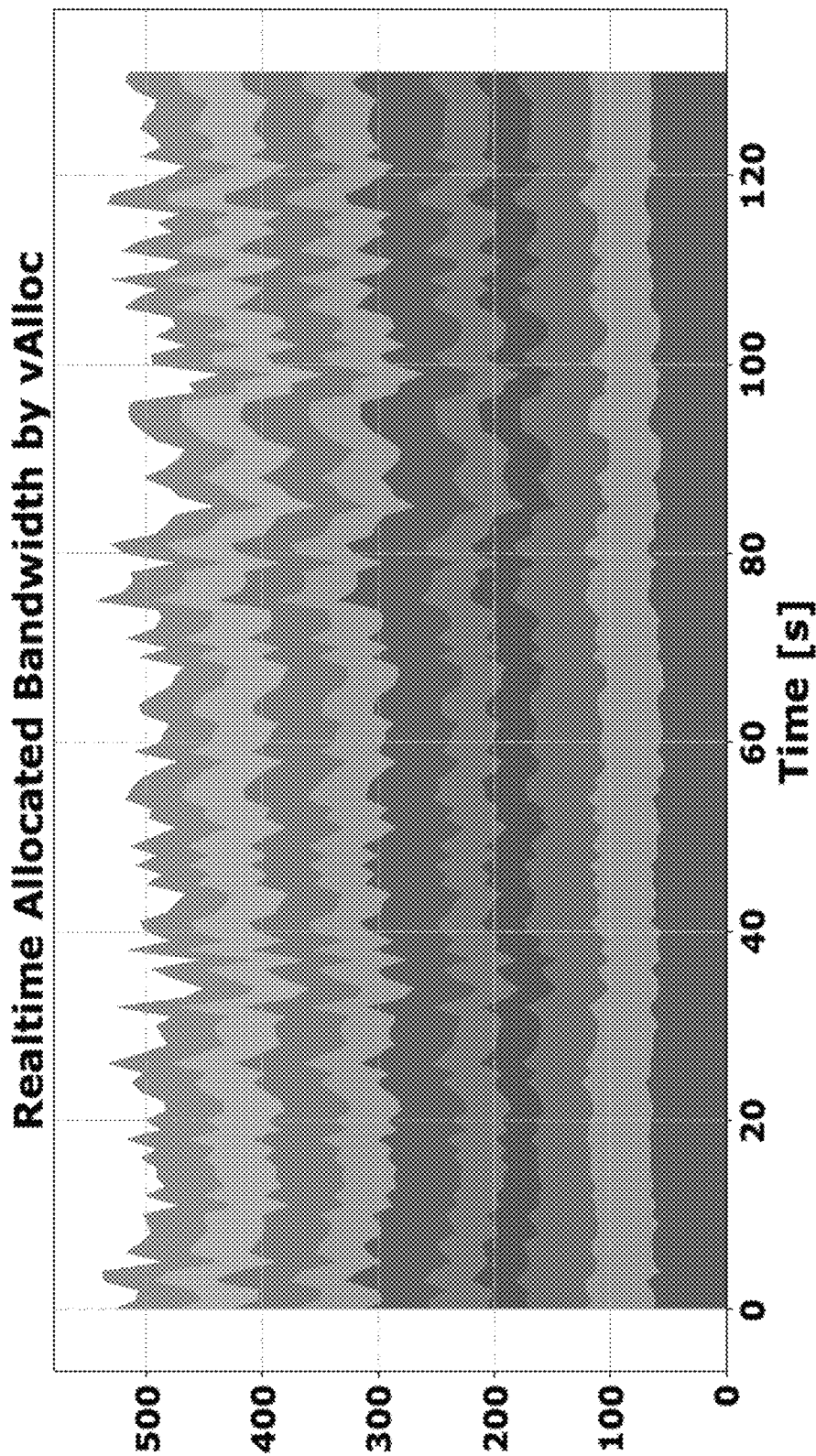

Bandwidth allocations and Shaping Effectiveness. We sorted users by the value of showing them a single advertisement and grouped users into deciles; FIG. 36 shows the goodput achieved by fShaper as compared to the bandwidth requested by vAlloc, grouped by these deciles. vAlloc provides significantly more bandwidth to the top three deciles, but provides sufficient bandwidth to the remaining users to continue to retain them. (e.g., vAlloc's high-value users do not crowd out low-value users). fShaper goodput tracks these vAlloc allocations fairly closely.

Figure 37:
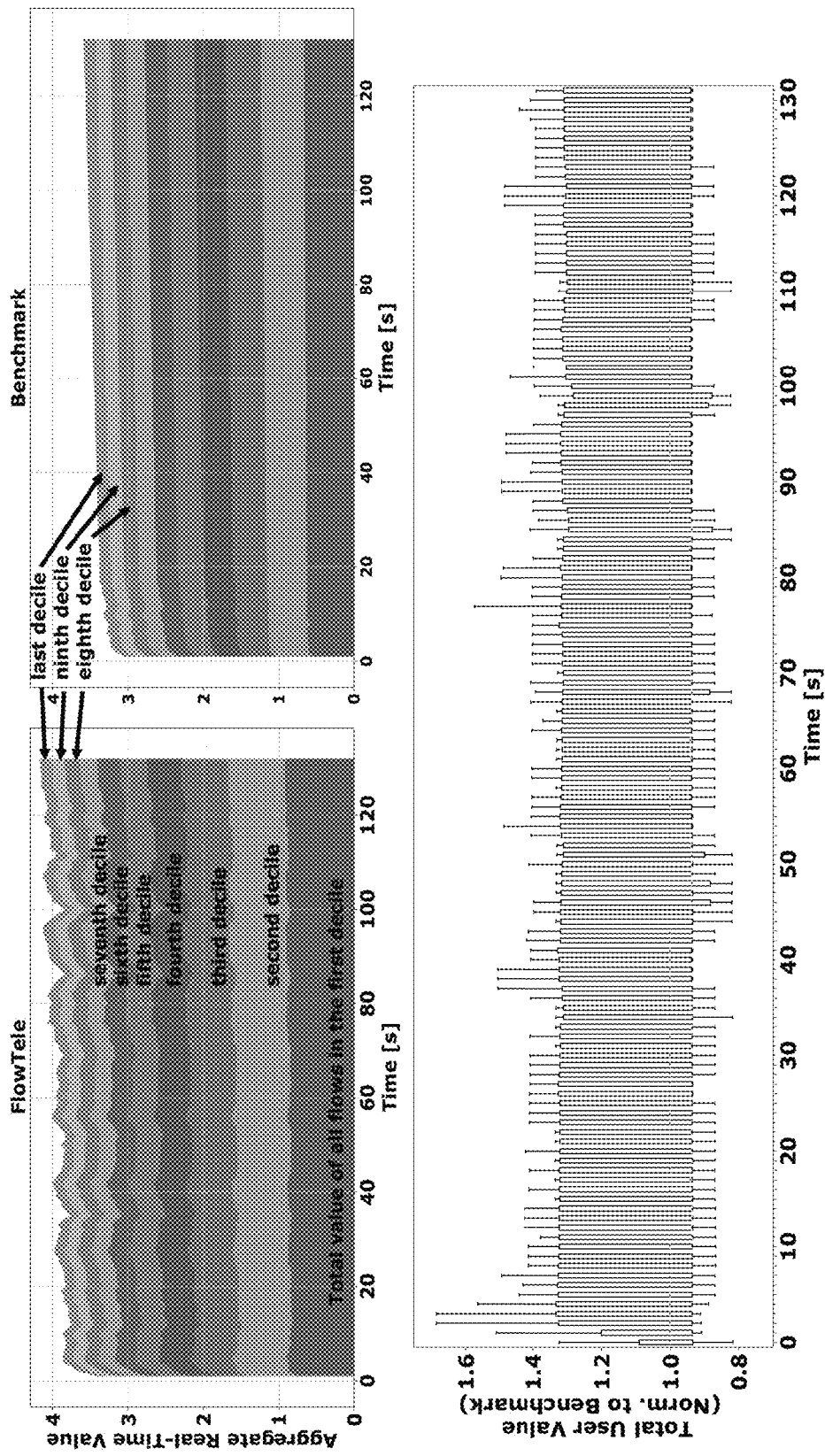
FIG. 37 shows a set of graphs illustrating exemplary realtime user values for FlowTele and unshaped (TCP) traffic, aggregated by decile, in which users having higher value are toward the bottom of the graphs.
Figure 38:
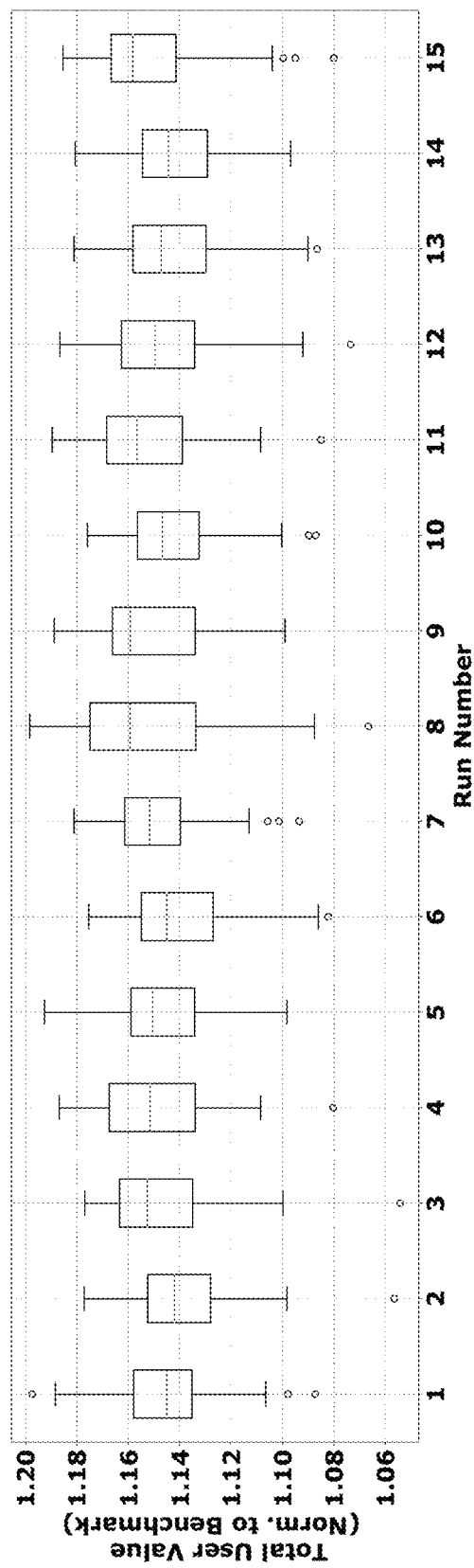
FIG. 38 shows a graph illustrating exemplary realtime user values for FlowTele.

FIG. 37 shows per user real-time value with both vAlloc and without any control (i.e., TCP fairness), grouped by user-value decile. When controlled by FlowTele, total user value increases significantly. The bottom graph of FIG. 37 shows that at all times, all flows have FlowTele-controlled value at least 80% of their uncontrolled value, meaning that even the lowest-valued users experience minimal degradation of experience. Nonetheless, the top quartile of users experience user value increases of over 30%, allowing for significant improvements in total user value. We ran a total of 15 runs with different user value distributions, and collected the user value with FlowTele as compared to the user value with simple TCP fairness, and plotted the results in FIG. 38; we average around a 15% improvement in all runs, and up to 20% improvement in certain runs.

The integration platform for qAlloc may include a real network connection with an in-network bottleneck link and emulated user links. We routed the streams from a server machine through a middle hop to a client machine. In the middle hop, we set the total rate using Hierachy Token Bucket (HTB) to limit the shared link bandwidth, and add a CoDel queue discipline to manage the queue when the middle hop is the bottleneck. To emulate each user link, we generated the real-time end-user bandwidth based on the Markov model in Section 3.2, and then used HTB to shape the outgoing traffic at every second on the server.

TABLE 7

The network settings used in qAlloc integrated evaluation.

| Content Provider Location | User Location | Provider-User RTT (ms) | Bottleneck Capacity (Gbps) |
|---|---|---|---|
| Digital Ocean New York | Toronto | ~13 | up to 1 |

TABLE 8

Link settings of the qAlloc integrated evaluation.

| Link Set | Number of Target/ Calibrator Flows | Total bandwidth | Advertised bandwidth | Bandwidth Standard Deviation |
|---|---|---|---|---|
| 1.1 | 7/3 | 30 Mbps | 10 Mbps | 0.5~2 Mbps |
| 1.2 | 70/30 | 300 Mbps | 10/12/14 Mbps | 0.5~2 Mbps |
| 1.3 | 210/90 | 1 Gbps | 10/12/14 Mbps | 0.5~2 Mbps |
| 2.1 | 7/3 | 150 Mbps | 10 Mbps | 0.5~2 Mbps |
| 2.2 | 24/11 | 500 Mbps | 10 Mbps | 0.5~2 Mbps |
| 2.3 | 70/30 | 1 Gbps | 10/12/14 Mbps | 0.5~2 Mbps |

The network setting is shown in Table 7 with target flows and calibrator flows as well, and the link settings are listed in Table 8. Group one and two are constrained and unconstrained cases respectively. We evaluated qAlloc for 10~300 flows, and set advertised bandwidth to 10~14 Mbps with a random bandwidth deviation from 0.5~2 Mbps for the Markov model, which is close to our use case that emphasizing the codec bandwidth choice and actual bandwidth allocation. The results of qAlloc integrated evaluation are plotted in FIG. 35.

Figure 35:
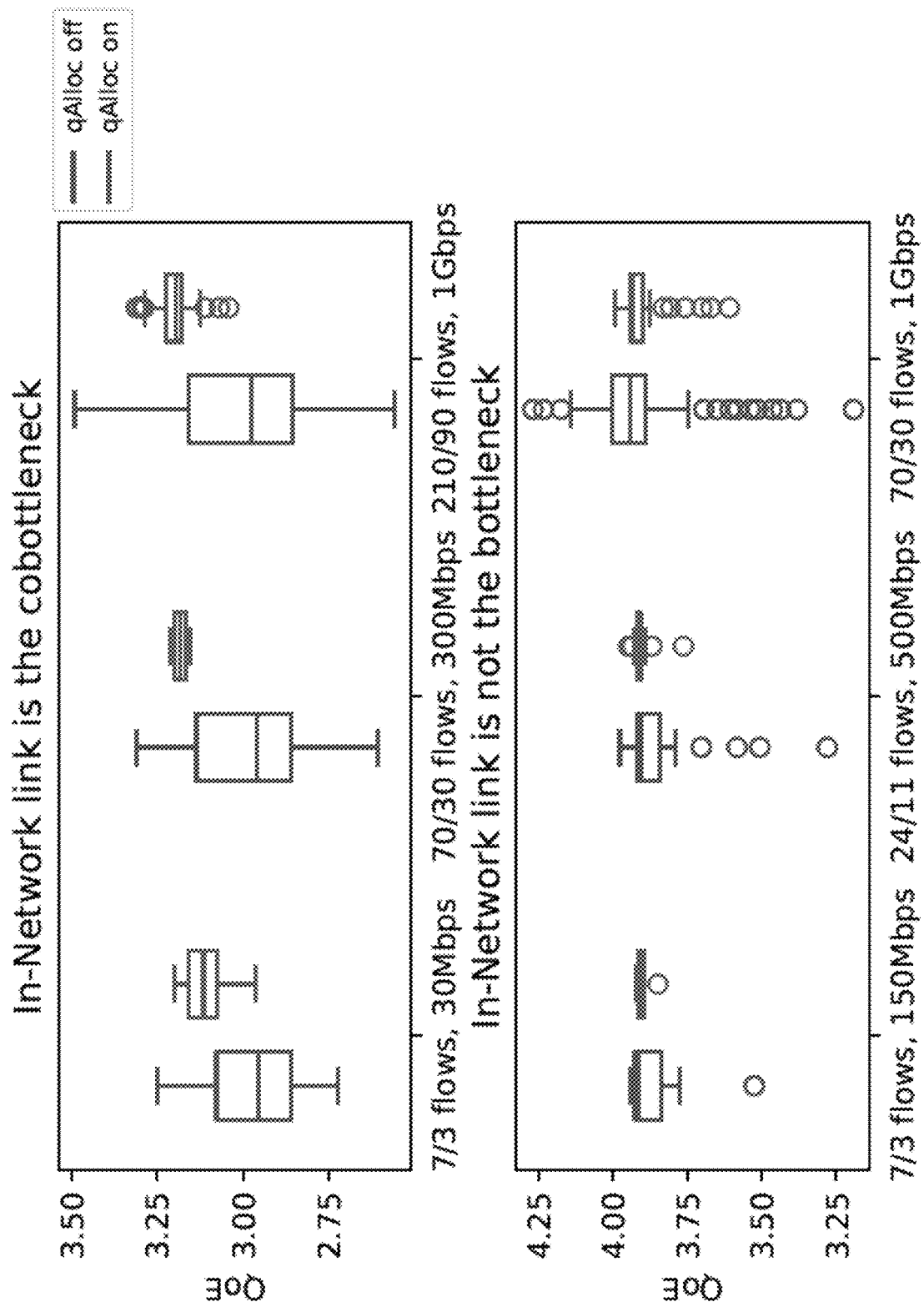
FIG. 35 shows a graph that illustrates results of an integration test of the qAlloc module including three runs in which a co-bottleneck link exists and three runs without such a link, showing that the retransmission rate in the fShaper module is stable.

FIG. 35 shows a graph that illustrates results of an integration test of the qAlloc module including three runs in which a co-bottleneck link exists and three runs without such a link, showing that the retransmission rate in the fShaper module is stable.

Co-bottleneck detection is a key part of cooperative congestion control. Previous co-bottleneck detection work takes two main signals from TCP, packet loss and delay, and correlates them either directly or through summary statistics to detect co-bottleneck links. Loss-based methods tend to be robust but converge slowly, whereas delay-based methods converge quickly but use potentially noisy latency signals. Delay-based methods measure either One-Way Delay (OWD) or RTT; however, accurate one-way delay measurements require client support to reply timestamps. Since the design goal of fCoder is to detect co-bottlenecked flows among a set of co-located sources with neither in network nor receiver-side support, fCoder chooses RTT analysis over OWD. In particular, fCoder performs passive detection by correlating smoothed RTT data. We do not claim that fCoder achieves the highest detection accuracy in all types of scenarios; rather, fCoder excels at detecting bottlenecks among flows with co-located sources, and fCoder-ML extends fCoder to allow very fast detection of co-bottlenecks across large number of flows.

Many transport protocols have recently been proposed, such as BBR, PCC, and QUIC in wide area networks and DCTCP in data center networks. fShaper is not another TCP variant Instead, it is cross-flow bandwidth reallocator built on top of the underlying transport protocol. We demonstrate a fShaper on TCP Cubic in this paper, but fShaper is not fundamentally limited by the transport protocol.

Traffic Shaping on Remote Bottlenecks. In general, network traffic shaping is done locally; for instance Internet Service Providers shape their traffic to reduce peak utilization. When network flows are bottlenecked on remote links, flow senders have limited shaping capabilities. Although it is possible for senders to enforce various queuing or throttling mechanism in private WAN or datacenter networks, fine-grained shaping in open and decentralized networks is still challenging Prior work proposed the concept of destination-driven policies which allows senders to reallocate bandwidth across flows at Cloud middleboxes (aiming to defend against Distributed Denial of Service attacks). FlowTele, however, does not require intermediate deployment.

Video Quality of Experience. Because of the importance of video as an Internet traffic source, several studies have aimed to improve the quality of experience (QoE), including. While we instantiate vAlloc and evaluate FlowTele for video streaming applications, we rely on previous measurement data to model state machine transition probabilities. When designing qAlloc, we focus on achieving QoE fairness (often not the same as TCP fairness) among a group of co-bottleneck flows. We clarify that FlowTele is not limited to video streaming; rather, fAllocator can optimize any hybrid economic-and-social metric for a variety of bandwidth-constrained applications.

FlowTele is the first system that facilitates content providers to remotely shape traffic on Internet-scale networks in accordance with certain prioritization metrics desired by the providers. FlowTele comprises multiple components. fCoder and fCoder-ML may detect when flows share the same bottleneck, and we have demonstrated their accuracy and performance. fAllocator is a general framework to optimize various metrics desired by the provider. fAllocator may be instantiated with two types of optimizers: vAlloc to maximize the aggregate user value and qAlloc to optimize the user QoE. The other major part of FlowTele is fShaper, which takes bandwidth splits from fAllocator and delivers the target bandwidth weights to each flow. We demonstrated that fShaper may accurately split available bandwidth to target ratios while retaining friendliness to cross-traffic. We implemented a prototype of FlowTele with about 7400 lines of code, and substantially evaluate FlowTele's components individually and together. Our Internet-scale integration experiments show that FlowTele improves aggregate user value by over 15% on average.

Internet-scale co-bottleneck detection is challenging due to dynamic and unknown cross-traffic and routing. The fCoder module builds on the insight that when two flows traverse the same bottleneck link, the queuing-induced latency at that bottleneck link will vary over time and be experienced similarly by both flows. Thus, fCoder detects co-bottlenecks using a correlation mechanism based on time-domain samples of the round-trip-time (RTT), as illustrated in FIG. 4. For each flow, fCoder may measure the RTT of each packet that has not been retransmitted, linearly interpolate those samples to obtain a continuous function, normalize them to zero-mean and unit-variance, and compute the rate at which RTT changes over time, which fCoder may use as the RTT profile for that flow. For any two flows, fCoder may then correlate these profiles to calculate the average correlation values within a sliding window, which is the co-bottleneck metric for that flow pair. Specifically, to handle time-shifts in latency to the bottleneck link, cross-correlation may be used to find the peak correlation for time shift within an interval.

We performed several Internet-scale experiments to demonstrate the effectiveness of fCoder. In the experiments, the network topology, shown in FIG. 5, is controlled to create two cases where (i) a set of flows, with a high probability, do share a bottleneck link, and (ii) a set of flows, based on speed-of-light constraints on packet forwarding, cannot share any common links. Specifically, the first set of flows S1={f0, f1, f2} are sent from our campus network, with two flows sent to VMs deployed on the Google Cloud Platform (GCP) Iowa, and one flow going to another on-campus host. We collect flow statistics, compute the co-bottleneck metrics for all pairs of flows and plotted them against time in FIG. 6A. The results show that the co-bottleneck metric between f0 and f1 is much greater than that of {f0, f2} and {f1, f2}. This is consistent with our expectations that two flows sending to the VMs located in the same GCP region will tend to be co-bottlenecked upstream of our campus network, whereas the on-campus flows and off-campus flows are less likely to be co-bottlenecked. From time to time, all flows might experience co-bottlenecks due to on-campus congestion or WiFi congestion; our results appear to show brief periods of such co-bottlenecks.

The second group of flows is S2={f0, f1, f3}. We set up a flow f3 in Asia so that its packets and packets of f0 and f1 could not possibly traverse the same link, as long as packets cannot travel faster than the speed of light. Throughout the experiment, we monitored the RTTs to ensure that they stayed low enough to provide the non-co-bottleneck guarantee. The results, shown in FIG. 6B, show very low correlation metrics for the guaranteed non-co-bottlenecked flow pairs.

In all experiments discussed herein, the throughput of our controlled flows is less than 100 Mpbs. Thus, the experiments also demonstrate the effectiveness of fCoder even when the rates of our flows are much smaller than the capacity of bottleneck links.

Though correlating flows' normalized RTT metrics results in accurate co-bottleneck detection, such correlation is relatively computationally expensive: for example, in our previous Internet-scale runs with 100 Mbps flows, correlating 30 seconds of data for a single flow pair takes about 10 ms on an Intel Core i7-8569U processor; thus, in a datacenter with a large number of flows, computing these correlations for all flow pairs for every sliding window could be computationally infeasible, since for n flows, we need to consider O(n2) flow pairs. In this subsection, we examine how Machine Learning can reduce the number of candidate flow pairs to improve the computational performance of co-bottleneck detection.

A twin neural network, based on a Siamese network structure, may be trained and deployed to improve co-bottleneck detection scalability. An autoencoder may first be trained to study how much the ΔRTT sequence of each flow can be compressed while still preserving the unique characteristics of each flow. Then, using the same neural network structure as the encoder part of the autoencoder, a twin neural network may be trained to capture the ΔRTT similarity between two flows using the following loss function:

$$L_{func}=(1-Y)\cdot L_2(f_1,f_2)\cdot P_{weight}+Y\cdot \max\{0, \text{margin}-L_2(f_1,f_2)\}, \quad (14)$$

where L2 (f1, f2) is the L2-norm of the flow pair (f1, f2)'s ΔRTT profiles, Y is the label assigned for the flow pair (Y=0 if the flow pair is co-bottlenecked and Y=1 otherwise), and margin is a predefined ceiling for the L2-norm of any flow pairs. Thus, the loss function represents L2 (f1, f2) if the flow pair shares a bottleneck, and otherwise it represents the difference between L2 (f1, f2) and margin. Thus, our training process minimizes L2 (f1, f2) if they share a bottleneck or to push L2 (f1, f2) to at least the predefined margin if they are not co-bottlenecked. In the loss function, a configurable weight $P_{weight}$ can be added to the co-bottlenecked term.

To generate the data required for training and validation of the neural network, we use the ns-3 simulator to build a variety of network topologies based on both the Internet Topology Zoo (ITZ) and the Brite topology generator. We randomize both the number of controlled flows and cross-path flows, while ensuring that the total rate of controlled flows is about 10% of the total rate of the cross traffic. For each topology, our simulator first determines whether two controlled flows share a co-bottleneck based on the routing and link capacity, and then starts the flows to collect their RTT data. Overall, we simulated over 9,000 scenarios in about 80 topologies, and collected over 13 million RTT data points for more than 80,000 flows, as shown in Table 9.

Our final trained twin neural network has three dense layers, which compress the input data by over 84% to make decisions on flow groups. For instance, on a GTX 1080 Ti with Ryzen 7 3800X, fCoder-ML, without any optimization of matrix manipulations, may process 12,000 flow pairs in less than 300 μs, which is a negligible period of time compared to the typical duration of streaming videos, and about 40,000 times faster than the cross-correlation of fCoder. We report the classification performance of fCoder-ML trained and validated on a dataset of just over 320,000 flow pairs, among which approximately 8,000 flow pairs are co-bottlenecked (as inferred from our topologies). About half of the data is used in training and the rest is used in testing. FIG. 24A depicts the mean average precision for various classification thresholds.

TABLE 9

Data collection for training and validating the twin neural network of fCoder-ML.

| Topology Type | Number of Topologies | Number of Scenarios | Number of Flows | Number of Data Points |
|---|---|---|---|---|
| ITZ [29] | 64 | 8064 | 76608 | 12.5 million |
| Brite [37] | 15 | 630 | 3780 | 1.1 million |

Our training set and loss function aim for a very high true negative rate, because among n2 flow pairs, even a small false positive rate may result in a large number of false positive pairs, and as a result, fCoder-ML has a true negative rate over 99.9% across a wide range of classification thresholds, ensuring that fCoder will not waste computational resources on verifying false positives. Further, at higher classification thresholds, the true positive rate improves drastically while the false positive rate remains very low, showing that fCoder-ML may provide many candidates for co-bottlenecked flows for cross-flow bandwidth allocation.

We also evaluated fCoder-ML's performance with different $P_{weight}$ values, the factor to control the gap between negative and positive cases in the loss function Equation (14). With a higher $P_{weight}$ value, fCoder-ML achieves a relatively high true positive rate at the same classification threshold, and a slightly lower true negative rate at large classification thresholds.

Figure 24C:
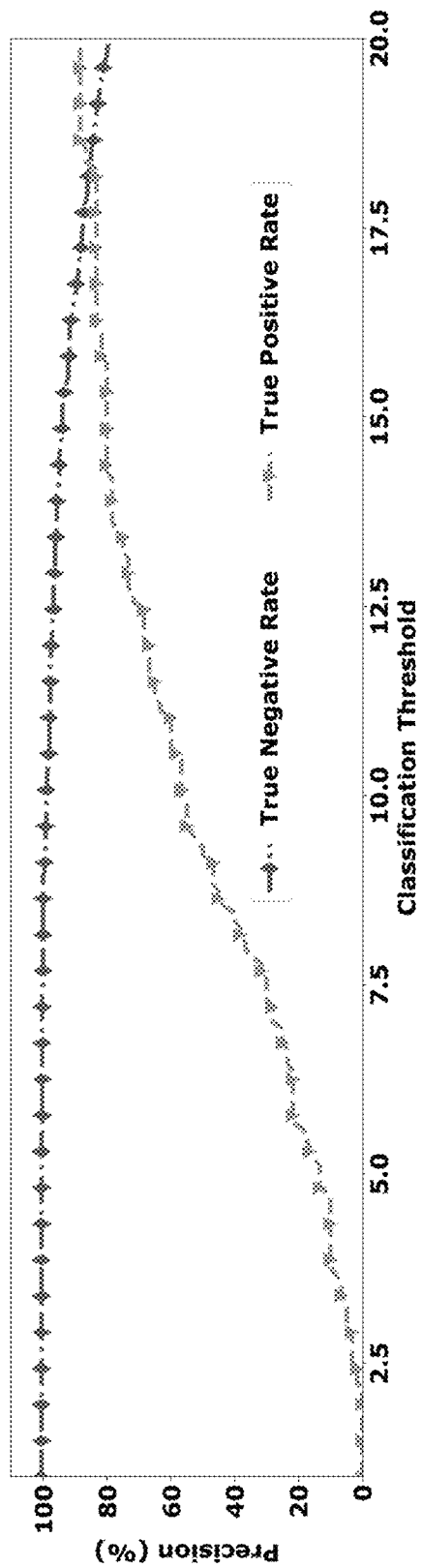
FIG. 24C is a graph illustrating exemplary classification performance of a transferred model.
Figure 25A:
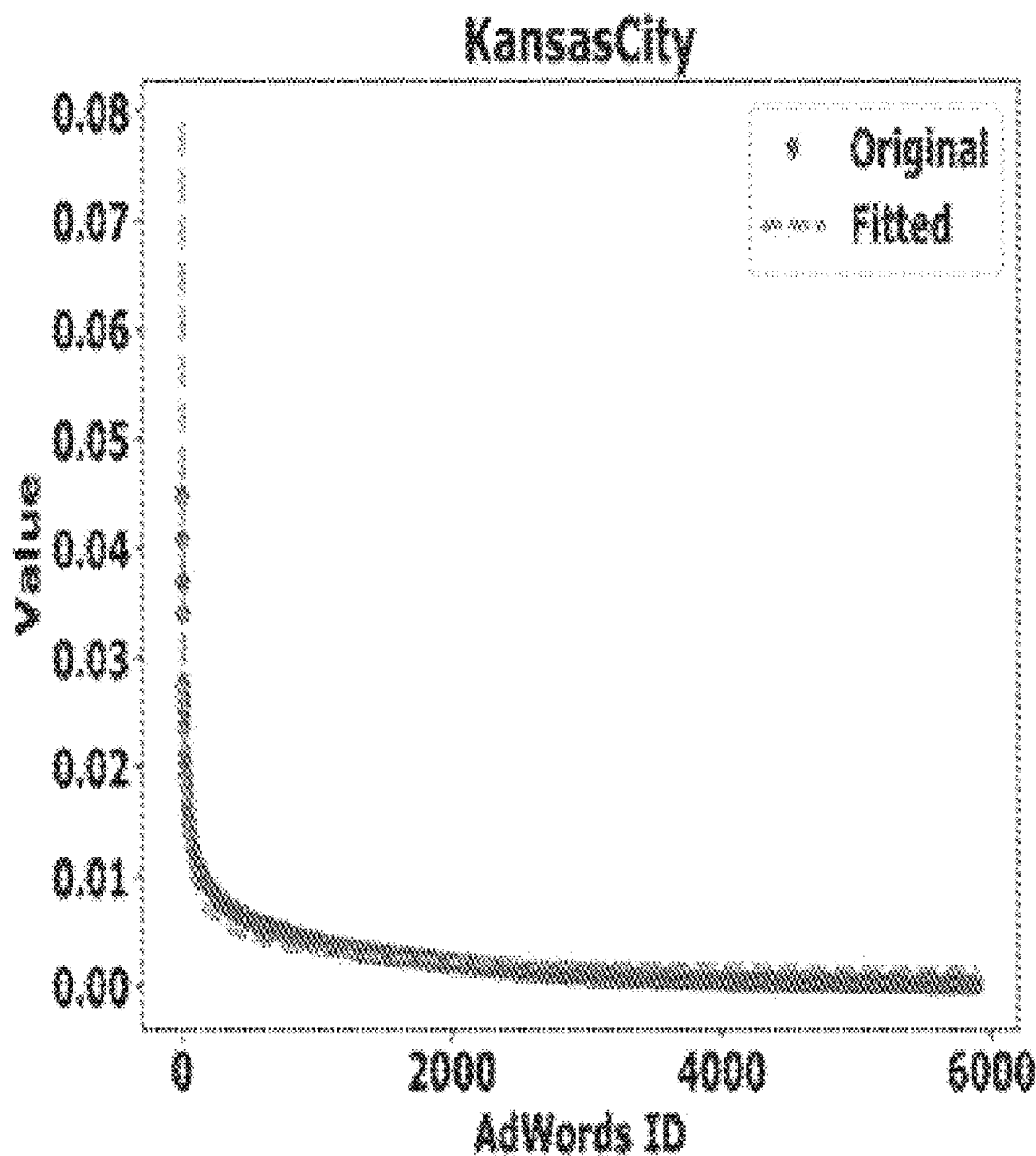
FIGS. 25A, 25B, 25C, 25D, 25E, 25F, 25G, 25H, and 25I are graphs illustrating exemplary advertisement values of the Google AdWords and corresponding fitted curves.
Figure 25B:
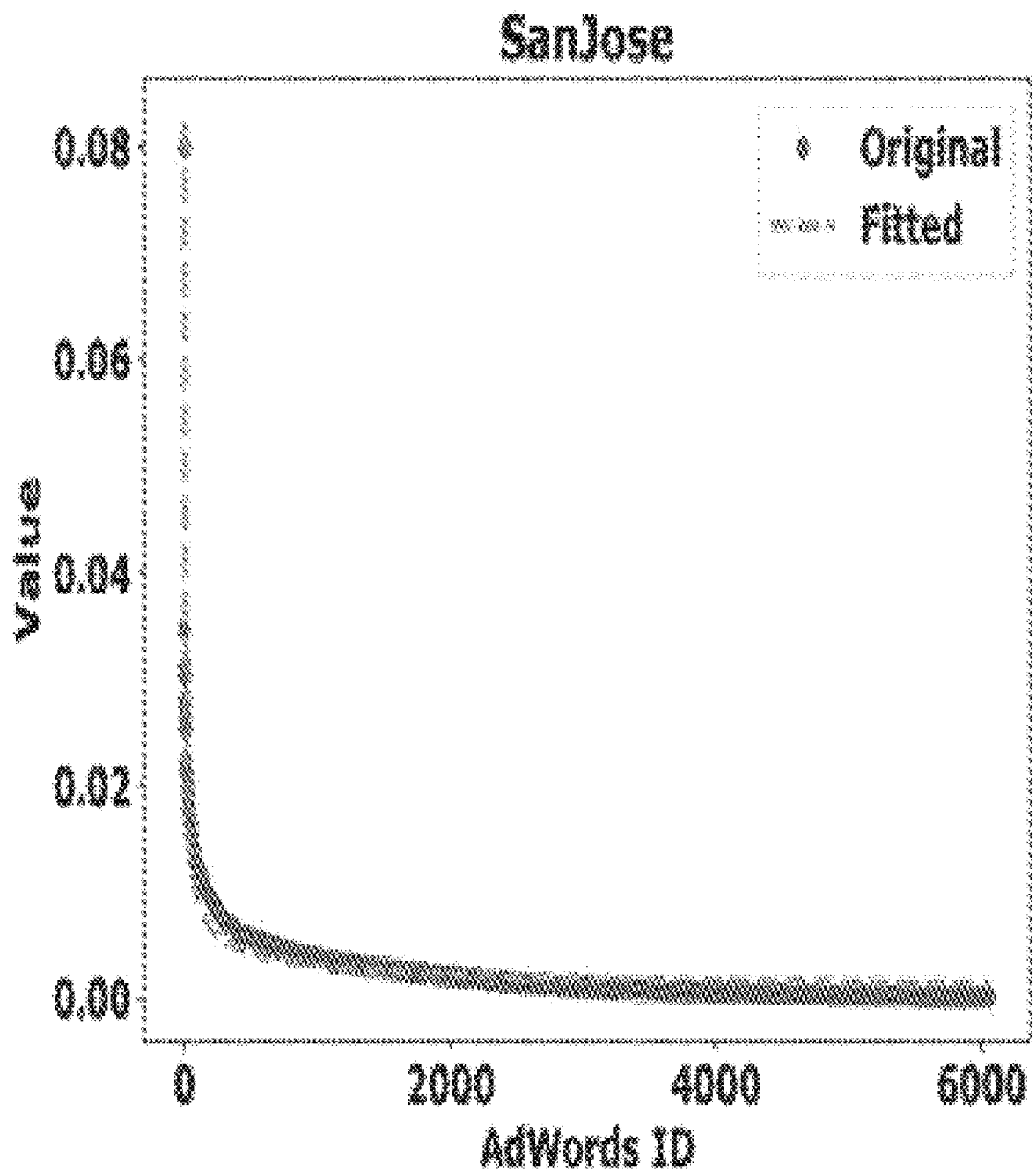
Figure 25C:
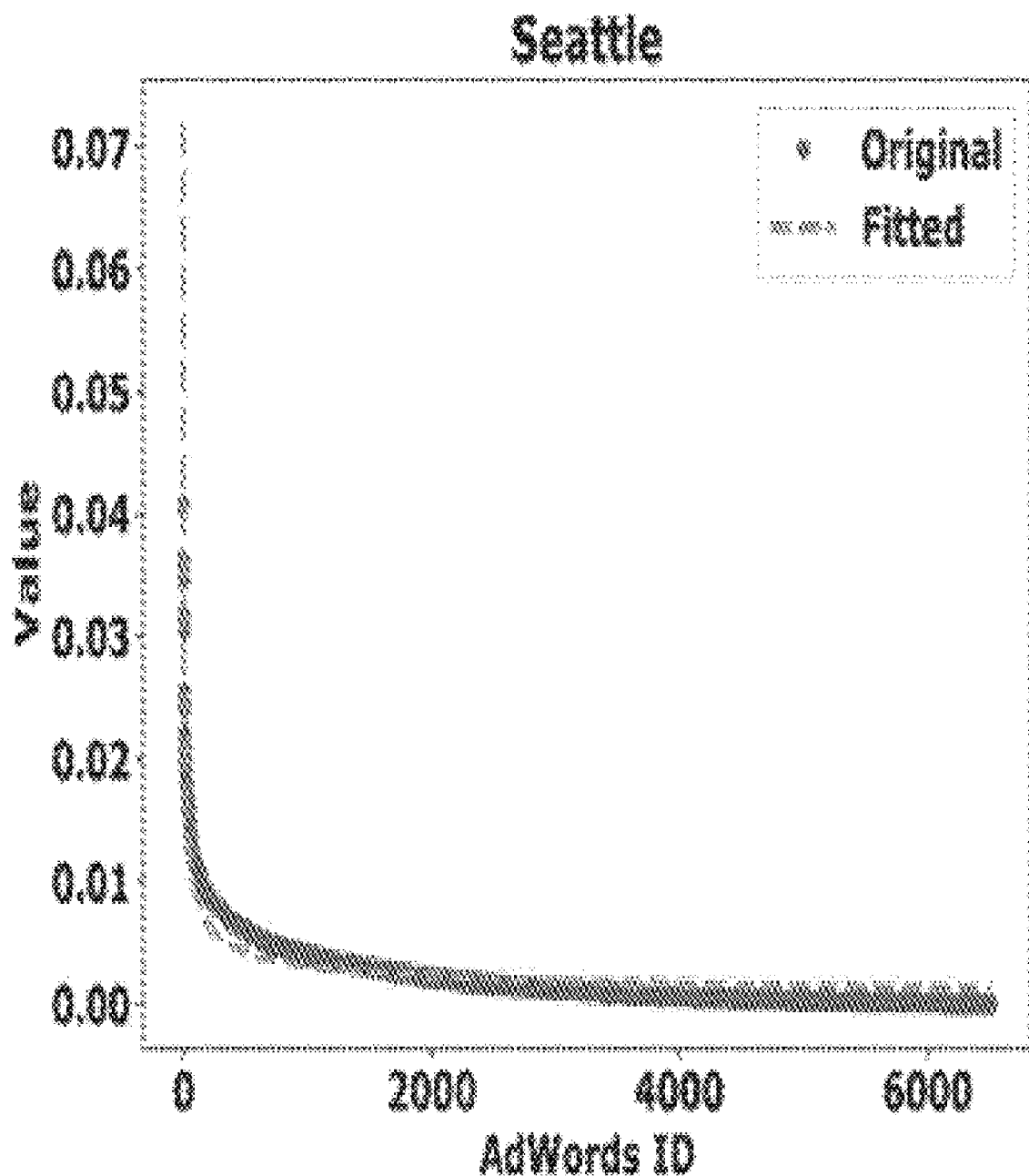
Figure 25D:
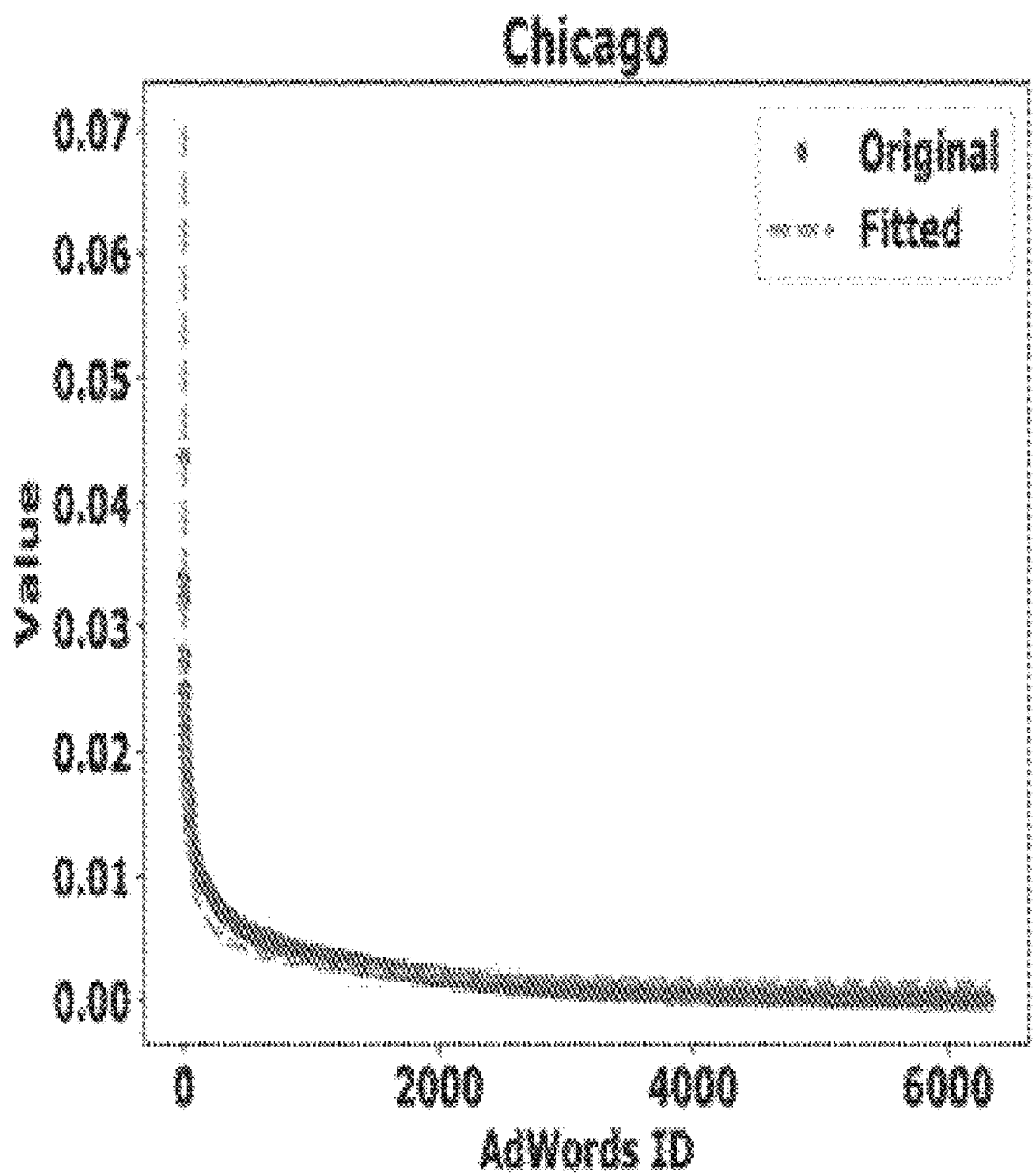
Figure 25E:
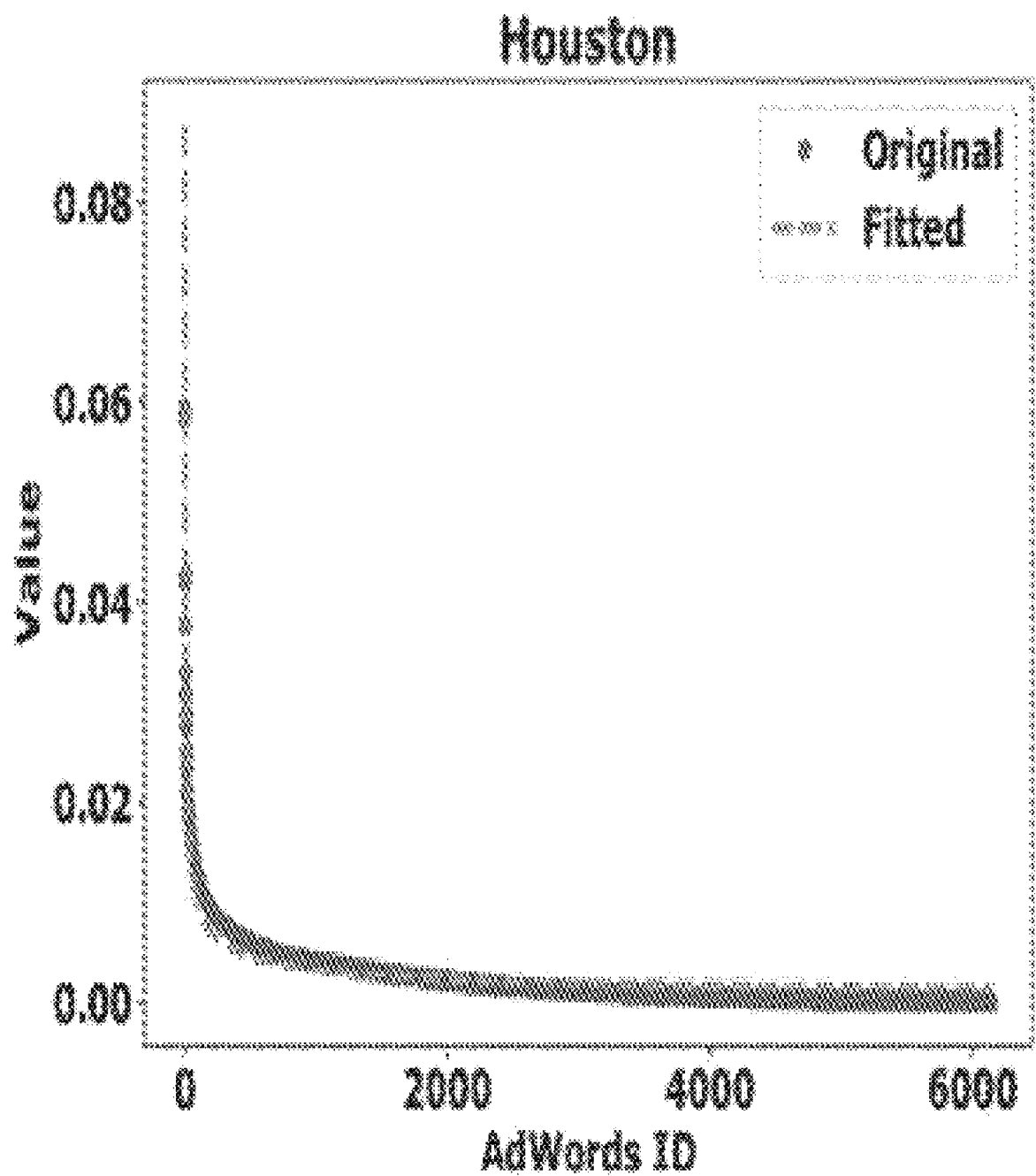
Figure 25F:
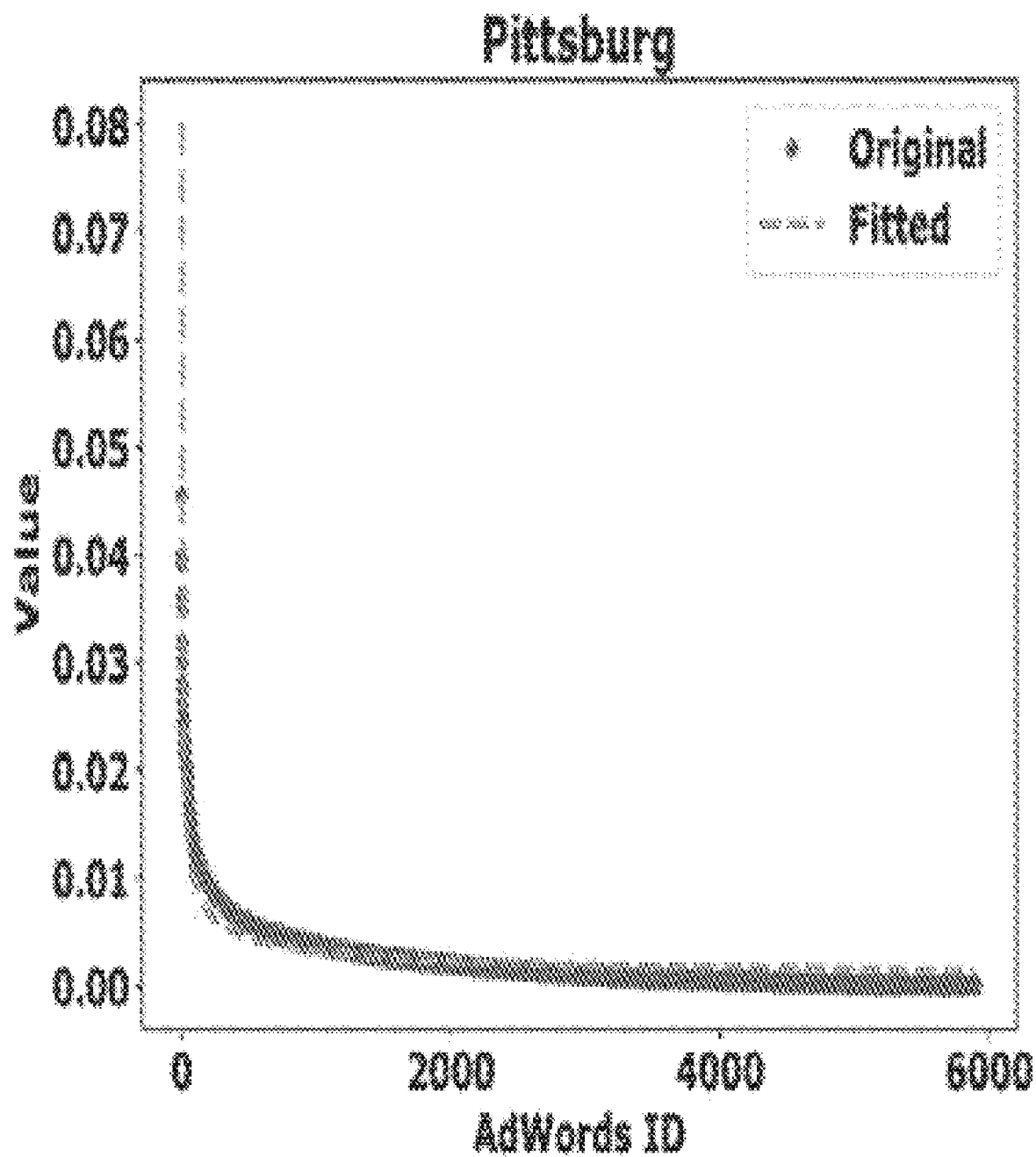
Figure 25G:
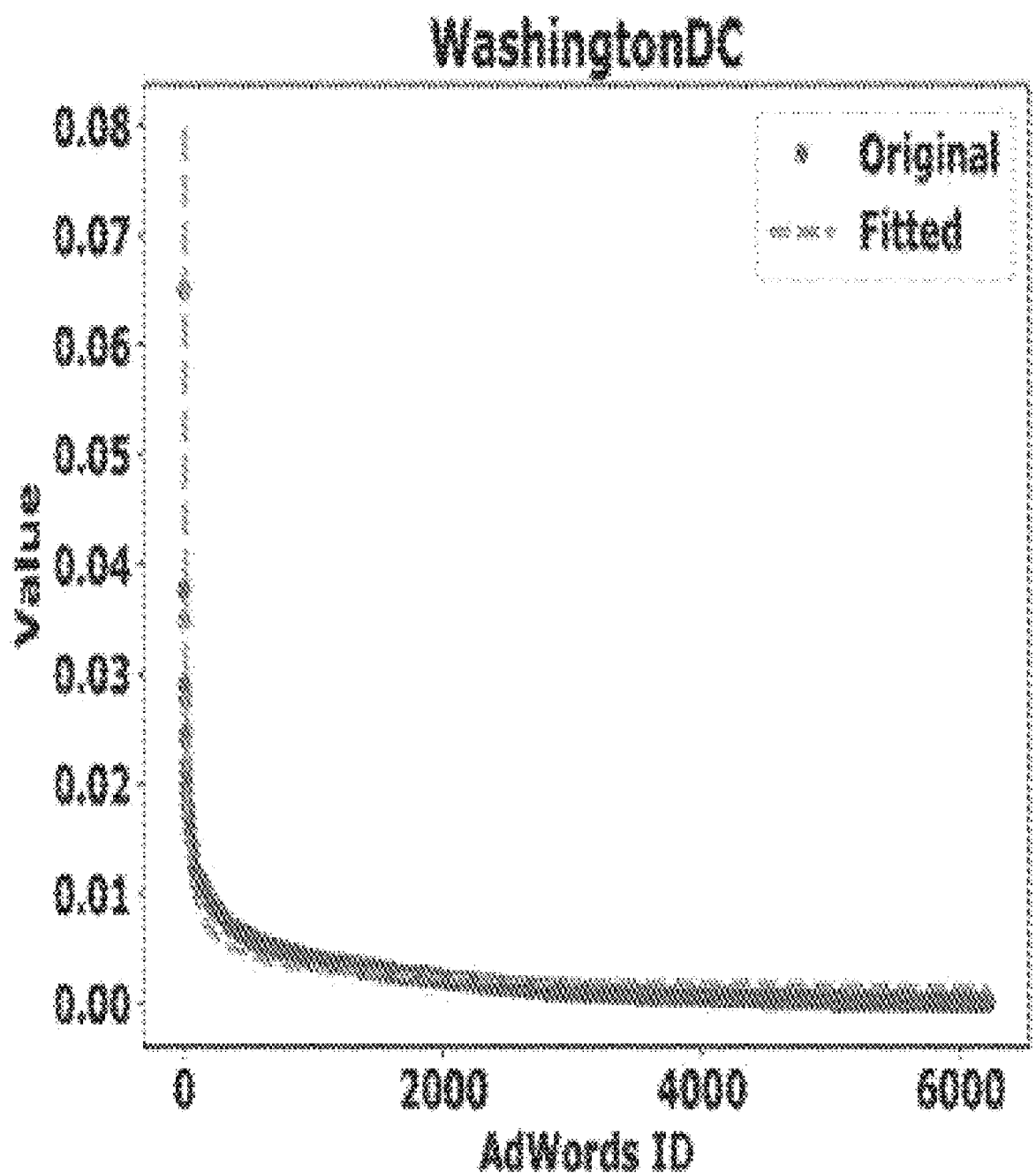
Figure 25H:
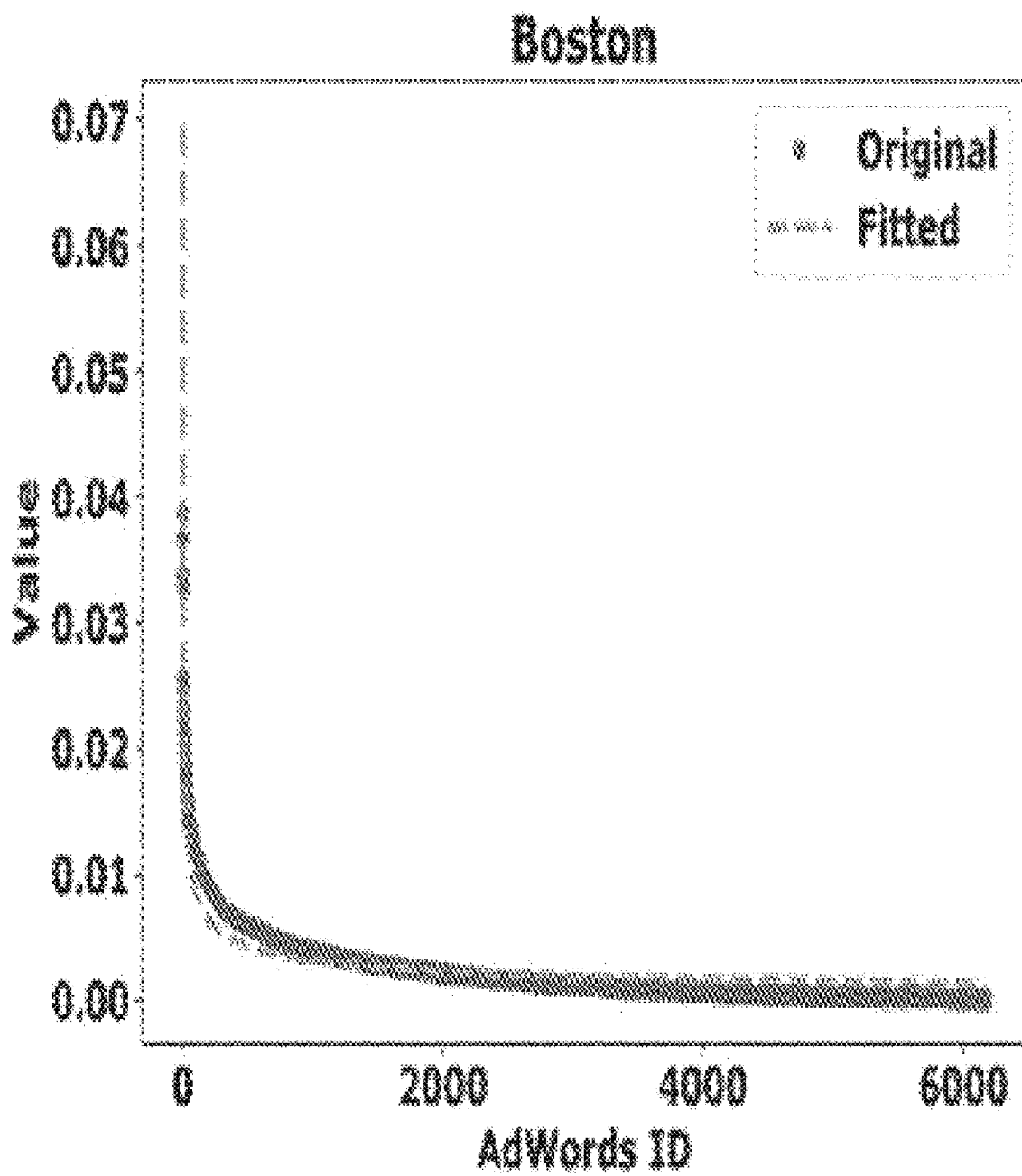
Figure 25I:
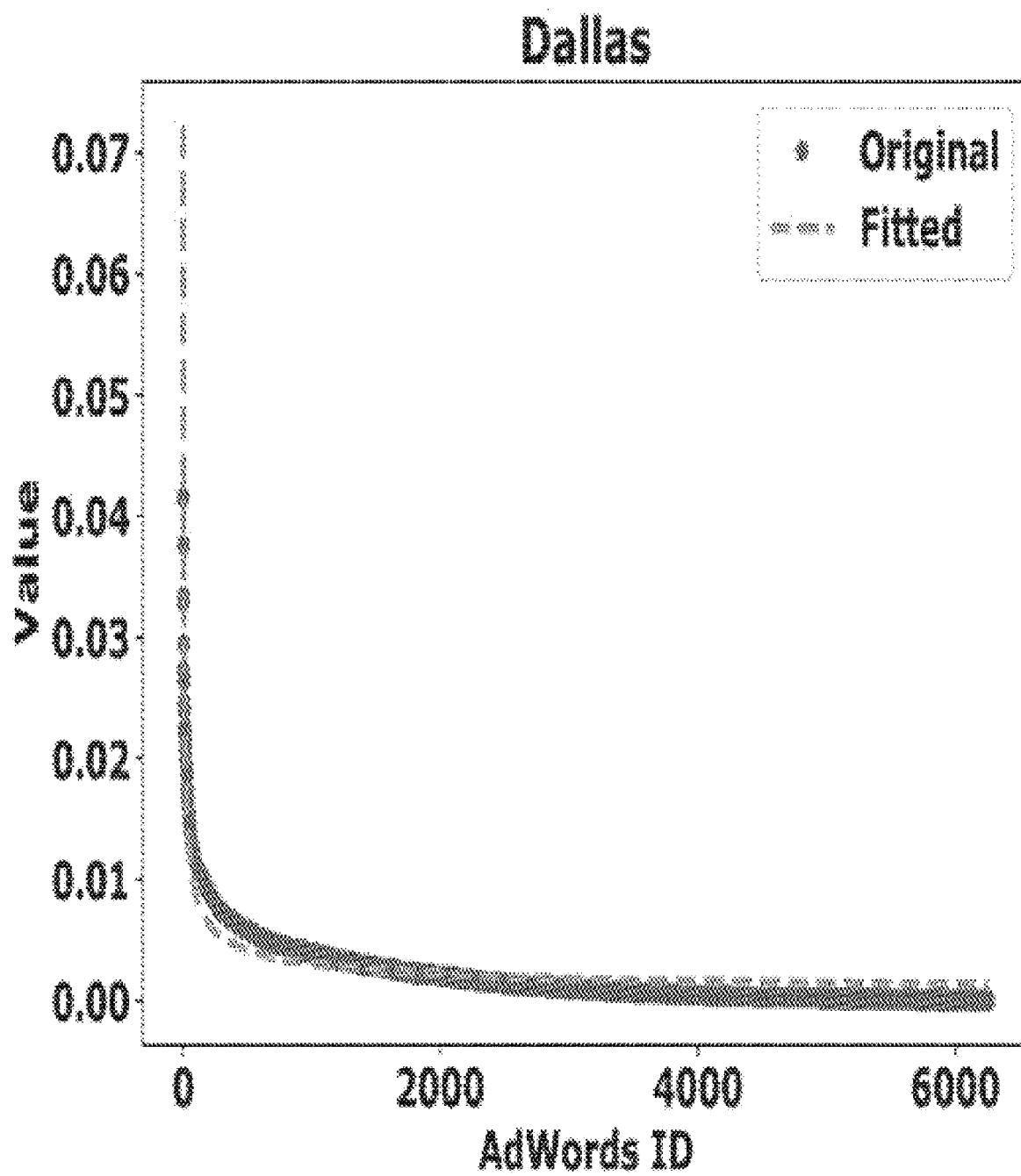

The fCoder-ML's neural network contains both generic components and those specific to the content provider's network. Training such a neural network may take a significant amount of data. We evaluated the use of transfer learning to speed the training of fCoder-ML. To determine the effectiveness of transfer learning, we started from a model trained on the dataset collected in our simulated network, and used it together with a small amount of data from a real-world dataset. In deep neural models, transfer learning typically fixes the first few layers of the original model and tunes only the remaining layers during the training process. We took the same approach, collecting an RTT dataset from over 600 flow pairs traversing the Internet, of which around 100 flow pairs are co-bottlenecked. We use 45% of the data for transfer learning and the remaining data for validation and plot our training performance in FIG. 24C. The transferred model demonstrates satisfactory classification performance on the real-world RTT dataset, despite being partially trained on only simulated data.

Figure 31:
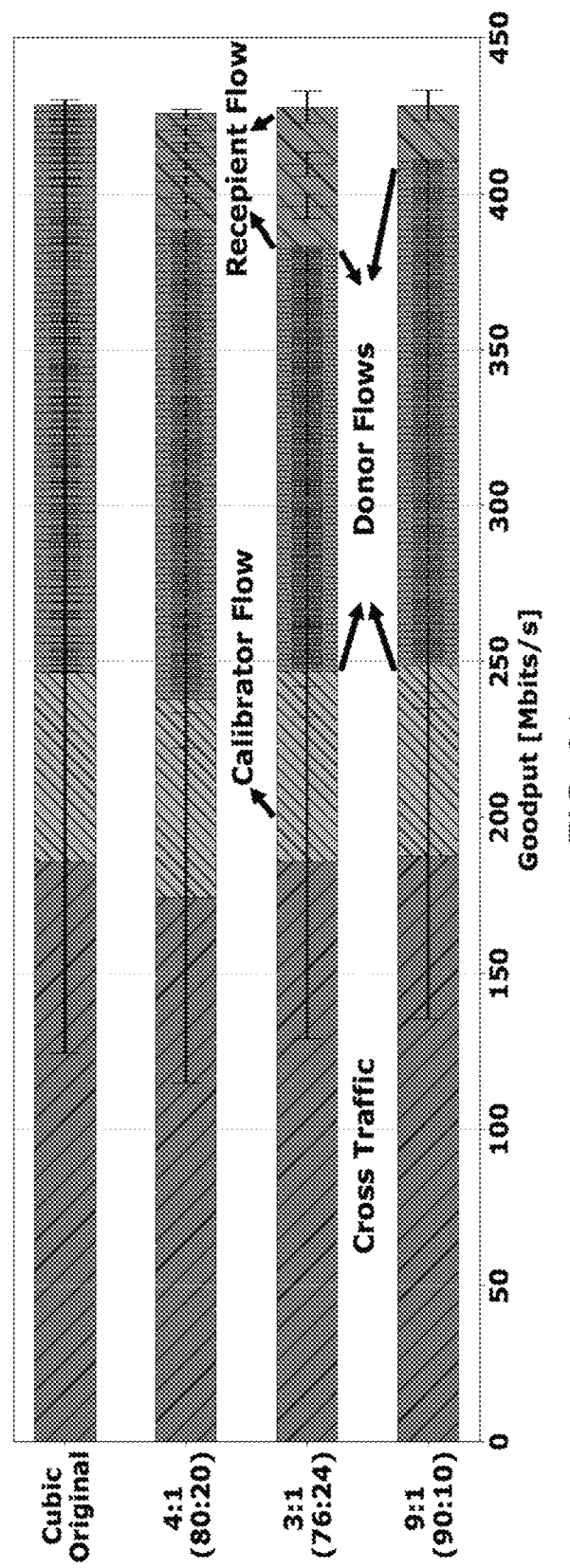
FIG. 31 is a graph illustrating exemplary fShaper fairness results in the US network setting when the device controls a majority of bottleneck bandwidth.
Figure 32:
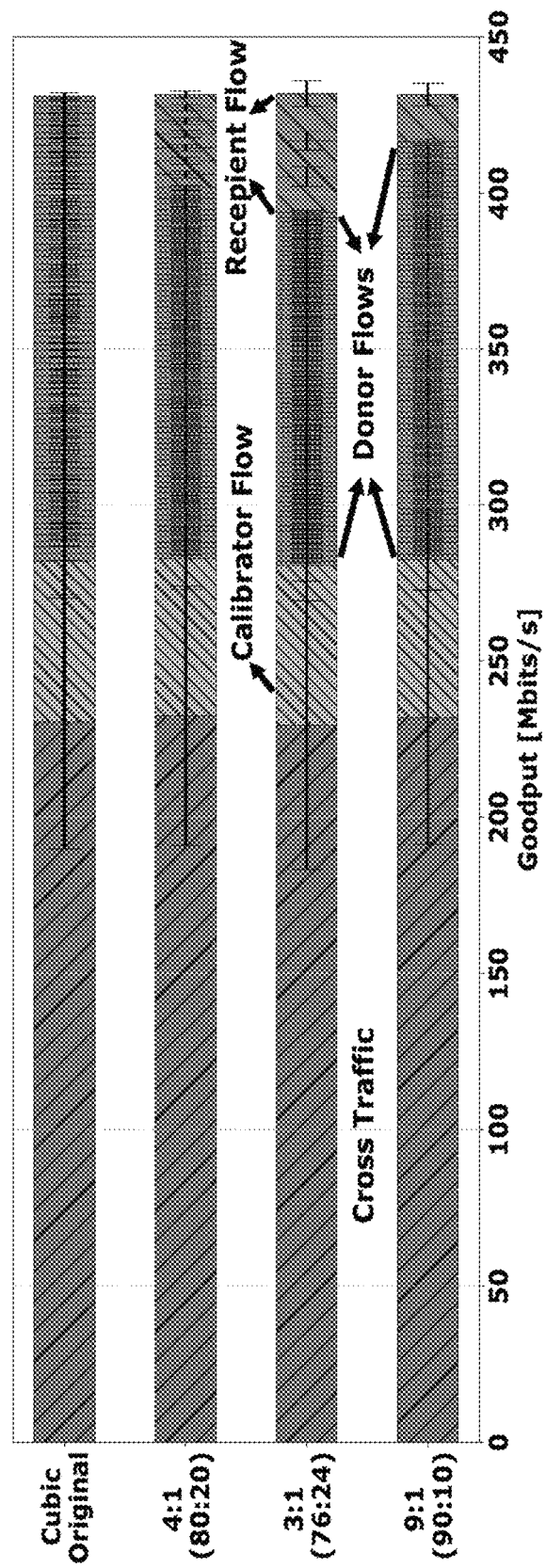
FIG. 32 is a graph illustrating exemplary fShaper fairness results in the US network setting when the device controls a minority of bottleneck bandwidth.
Figure 33A:
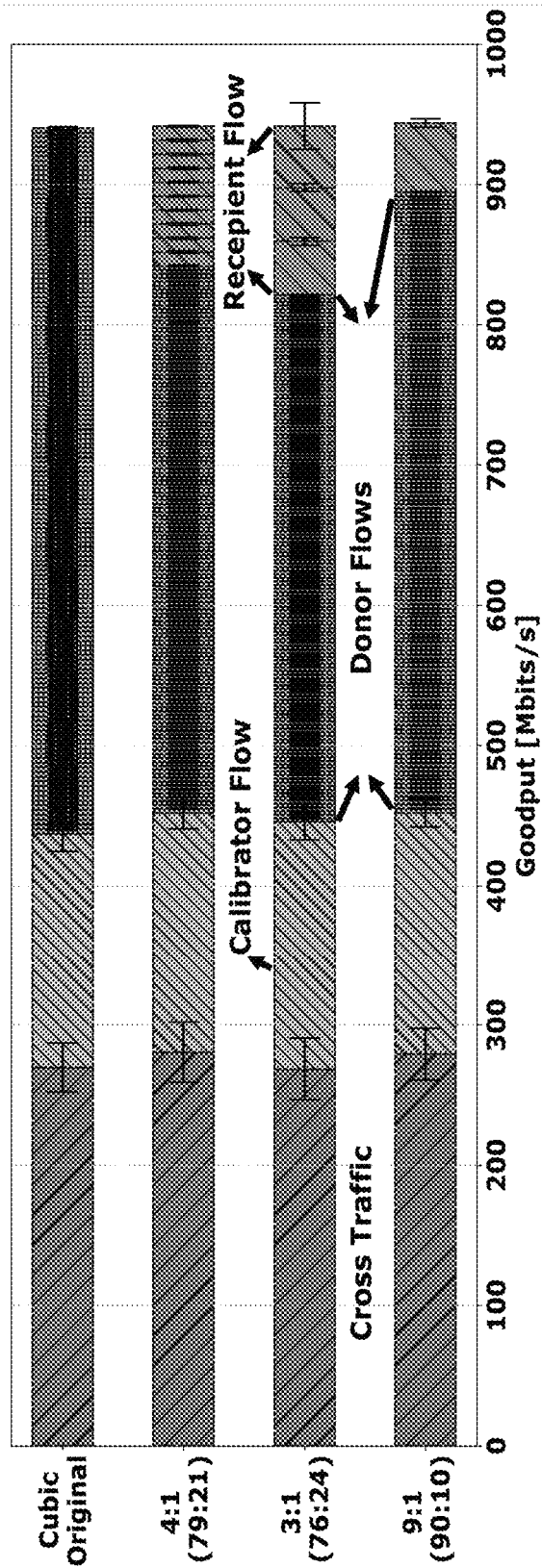
FIG. 33A is a graph illustrating exemplary fShaper fairness results in the Asia network setting when the device controls a majority of bottleneck bandwidth.
Figure 33B:
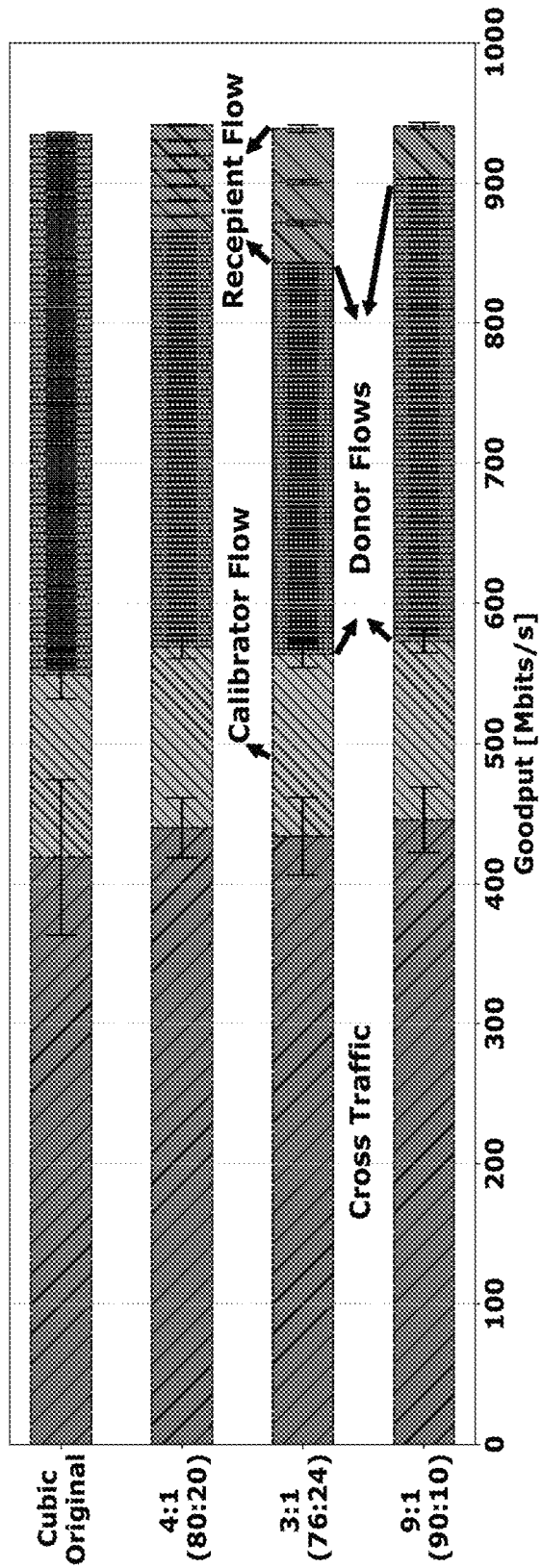
FIG. 33B is a graph illustrating exemplary fShaper fairness results in the Asia network setting when the device controls a minority of bottleneck bandwidth.

Elsewhere herein, with reference to FIGS. 31 and 32, we discuss the evaluation for fShaper and plot the results in the US network setting. In this section, we report the results collected in evaluating fShaper for the Asia network setting. We use a slightly different configuration in the majority scenario where we use 200 FlowTele-owned flows instead of 100. Thus, we also have 10 recipient flows (not 7) for the 4:1 case. The results are plotted in FIG. 33A (majority scenario) and 33B (minority scenario). FIG. 33A is a graph illustrating exemplary fShaper fairness results in the Asia network setting when the device controls a majority of bottleneck bandwidth. FIG. 33B is a graph illustrating exemplary fShaper fairness results in the Asia network setting when the device controls a minority of bottleneck bandwidth. The y-axis plots the target weight allocations and the achieved allocations (enclosed in bracket) between the recipient flow and the aggregate donor flow. The breakdown results are given in Table 10.

processors and computing networks may also perform the method 3900 in various embodiments. The method 3900, in various embodiments, may be implemented with fewer or more steps illustrated and described in this example embodiment shown in FIG. 39. Some procedures in the embodiment of the method 3900 shown in FIG. 3 may be substituted with others in various instantiations of the method 3900.

In an operation 3910, a profile for each flow of a plurality of flows of content may be created. The flows of content may be from a content provider to a content consumer on a computing network.

In an operation 3920, information may be stored in each profile corresponding to each flow of the plurality of flows based on at least a metric associated with the corresponding flow. The information may include an assigned score based on the metric.

In an operation 3930, co-bottleneck flow pairs may be detected. For example, computations using profile data may detect one or more co-bottleneck flow pairs.

In an operation 3940, a target bandwidth for each profile may be remotely computed. The target bandwidth may be

TABLE 10

The breakdown of fShaper results in the Asia network.

| | | Ratio: Self-Flows/ Cross-Traffic | Ratio: donor/ recipient | Among donor Flows | Among recipient Flows |
|---|---|---|---|---|---|
| Majority Scenario | | | | | |
| the 4:1 case | Target | 71.31/28.69 (all Cubic flows) | 4/1 | Equal Share | Equal Share |
| | Achieved | 70.18/29.82 | 79.68/20.32 | 0.0046 Mbps (Goodput s.t.d.) | 0.0107 |
| the 3:1 case | Target | 71.31/28.69 | 3/1 | Equal Share | Ratio: [40:30:30] |
| | Achieved | 71.48/28.52 | 75.77/24.23 | 0043 Mpbs | [36.52:31.64:31.82] |
| the 9:1 case | Target | 71.31/28.69 | 9/1 | Equal Share | One recipient |
| | Achieved | 70.42/29.58 | 89.94/10.06 | 0.0049 Mbps | One recipient |
| Minority Scenario | | | | | |
| the 4:1 case | Target | 44.82/55.17 (all Cubic flows) | 4/1 | Equal Share | Equal Share |
| | Achieved | 46.73/53.27 | 79.78/20.22 | 0.0052 Mbps | 0.0026 Mbps |
| the 3:1 case | Target | 44.82/55.17 | 3/1 | Equal Share | Ratio: [40:30:30] |
| | Achieved | 46.22/53.78 | 74.28/25.72 | 0.0053 Mbps | [40.00:30.01:29.99] |
| the 9:1 case | Target | 44.82/55.17 | 9/1 | Equal Share | One recipient |
| | Achieved | 47.36/52.63 | 89.68/10.32 | 0.0051 Mbps | One recipient |

FIGS. 25A, 25B, 25C, 25D, 25E, 25F, 25G, 25H, and 25I are graphs illustrating exemplary advertisement values of the Google AdWords and corresponding fitted curves. FIGS. 26A, 26B, and 26C illustrate graphs depicting example advertisement values of Facebook and Google AdWords and their fitted curves using quadratic, exponential, and Weibull distributions, respectively. The fitting results are for the value distributions of our user profiles synthesized based on the Facebook and Google datasets for different advertising strategies. The quadratic fitting shows the best coefficient of determination for this dataset, so we use it as one of our representative value distributions for vAlloc and integrated evaluation.

Figure 39:
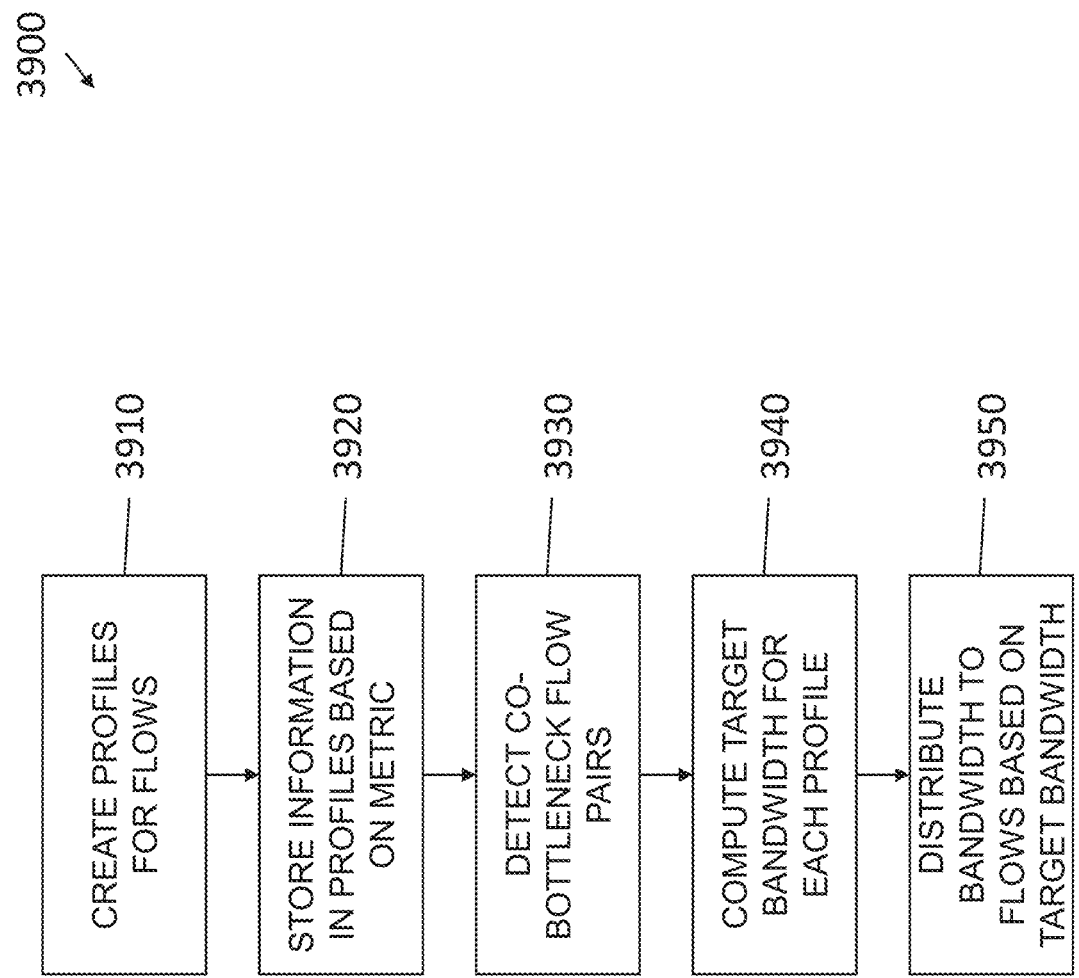
FIG. 39 shows a flow chart illustrating an exemplary method of remotely allocating bandwidth to different flows within a network.

FIG. 39 shows a flow chart illustrating an exemplary method 3900 of remotely allocating bandwidth among content consumers on a computing network. The method 3900 may be performed by a computing processor executing a series of instructions stored in a memory or on a non-transitory machine-readable memory. An example of the computing processor may be an Intel Core i7-8569U processor. An example of the computing network may be the computing network 500 shown in FIG. 5. Other computing computed based on the information stored in their respective profiles. The target bandwidth may be computed based on optimizing an aggregate objective pertaining to the plurality of flows. The aggregate objective may include increasing a total value associated with the plurality of flows of content. The total value may include revenue received by the content provider based on the plurality of flows of content. The total value may include engagement with the content provider by content consumers based on the plurality of flows of content. The total value may include additional content received by the content provider from the content consumers based on the plurality of flows of content. Computing the target bandwidth may be further based on at least a characteristic of the content consumer associated with the profile.

In an operation 3950, bandwidth may be distributed to the flows based on their respective computed target bandwidths. The bandwidth may also be distributed based on the one or more co-bottleneck flow pairs detected in operation 3930.

In one aspect, a method may be an operation, an instruction, or a function and vice versa. In one aspect, a clause or a claim may be amended to include some or all of the words (e.g., instructions, operations, functions, or components)

recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A method for remotely allocating bandwidth among content consumers on a computing network, the method comprising:

creating a profile for each flow of a plurality of flows of content from a content provider to a content consumer on a computing network, wherein the profile for each flow of the plurality of flows is based on one or more real-time network characteristics and round trip time measurements of each flow of the plurality of flows;

detecting, via a twin neural network, one or more co-bottleneck flow pairs based on cross-correlating the profile for each flow of the plurality of flows;

storing information in each profile based on at least a metric associated with the corresponding flow;

computing remotely a target bandwidth for each profile based on optimizing an aggregate objective pertaining to the plurality of flows and based on the information stored in their respective profiles; and distributing bandwidth to each flow of the plurality of flows based on the target bandwidth remotely computed for each profile.

2. The method of claim 1, wherein the computing remotely the target bandwidth is further based on at least a characteristic of the content consumer associated with the profile.

3. The method of claim 1, wherein the aggregate objective includes increasing a total value associated with the plurality of flows of content.

4. The method of claim 3, wherein the total value includes revenue received by the content provider based on the plurality of flows of content.

5. The method of claim 3, wherein the total value includes engagement with the content provider by content consumers based on the plurality of flows of content.

6. The method of claim 3, wherein the total value includes additional content received by the content provider from the content consumers based on the plurality of flows of content.

7. A system for remotely allocating bandwidth among content consumers on a computing network, the system comprising:
  a memory comprising instructions; and
  a processor configured to execute the instructions which, when executed, cause the processor to:
    create a profile for each flow of a plurality of flows of content from a content provider to a content consumer on a computing network, wherein the profile for each flow of the plurality of flows is based on one or more real-time network characteristics and round trip time measurements of each flow of the plurality of flows;
    detect, via a twin neural network, one or more co-bottleneck flow pairs based on cross-correlating the profile for each flow of the plurality of flows;
    store information in each profile based on at least a metric associated with the corresponding flow;
    compute remotely a target bandwidth for each profile based on optimizing an aggregate objective pertaining to the plurality of flows and based on the information stored in their respective profiles; and
    distribute bandwidth to each flow of the plurality of flows based on the target bandwidth remotely computed for each profile.

8. The system of claim 7, wherein the computing remotely the target bandwidth is further based on at least a characteristic of the content consumer associated with the profile.

9. The system of claim 7, wherein the aggregate objective includes increasing a total value associated with the plurality of flows of content.

10. The system of claim 9, wherein the total value includes revenue received by the content provider based on the plurality of flows of content.

11. The system of claim 9, wherein the total value includes engagement with the content provider by content consumers based on the plurality of flows of content.

12. The system of claim 9, wherein the total value includes additional content received by the content provider from the content consumers based on the plurality of flows of content.

13. A non-transitory machine-readable storage medium comprising machine-readable instructions for causing a processor to execute a method for remotely allocating bandwidth among content consumers on a computing network, the method comprising:
  creating a profile for each flow of a plurality of flows of content from a content provider to a content consumer on a computing network, wherein the profile for each flow of the plurality of flows is based on one or more real-time network characteristics and round trip time measurements of each flow of the plurality of flows;
  detecting, via a twin neural network, one or more co-bottleneck flow pairs based on cross-correlating the profile for each flow of the plurality of flows;
  storing information in each profile based on at least a metric associated with the corresponding flow;
  computing remotely a target bandwidth for each profile based on optimizing an aggregate objective pertaining to the plurality of flows and based on the information stored in their respective profiles; and
  distributing bandwidth to each flow of the plurality of flows based on the target bandwidth remotely computed for each profile.

14. The medium of claim 13, wherein the computing remotely the target bandwidth is further based on at least a characteristic of the content consumer associated with the profile.

15. The medium of claim 13, wherein the aggregate objective includes increasing a total value associated with the plurality of flows of content.

16. The medium of claim 15, wherein the total value includes revenue received by the content provider based on the plurality of flows of content.

17. The medium of claim 15, wherein the total value includes engagement with the content provider by content consumers based on the plurality of flows of content.

18. The medium of claim 15, wherein the total value includes additional content received by the content provider from the content consumers based on the plurality of flows of content.

* * * * *